(12) United States Patent
Mendez Padilla et al.

(10) Patent No.: US 11,865,545 B2
(45) Date of Patent: Jan. 9, 2024

(54) EFFICIENTLY NESTED PIPETTE TIP ARRAYS AND RELATED METHODS

(71) Applicant: BIOTIX, INC., San Diego, CA (US)

(72) Inventors: Juan Martin Mendez Padilla, Tijuana (MX); Arta Motadel, San Diego, CA (US); Peter Paul Blaszcak, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 91 days.

(21) Appl. No.: 17/500,801

(22) Filed: Oct. 13, 2021

(65) Prior Publication Data
US 2022/0040702 A1 Feb. 10, 2022

Related U.S. Application Data

(63) Continuation of application No. 15/886,513, filed on Feb. 1, 2018, now Pat. No. 11,173,492.

(Continued)

(51) Int. Cl.
*B01L 9/00* (2006.01)
*B01L 3/02* (2006.01)
(Continued)

(52) U.S. Cl.
CPC .............. *B01L 9/543* (2013.01); *B01L 3/00* (2013.01); *B01L 3/02* (2013.01); *B01L 3/0275* (2013.01);
(Continued)

(58) Field of Classification Search
CPC .......... B01L 9/543; B01L 3/00; B01L 3/0279; B01L 3/0275; B01L 3/02; B01L 9/00;
(Continued)

(56) References Cited

U.S. PATENT DOCUMENTS

| 3,247,602 | A | 4/1966 | Hamilton et al. |
| 3,853,217 | A | 12/1974 | Scordato et al. |

(Continued)

FOREIGN PATENT DOCUMENTS

| DE | 102015006731 A1 | 12/2016 |
| EA | 004124998-0005 A1 | 4/2018 |

(Continued)

OTHER PUBLICATIONS

International Preliminary Report on Patentability dated Aug. 15, 2019 in International Patent Application No. PCT/US2018/016456, filed on Feb. 1, 2018, 14 pages.

(Continued)

*Primary Examiner* — P. Kathryn Wright
*Assistant Examiner* — Curtis A Thompson
(74) *Attorney, Agent, or Firm* — Standley Law Group LLP; Jeffrey S. Standley; Adam J. Smith

(57) ABSTRACT

Provided in part herein are pipette tip rack assemblies having one or more of the following features: (i) having a plurality of pipette tip receptacle plates, each plate having an array of pipette tips, stacked upon one another supported by a rack base; (ii) each plate having one or more projections from the proximal or distal surface and, optionally, orifices that oppose the projections of the next plate in the stack, and (iii) the rack base having a proximal surface with one or more orifices or projections that oppose the projections or orifices of the plate in the stack. Also provided are methods of dispensing pipette tips from pipette tip rack assemblies and manufacturing pipette tip rack assembly components.

14 Claims, 39 Drawing Sheets

Related U.S. Application Data

(60) Provisional application No. 62/454,445, filed on Feb. 3, 2017.

(51) Int. Cl.
  *B65D 85/00* (2006.01)
  *G01N 1/28* (2006.01)
  *G01N 35/00* (2006.01)
  *B01L 3/00* (2006.01)

(52) U.S. Cl.
  CPC ............. *B01L 3/0279* (2013.01); *B01L 9/00* (2013.01); *B01L 2200/025* (2013.01); *B01L 2200/12* (2013.01); *B01L 2300/046* (2013.01); *B01L 2300/123* (2013.01); *B01L 2300/126* (2013.01); *B65D 85/00* (2013.01); *G01N 1/28* (2013.01); *G01N 35/00* (2013.01); *Y10T 436/2575* (2015.01)

(58) Field of Classification Search
  CPC ......... B01L 2300/123; B01L 2300/046; B01L 2200/025; B01L 2300/126; B01L 2200/12; G01N 35/00; G01N 1/28; Y10T 436/2575; B65D 85/00
  See application file for complete search history.

(56) References Cited

U.S. PATENT DOCUMENTS

| | | | |
|---|---|---|---|
| 4,349,109 A * | 9/1982 | Scordato | B01L 9/543 422/933 |
| 4,577,760 A | 3/1986 | Rainin et al. | |
| 5,779,984 A | 7/1998 | Kelly et al. | |
| 6,007,779 A | 12/1999 | Lemieux et al. | |
| 6,286,678 B1 | 9/2001 | Petrek | |
| D632,803 S | 2/2011 | Motadel et al. | |
| 8,460,622 B2 | 6/2013 | Motadel et al. | |
| 8,470,265 B2 | 6/2013 | Curry et al. | |
| D699,370 S | 2/2014 | Motadel et al. | |
| D699,859 S | 2/2014 | Motadel | |
| D718,470 S | 11/2014 | So et al. | |
| D724,236 S | 3/2015 | Motadel et al. | |
| 9,089,845 B2 | 7/2015 | Motadel et al. | |
| D767,783 S | 9/2016 | Mcclelland | |
| 9,486,803 B2 | 11/2016 | Motadel et al. | |
| 10,137,453 B2 | 11/2018 | Curry et al. | |
| 10,143,793 B2 | 12/2018 | Gagnieux et al. | |
| 10,173,218 B2 | 1/2019 | Peterson | |
| D849,961 S | 5/2019 | Muller et al. | |
| D849,962 S | 5/2019 | Curry et al. | |
| D851,274 S | 6/2019 | Gomi et al. | |
| D854,185 S | 7/2019 | Mendez et al. | |
| D861,190 S | 9/2019 | Potdar et al. | |
| D906,538 S | 12/2020 | Motadel | |
| 11,173,492 B2 | 11/2021 | Padilla et al. | |
| D957,682 S | 7/2022 | Mendez Padilla et al. | |
| 2003/0129089 A1* | 7/2003 | Arnold, Jr. | G01N 35/10 422/526 |
| 2005/0249638 A1 | 11/2005 | Stockwell | |
| 2006/0133965 A1 | 6/2006 | Tajima et al. | |
| 2007/0105214 A1 | 5/2007 | Micklash et al. | |
| 2009/0255949 A1 | 10/2009 | Motadel | |
| 2009/0293643 A1* | 12/2009 | Powell | B01L 9/543 206/505 |
| 2010/0258578 A1 | 10/2010 | Motadel | |
| 2011/0236278 A1* | 9/2011 | Motadel | B01L 9/543 422/560 |
| 2011/0306052 A1* | 12/2011 | Belz | G01N 35/0099 435/7.1 |
| 2012/0058479 A1 | 3/2012 | Gisler et al. | |
| 2012/0258026 A1 | 10/2012 | Naumann | |
| 2013/0323140 A1 | 12/2013 | Motadel et al. | |
| 2013/0336852 A1* | 12/2013 | Rethwisch | B01L 9/543 422/564 |
| 2014/0234182 A1 | 8/2014 | Motadel et al. | |
| 2016/0101422 A1 | 4/2016 | Bucher et al. | |
| 2016/0167041 A1 | 6/2016 | Curry et al. | |
| 2017/0008001 A1 | 1/2017 | Motadel et al. | |
| 2018/0117595 A1 | 5/2018 | Curry et al. | |
| 2018/0221884 A1 | 8/2018 | Mendez et al. | |
| 2019/0078079 A1 | 3/2019 | Higgins | |
| 2019/0135605 A1 | 5/2019 | Lee | |
| 2019/0336979 A1 | 11/2019 | Knoppke | |

FOREIGN PATENT DOCUMENTS

| | | |
|---|---|---|
| EP | 1110613 A1 | 6/2001 |
| EP | 2 338 596 A1 | 6/2011 |
| EP | 2789389 A1 | 10/2014 |
| FR | 2726201 A1 | 5/1996 |
| WO | 2006/133440 A2 | 12/2006 |
| WO | 2010/008737 A2 | 1/2010 |
| WO | 2018/144733 A1 | 8/2018 |

OTHER PUBLICATIONS

International Search Report and Written Opinion dated Jun. 29, 2018 in International Patent Application No. PCT/US2018/016456, filed on Feb. 1, 2018, 23 pages.
Office Action dated Apr. 16, 2020 in U.S. Appl. No. 29/692,493, filed May 24, 2019, 7 pages.
Office Action dated Apr. 27, 2021 in U.S. Appl. No. 29/759,427, filed Nov. 23, 2020, 17 pages.
Office Action dated Dec. 10, 2019 in U.S. Appl. No. 15/886,513, filed Feb. 1, 2018 and published as US 2018-0221884 on Aug. 9, 2018, 17 pages.
Office Action dated Dec. 28, 2020 in U.S. Appl. No. 15/886,513, filed Feb. 1, 2018 and published as US 2018-0221884 on Aug. 9, 2018, 17 pages.
Office Action dated Feb. 21, 2019 in U.S. Appl. No. 29/592,990, filed Feb. 3, 2017, 7 pages.
Office Action dated Jul. 15, 2021 in U.S. Appl. No. 15/886,513, filed Feb. 1, 2018 and published as US-2018-0221884-A1 on Aug. 9, 2018, 10 Pages.
Office Action dated Jun. 2, 2020 in U.S. Appl. No. 15/886,513, filed Feb. 1, 2018 and published as US 2018-0221884 on Aug. 9, 2018, 13 pages.
Office Action dated Nov. 27, 2018 in U.S. Appl. No. 29/592,990, filed Feb. 3, 2017, 8 pages.
Office Action dated Nov. 29, 2019 in U.S. Appl. No. 29/692,493, filed May 24, 2019, 9 pages.
Office Action dated Oct. 29, 2021 in U.S. Appl. No. 29/759,427, filed Nov. 23, 2020, 7 pages.
Office Action dated Sep. 2, 2020 in U.S. Appl. No. 29/692,493, filed May 24, 2019, 7 pages.
Tip Eject Reload, Biotix Logo, http://biotix.com/innovation/packaging/tip-eject-reload/, 2018, 2 pages.

* cited by examiner

EFFICIENTLY NESTED PIPETTE TIP ARRAYS AND RELATED METHODS

RELATED PATENT APPLICATIONS

This patent application is a continuation of U.S. patent application Ser. No. 15/886,513, entitled EFFICIENTLY NESTED PIPETTE TIP ARRAYS AND RELATED METHODS, naming Juan Martin Mendez Padilla, Arta Motadel and Peter Paul Blaszcak as inventors, which claims the benefit of U.S. provisional patent application No. 62/454,445 filed Feb. 3, 2017, entitled EFFICIENTLY NESTED PIPETTE TIP ARRAYS AND RELATED METHODS, naming Juan Martin Mendez Padilla, Arta Motadel, and Peter Paul Blaszcak as inventors. The entire content of the foregoing patent application is incorporated herein by reference for all purposes, including all text, tables and drawings.

FIELD

The technology relates in part to nested pipette tip array assemblies having efficiently nested pipette tips for use in biotechnology applications.

BACKGROUND

Pipette tips are utilized in a variety of industries that have a requirement for handling fluids, and are used in facilities including medical laboratories and research laboratories, for example. In many instances pipette tips are used in large numbers, and often are utilized for processing many samples and/or adding many reagents to samples, for example.

Pipette tips often are substantially cone-shaped with an aperture at one end that can engage a dispensing device, and another relatively smaller aperture at the other end that can receive and emit fluid. Pipette tips generally are manufactured from a moldable plastic, such as polypropylene, for example. Pipette tips are made in a number of sizes to allow for accurate and reproducible liquid handling for volumes ranging from nanoliters to milliliters.

Pipette tips can be utilized in conjunction with a variety of dispensing devices, including manual dispensers (e.g., pipettors) and automated dispensers. A dispenser is a device that, when attached to the upper end of a pipette tip (the larger opening end), applies negative pressure to acquire fluids, and applies positive pressure to dispense fluids. The lower or distal portion of a dispenser (typically referred to as the barrel or nozzle) is placed in contact with the upper end of the pipette tip and held in place by pressing the barrel or nozzle of the dispenser into the upper end of the pipette tip. The combination then can be used to manipulate liquid samples.

Pipette tips can be shipped, stored and presented to a user or dispenser in stacks of trays or directly nested upon each other. The stacked trays usurp significant amount of space and waste substantial amount of plastic. Directly nested arrays of pipette tips require further substantial handling to separately dispense each array and risk dispensing an incomplete array of tips, which can reduce efficient operation throughput.

SUMMARY

Provided in certain aspects are nested pipette tip rack assemblies that conserve on plastic and more tightly pack arrays of pipette tips to enhance manufacturing, packing, shipping, storage and use. In certain aspects, pipette tip rack assembly embodiments prevent or reduce over-nesting of pipette tips.

Provided in certain aspects are nested pipette tip rack assemblies that include a rack base, a first pipette tip receptacle plate in association with the rack base, a second pipette tip receptacle plate proximally oriented to the first pipette tip receptacle plate. The first pipette tip receptacle plate and second pipette tip receptacle plate each have a proximal surface, a distal surface, an array of bores extending from the proximal surface to the distal surface, and multiple projections extending from the distal surface. A first array of pipette tips are retained in the bores in the first pipette tip receptacle plate, and a second array of pipette tips are retained in the bores in the second pipette tip receptacle plate. Each of the pipette tips in the second array of pipette tips nest in a pipette tip in the first array of pipette tips and a plurality of the projections of the second pipette tip receptacle plate is in contact with the proximal surface of the first pipette tip receptacle plate. In certain aspects the projections of the second pipette tip receptacle plate space the second pipette tip receptacle plate from the first pipette tip receptacle plate at a distance sufficient to prevent or reduce over-nesting of the pipette tips in the second array in the pipette tips of the first array. In certain aspects the pipette tips in the second array would be over-nested in the pipette tips of the first array if the projections of the second pipette tip receptacle plate were not present or were shorter in length. In certain aspects the rack base includes a rack proximal surface and multiple orifices in the rack base proximal surface, and each of which projections of the first pipette tip receptacle plate are inserted in a rack base orifice. In certain aspects the projections of the first pipette tip receptacle plate are reversibly inserted in the rack base orifices.

In certain aspects the projections of the first pipette tip receptacle plate are retained in the rack base orifices by an interference fit. In certain aspects the rack base orifices includes sidewalls and the projections of the first pipette tip receptacle plate interfere with the sidewalls. In certain aspects the projections of each pipette tip receptacle plate includes a first projection member and a second projection member and the projection members are configured to deflect towards one another when inserted in an orifice. In certain aspects the distal terminus of a plurality of the projections of the second pipette tip receptacle plate contact the proximal surface of the first pipette tip receptacle plate. In certain aspects the first pipette tip receptacle plate includes multiple orifices in the proximal surface and in opposition to the projections of the second pipette tip receptacle plate. In certain aspects the orifices in the proximal surface of the first pipette tip receptacle plate engage with the projections of the second pipette tip receptacle plate. In certain aspects the orifices reversibly engage with, and optionally do not lock with, the projections of the second pipette tip receptacle plate. In certain aspects the proximal surface of the first and second pipette tip receptacle plate each include a raised surface that includes a plurality of the bores or all of the bores.

In certain aspects the projections include: fasteners, posts, pins, tubular supports, or ribs.

In certain aspects the bores are in association with a projection. In certain aspects the projections are symmetrically disposed and, in other aspects, asymmetrically disposed on the pipette tip receptacle plate. In certain aspects the projections are disposed around the perimeter of the pipette tip receptacle plate. In certain aspects 80% or fewer bores are in association with a projection.

In certain aspects the pipette tip receptacle plates include an X axis and a Y axis and the axes intersect at the center of the surface of the pipette tip receptacle plates and the projections are distributed on the first and second receptacle plate parallel to the X axis or the Y axis. In certain aspects the projections are located near the pipette tip receptacle plate edge. In certain aspects the projections are located between pipette tip receptacle plate bores. In certain aspects the projections are located between pipette tip receptacle plate bores parallel to the X axis at a plurality of Y coordinates. In certain aspects the projections are located between every pipette tip receptacle plate bore parallel to the X axis. In certain aspects the projections are located between pipette tip receptacle plate bores parallel to the Y axis at a plurality of X coordinates. In certain aspects the projections are located between every pipette tip receptacle plate bore parallel to the Y axis. In certain aspects the projections are located between every pipette tip receptacle plate bore parallel to the X axis.

In certain aspects each pipette tip receptacle plate includes 96, 192, 288, 384, 576, 672, 768 or 1536 bores.

In certain aspects the first pipette tip receptacle plate and second pipette tip include multiple projections extending from the distal surface and a plurality of the projections of the first pipette tip receptacle plate is in contact with the distal surface of the second pipette tip receptacle plate. In certain aspects the projections of the first pipette tip receptacle plate space the first pipette tip receptacle plate from the second pipette tip receptacle plate at a distance sufficient to prevent or reduce over-nesting of the pipette tips in the second array in the pipette tips of the first array. In certain aspects the pipette tips in the second array would be over-nested in the pipette tips of the first array if the projections of the first pipette tip receptacle plate were not present or were shorter in length. In certain aspects the pipette tip receptacle plates include multiple orifices in the distal surface and the rack base includes a rack proximal surface and multiple projections in the rack base proximal surface, and each of the projections of the rack base are inserted in one of the orifices in the distal surface of the first pipette tip receptacle plate. In certain aspects the projections in the rack base proximal surface are reversibly inserted in the orifices of the first pipette tip receptacle plate. In certain aspects the rack base projections are retained in the orifices of the first pipette tip receptacle plate by an interference fit. In certain aspects the first pipette tip receptacle plate orifices includes sidewalls and the projections of the rack base interfere with the sidewalls. In certain aspects the projections of the rack base include projection members that are configured to deflect towards one another when a projection is inserted in an orifice. In certain aspects the projections of the first pipette tip receptacle plate include a distal terminus and the distal terminus of a plurality of the projections of the first pipette tip receptacle plate contact the distal surface of the second pipette tip receptacle plate. In certain aspects the second pipette tip receptacle plate includes multiple orifices in the distal surface and in opposition to the projections of the first pipette tip receptacle plate. In certain aspects the second pipette tip receptacle plate orifices reversibly engage with the projections of the first pipette tip receptacle plate. In certain aspects the second pipette tip receptacle plate orifices do not lock with the projections of the first pipette tip receptacle plate.

In certain aspects the nested pipette tip rack assembly includes a lid. In certain aspects the lid includes an electrically conductive member in effective communication with the pipette tips. In certain aspects the lid includes an electrically conductive material. In certain aspects the lid includes a pliant material in effective connection with the pipette tips. In certain aspects the lid includes an electrically conductive tab.

In certain aspects the nested pipette tip rack assembly includes a push plate. In certain aspects the push plate includes an electrically conductive member in effective communication with the pipette tips. In certain aspects the push plate includes an electrically conductive material. In certain aspects the push plate includes a pliant material in effective connection with the pipette tips. In certain aspects the lid includes an electrically conductive tab.

In certain aspects the nested pipette tip rack assembly includes a sheet that includes a first surface, a second surface and an array of holes. The holes include an edge. The second surface of the sheet is in contact with the top surface of the pipette tip receptacle plate and the holes in the sheet are concentric with the bores in the pipette tip receptacle plate. The pipette tips in the array of pipette tips are retained in the holes of the sheet by friction between the exterior wall of each of the pipette tips and the edge of each hole in the sheet in contact with each of the pipette tips.

In certain aspects the nested pipette tip rack assembly includes a sheet that includes a first surface, a second surface and the proximal region terminus of each pipette tip is joined to the second surface of the sheet. In certain aspects the sheet includes holes where each hole is located within the region of the proximal end opening of each pipette tip and the hole comprises a diameter less than the proximal end diameter. In certain aspects the holes are concentric with the proximal region terminus of the pipette tips. In certain aspects the sheet includes perforation circles wherein each perforation circle is located within the proximal end opening of each pipette tip and the perforation circle has a diameter less than the proximal end diameter. In certain aspects the sheet includes an adhesive where the proximal region terminus contacts the second surface of the sheet.

In certain aspects the nested pipette tip rack assembly includes an ejection sleeve that includes four walls and configured to stabilize a plurality of pipette tip receptacle plates over the rack base. In certain aspects the ejection sleeve is transparent or translucent In certain aspects the ejection sleeve is bossed.

In certain aspects the nested pipette tip rack assembly includes rigid packaging that includes four sidewalls and a bottom. In certain aspects at least one sidewall includes a cutout.

In certain aspects the nested pipette tip rack assembly includes a bag, In certain aspects the bag is transparent or translucent. In certain aspects the bag is resealable.

Also provided in certain aspects is a method for dispensing an array of pipette tips by providing any of the above nested pipette tip rack assemblies above and, applying an axial force to the proximal pipette tip receptacle plate sufficient to transfer a pipette tip receptacle plate onto a rack base. In certain aspects the nested pipette tip rack assembly includes a push plate and the axial force is applied to the push plate.

Also provided in certain aspects is a method for manufacturing a component of a nested pipette tip rack assembly by providing a mold having structures configured to mold a component of the nested pipette tip rack assembly, introducing a moldable polymer to the mold, curing the polymer in the mold, thereby producing the component of the nested pipette tip rack assembly; and removing the component of the nested pipette tip rack assembly from the mold.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

Figure 1:
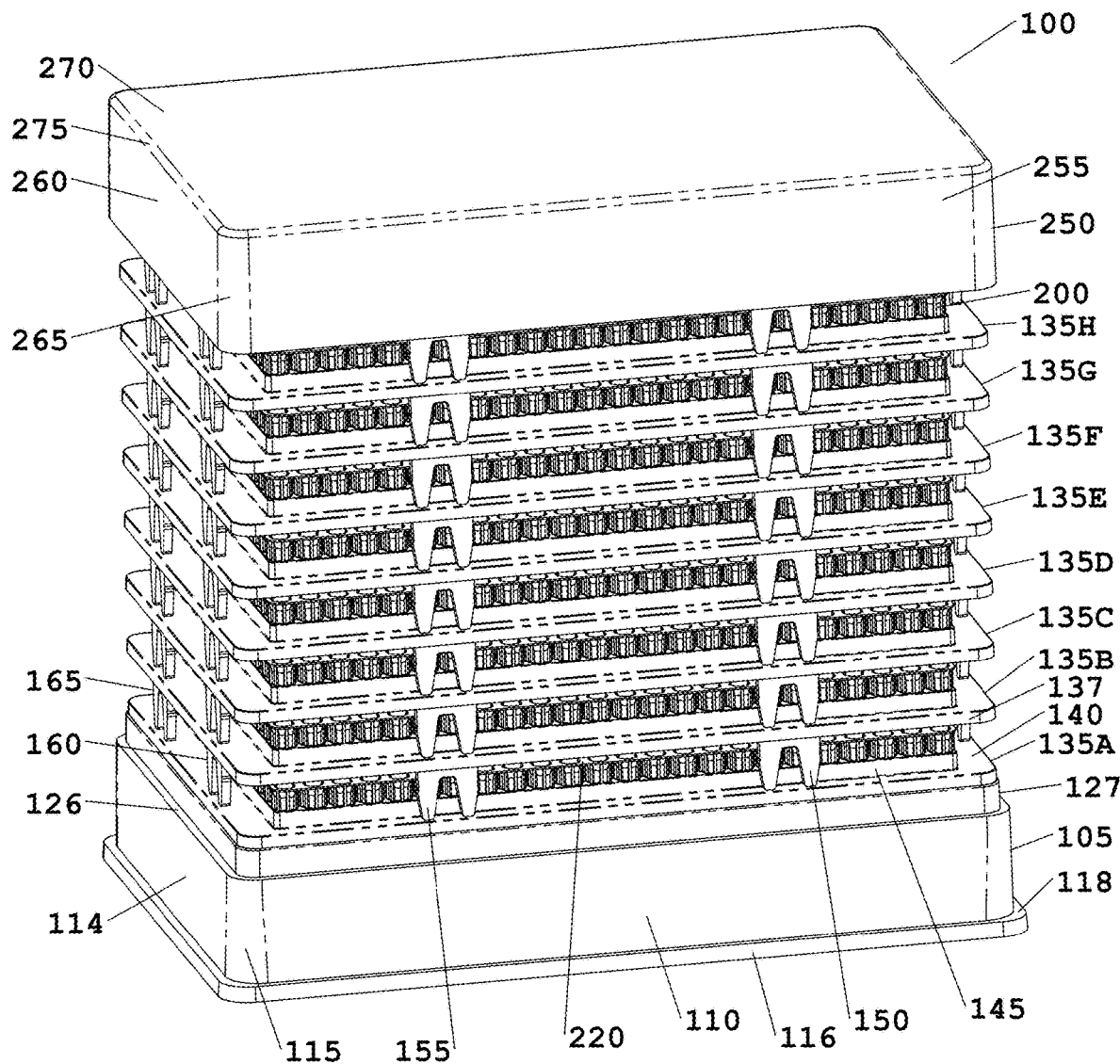
FIG. 1 is a top perspective view of nested pipette tip array assembly embodiment 100.

Certain features of drawings are described in the following table.

| callout | feature |
| --- | --- |
| 100 | nested pipette tip array assembly embodiment |
| 105 | rack base |
| 110 | rack longer sidewall |
| 114 | rack shorter sidewall |
| 115 | rack shorter sidewall to longer sidewall transition |
| 116 | rack distal flange |
| 118 | rack distal flange top surface |
| 120 | rack distal flange foot |
| 121 | void between rack distal flange foot and internal wall |
| 122A, 122B | rack distal rib |
| 123 | rack distal aperture |
| 123-1 | rack distal aperture surround |
| 124 | rack interior wall |
| 124-1 | void between rack bottom and interior wall |
| 125 | rack bottom |
| 126 | step between rack sidewall and recessed sidewall |
| 127 | rack recessed member |
| 128 | rack recessed member longer sidewall |
| 129 | rack recessed member shorter sidewall |
| 130 | rack recessed member proximal surface |
| 131A, 131B, 131C, 131D, 131E, 131F, 131G, 131H | slot in rack recessed member proximal surface |
| 132 | rack interior sidewall |
| 133 | rack interior shorter cross-member |
| 134 | rack interior longer cross-member |
| 135A, 135B, 135C, 135D, 135E, 135F, 135G, 135H, 135I | pipette tip receptacle plate (also referred to as snap plate) |
| 137 | pipette tip receptacle plate edge |
| 140 | pipette tip receptacle plate proximal surface |
| 142, 142A, 142B, 142C, 142D | pipette tip receptacle plate aperture; bore opening |
| 144 | pipette tip receptacle plate raised surface |
| 145 | longer sidewall step between pipette tip receptacle plate proximal surface and raised surface |
| 146 | shorter sidewall step between pipette tip receptacle plate proximal surface and raised surface |
| 148 | pipette tip receptacle plate distal surface |
| 150 | pipette tip receptacle plate projection |
| 151 | projection prong |
| 152 | projection prong |
| 153 | projection body |
| 154 | projection body perimeter |
| 155 | pipette tip receptacle plate projection |
| 156 | Projection distal surface |
| 157 | Projection distal surface |
| 160 | pipette tip receptacle plate projection |
| 165 | pipette tip receptacle plate projection |
| 170, 170A, 170B, 170C, 170D | pipette tip receptacle plate projection |
| 200, 200A-1, 200A-2, 200B-1, 200B-2, 200C-1, 200C-2, 200D-1, 200D-2 | pipette tip |
| 202 | pipette tip distal terminus |
| 203 | pipette tip proximal terminus |
| 204 | pipette tip distal region |
| 205 | pipette tip flange |
| 206 | pipette tip shoulder located at junction between distal region and proximal region |
| 207 | pipette tip proximal region |
| 208 | pipette tip rib |
| 210 | pipette tip array |
| 220, 220A, 220B, 220C, 220D | sheet |
| 225 | sheet proximal surface |
| 230, 230A, 230B, 230C, 230D | sheet aperture |
| 235 | sheet distal surface |
| 250 | lid |
| 255 | lid longer sidewall |
| 260 | lid shorter sidewall |
| 265 | lid shorter sidewall to longer sidewall transition |
| 270 | lid top |
| 275 | lid sidewall to top transition |
| 290 | space between pipette tip receptacle plate distal surface and the proximal surface of a distally disposed sheet |

-continued

| callout | feature |
| --- | --- |
| 300 | packaged nested pipette tip array assembly embodiment |
| 310 | flexible package |
| 315 | package virtual cutout |
| 320 | package seal |
| 325 | package tab |
| 330 | package tear member |
| 335 | package shorter side panel |
| 340 | package bottom member |
| 345 | package longer side panel |
| 400 | packaged nested pipette tip array assembly embodiment |
| 410 | rigid package |
| 415 | package internal divider |
| 420 | package longer sidewall |
| 425 | package shorter sidewall |
| 430 | package bottom |
| 435 | package cutout |
| 440 | package sidewall adjacent to internal divider |
| 450 | package lid |
| 455 | package lid longer sidewall |
| 460 | package lid shorter sidewall |
| 465 | package lid top |
| 500 | nested pipette tip array assembly embodiment |
| 505 | rack base |
| 516 | rack distal flange |
| 527 | rack recessed member |
| 535, 535A, 535B, 535C, 535D | pipette tip receptacle plate (also referred to as snap plate) |
| 537 | pipette tip receptacle plate edge |
| 540 | pipette tip receptacle plate proximal surface |
| 542, 542A, 542B, 542C, 542D | pipette tip receptacle plate aperture; bore opening |
| 548 | pipette tip receptacle plate distal surface |
| 550 | pipette tip receptacle plate projection |
| 555 | pipette tip receptacle plate projection |
| 560 | pipette tip receptacle plate projection |
| 565 | pipette tip receptacle plate projection |
| 570, 570B, 570C, 570D | pipette tip receptacle plate projection |
| 580, 580B, 580C, 580D | rib |
| 600, 600A-1, 600A-2, 600B-1, 600B-2, 600C-1, 600C-2, 600D-1, 600D-2 | pipette tip |
| 607, 607A | pipette tip proximal region |
| 608, 608A | pipette tip rib |
| 620, 620A, 620B, 620C, 620D | sheet |
| 630, 630A, 630B, 630C | sheet aperture |
| 650 | lid |
| 690 | space between pipette tip receptacle plate distal surface and the proximal surface of a distally disposed sheet |
| 700 | nested pipette tip array assembly embodiment |
| 705 | rack base |
| 716 | rack distal flange |
| 727 | rack recessed member |
| 735A, 735B, 735C, 735D | pipette tip receptacle plate (also referred to as snap plate) |
| 742A, 742B, 742C, 742D | pipette tip receptacle plate aperture; bore opening |
| 755 | pipette tip receptacle plate projection |
| 760 | pipette tip receptacle plate projection |
| 765 | pipette tip receptacle plate projection |
| 770B, 770C, 770D | pipette tip receptacle plate projection |
| 800, 800A-1, 800A-2, 800B-1, 800B-2, 800C-1, 800C-2, 800D-1, 800D-2 | pipette tip |
| 807 | pipette tip proximal region |
| 809 | pipette tip proximal region interior annular groove |
| 820A, 820B, 820C, 820D | sheet |
| 830A, 830B, 830C | sheet aperture |
| 850 | lid |
| 895 | space between pipette tip receptacle plate distal surface and the proximal surface of a distally disposed pipette tip receptacle plate |

-continued

| callout | feature |
| --- | --- |
| 900 | nested pipette tip array assembly embodiment |
| 905 | rack base |
| 916 | rack distal flange |
| 927 | rack recessed member |
| 935, 935A, 935B, 935C, 935D | pipette tip receptacle plate (also referred to as snap plate) |
| 937 | pipette tip receptacle plate edge |
| 940 | pipette tip receptacle plate proximal surface |
| 942, 942A, 942B, 942C, 942D | pipette tip receptacle plate aperture; bore opening |
| 948 | pipette tip receptacle plate distal surface |
| 950 | pipette tip receptacle plate projection |
| 955 | pipette tip receptacle plate projection |
| 960 | pipette tip receptacle plate projection |
| 965 | pipette tip receptacle plate projection |
| 970B, 970C, 970D | pipette tip receptacle plate projection |
| 985, 985B, 985C, 985D | tubular projection |
| 1000, 1000A-1, 1000A-2, 1000B-1, 1000B-2, 1000C-1, 1000C-2, 1000D-1, 1000D-2 | pipette tip |
| 1007 | pipette tip proximal region |
| 1008 | pipette tip rib |
| 1020A, 1020B, 1020C, 1020D | sheet |
| 1030A, 1030B, 1030C | sheet aperture |
| 1050 | lid |
| 1090 | space between pipette tip receptacle plate distal surface and the proximal surface of a distally disposed sheet |
| 1135, 1135A, 1135B, 1135C, 1135D | pipette tip receptacle plate (also referred to as snap plate) |
| 1137 | pipette tip receptacle plate edge |
| 1140 | pipette tip receptacle plate proximal surface |
| 1142, 1142A, 1142B, 1142C, 1142D | pipette tip receptacle plate aperture; bore opening |
| 1148 | pipette tip receptacle plate distal surface |
| 1150 | pipette tip receptacle plate projection |
| 1155 | pipette tip receptacle plate projection |
| 1160 | pipette tip receptacle plate projection |
| 1165 | pipette tip receptacle plate projection |
| 1170, 1170B, 1170C, 1170D | pipette tip receptacle plate projection |
| 1185, 1185B, 1185C, 1185D | rib |
| 1200 | nested pipette tip array assembly embodiment |
| 1201 | sleeve; housing |
| 1202 | push plate |
| 1203 | transverse boss |
| 1204 | axially disposed boss |

DETAILED DESCRIPTION

Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In certain embodiments, provided are pipette tip rack assemblies having one or more of the following features: (i) having a plurality of pipette tip receptacle plates, each plate having an array of pipette tips, stacked upon one another supported by a rack base; (ii) each plate having one or more projections from the proximal or distal surface and, optionally, orifices that oppose the projections of the next plate in the stack, and (iii) the rack base having a proximal surface with one or more orifices or projections that oppose the projections or orifices of the plate in the stack. Such pipette tip rack assemblies confer multiple advantages. For example, the disclosed pipette tip rack assemblies conserve on plastic and more tightly pack arrays of pipette tips. These features can impart advantages in manufacturing, packing, shipping, and storage, for example. Also, pipette tip rack assembly embodiments that include feature (ii) can be utilized to prevent or reduce over-nesting of pipette tips. Further, pipette tip rack assemblies that include features (ii) and (iii) can be manufactured efficiently as the plate can be releasably secured to the rack without energy and time required for welding the two components together, for example. Further, pipette tip rack assemblies that include features (ii) and (iii) allow for the efficient generation of pipette tip trays as each array can be dispensed and releasably secured to the rack base by simple user operations, for example. Other advantageous features of the technology are described hereafter.

Pipette Tip Rack Assembly

A nesting pipette tip rack assembly generally includes a rack base, a plurality of pipette tip receptacle plates, each pipette tip receptacle plates having an array of pipette tips, wherein the pipette tips from each array nest in the distal (lower) array. In some embodiments, the pipette tip receptacle plates include projections that, in some embodiments, reduce or prevent pipette tip over-nesting. In some embodiments, the rack base includes projections and/or orifices that complement projections of the proximally disposed pipette tip receptacle plate. In some embodiments, the projections are fasteners. In some embodiments, the nesting pipette tip rack assembly includes a lid. In some embodiments, the nesting pipette tip rack assembly includes a push plate. In some embodiments, the nesting pipette tip rack assembly is enclosed in a bag or a rigid packaging. In some embodiments, the nesting pipette tip rack assembly within an ejection sleeve. These features are discussed in more detail below.

Pipette Tips

A nesting pipette tip rack assembly generally includes a plurality of pipette tip receptacle plates, each pipette tip receptacle plates having an array of pipette tips. An array can have any useful number of tips, which sometimes is a multiple of 96 tips (e.g., 96, 192, 288, 384, 576, 672, 768 or 1536). In some embodiments, the pipette tip array has 96 tips. In some embodiments, the pipette tip array has 384 tips. In some embodiments, the pipette tip array has 1536 tips. Pipette tips often are substantially cone-shaped with an aperture at the proximal terminus that can engage a dispensing device, and another relatively smaller aperture at the distal terminus that can receive and emit fluid. Pipette tips generally are manufactured from a moldable plastic, such as polypropylene, for example. Pipette tips are made in a number of sizes to allow for accurate and reproducible liquid handling for volumes ranging from nanoliters to milliliters.

Pipette tips can be utilized in conjunction with a variety of dispensing devices, including manual dispensers (e.g., pipettors) and automated dispensers. A dispenser is a device that, when attached to the proximal terminus of a pipette tip (the larger opening end), applies negative pressure to acquire fluids, and applies positive pressure to dispense fluids.

Pipette tips can be of any overall geometry useful for dispensing fluids in combination with a dispensing device. The pipette tips described herein also can be of any volume useful for dispensing fluids in combination with a dispensing device. Non-limiting examples of volumes useful for dispensing fluids in combination with a dispensing device, and described as non-limiting embodiments herein, include pipette tips configured in sizes that hold from 0.1 to 10 microliters, 0.1 to 20 microliters, 1 to 100 microliters, 1 to 200 microliters, 1 to 300 microliters, and from 1 to 1250 microliters, for example. In some embodiments, the volumes pipette tips described herein can manipulate are larger than the volume designation given that particular pipette tip.

Figure 2:
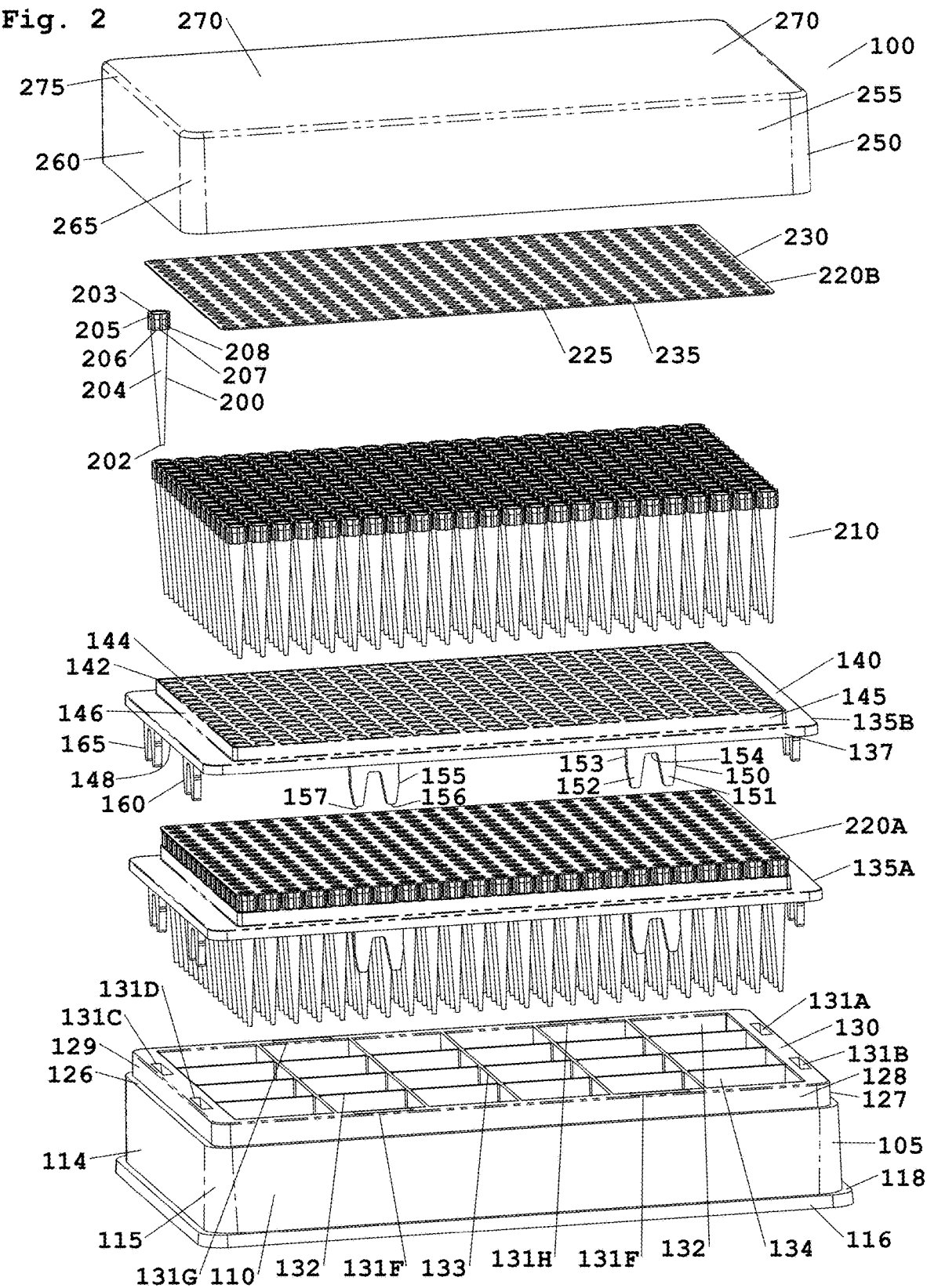
FIG. 2 is an exploded view thereof.

Pipette tips 200 can have a proximal region 207 and a distal region 204 (e.g., FIG. 2). Proximal region 207 comprises an outer or exterior surface upon which regions of increased thickness (e.g., ribs) are disposed, in some embodiments. In certain embodiments, proximal region 207 comprises an annular flange at the proximal terminus 203 of the proximal region 207. The opening of the top-most portion of the central channel or tube generally is wide enough to accept a particular dispenser apparatus (e.g., nozzle, barrel). Pipette tips often taper from the widest point at the top-most portion of the pipette tip (pipette proximal terminus 203 that engages a dispenser), to a narrow opening at the bottom most portion of the pipette tip (pipette distal terminus 202 used to acquire or dispel fluid). In certain embodiments, a pipette tip wall includes two or more taper angles. In some embodiments, pipette tips are of unitary construction.

Proximal region 207 also comprises an interior or inner surface. The inner surface of the pipette tip sometimes forms a tapered continuous wall, in some embodiments, and in certain embodiments, the external wall may assume an appearance ranging from a continuous taper to a stepped taper or a combination of smooth taper with external protrusions. In some embodiments, the interior surface of proximal region 207 is smooth and does not include an internal shelf. That is, the inner surface of proximal region 207 does not have internal walls or protrusions that stop the axial insertion of a pipette tip barrel or nozzle. In certain embodiments, the inner surface of proximal region 15 provides a continuous contact zone (e.g., sealing zone), for engagement of a pipettor nozzle or barrel. In some embodiments, the inner surface of proximal region 207 does not include internal spaced contact points.

In some embodiments, a pipette tip 200 can have (i) an overall length of about 1.10 inches to about 3.50 inches (e.g., about 1.25, 1.50, 1.75, 2.00, 2.25, 2.50, 2.75, 3.00, 3.25 inches); (ii) a fluid-emitting distal terminus 203 having an inner diameter of about 0.01 inches to about 0.03 inches (e.g., about 0.015, 0.020, 0.025 inches) and an outer diameter of about 0.02 to about 0.7 inches (e.g., about 0.025, 0.03, 0.04, 0.05, 0.06 inches); and (iii) a dispenser-engaging proximal terminus 203 having an inner diameter of about 0.10 inches to about 0.40 inches (e.g., about 0.15, 0.20, 0.25, 0.30, 0.35 inches) and an outer diameter of about 0.15 to about 0.45 inches (e.g., about 0.20, 0.25, 0.30, 0.35, 0.45 inches). In the latter embodiments, the inner diameter is less than the outer diameter.

The wall of the proximal section of a pipette tip described herein sometimes is continuously tapered from the top portion, to a narrower terminus. The top portion generally is open and often is shaped to receive a pipette tip engagement portion of a dispensing device. The wall of a proximal section, in some embodiments, forms a stepped tapered surface. The angle of each taper in the proximal section is between about zero degrees to about thirty degrees from the central longitudinal vertical axis of the pipette tip (e.g., about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 degrees), in certain embodiments. The wall thickness of a proximal section may be constant over the length of the section, or may vary with the length of the proximal section (e.g., the wall of the proximal section closer to the distal section of the pipette tip may be thicker or thinner than the wall closer to the top of the proximal section; the thickness may continuously thicken or thin over the length of the wall). In certain embodiments, the walls of proximal region 15 do not have a continuous axial thickness. That is, the thickness of the walls in proximal region 15 sometimes decreases axially towards the midpoint of proximal region 15, then increases axially from the midpoint towards the junction of proximal region 15 and distal region 20. In some embodiments, the walls of proximal thickness 15 have a continuous circumferential thickness. That is, the thickness of the walls in proximal region 15, as viewed in a particular cross section, do not vary in thickness. A proximal section of a pipette tip may contain a filter, insert or other material.

Pipette Tips with a Proximal Flange Feature

Some pipette tips can include a flared lead-in surface at the end of the proximal region 207. Some pipette tips may include a flange (e.g., annular flange) at the end of each pipette tip in the proximal region 207. The flange can be flared, and the lead-in diameter of the flange can allow for dispenser engagement tolerance, which is relevant for multi-dispenser applications, for example. Such a flange can provide a larger contact zone for engaging a dispenser nozzle, and can increase the probability of a sealing engagement between the dispenser nozzle not coaxially aligned with a pipette tip by guiding the axial center of the pipette tip to axial center of the dispenser nozzle. An annular flange also can provide pipette tip rigidity in addition to facilitating dispenser alignment. The pipette tips can include an annular flange at the proximal terminus of the proximal region.

Pipette Tip with a Blade Feature

Pipette tips can include a distal region 204 having a tapered wall thickness and terminating with a "knife edge" thickness. The term "knife edge" or "blade," as used herein refers to an edge resulting from a continuous taper of a pipette wall surface. The taper can be established by the inner surface disposed at a different angle than the outer surface along all or a portion of the axial length of the distal region 204. In certain embodiments, the surfaces form a sharply defined single contiguous edge or boundary of minimal thickness. This feature can reduce the area of the surface to which liquid droplets can adhere, and also may reduce the surface tension between the tip and the droplets, thereby reducing the probability and frequency with which droplets may adhere to the discharge aperture of the pipette tips. This feature also can reduce the number of times a user needs to touch a pipette tip to a surface to remove a droplet adhered to the pipette tip, which sometimes is referred to as "touching off." This feature also may increase precision and accuracy in manual or automated applications ("precision" and "accuracy" are described in further detail below).

Without being limited by theory, a knife edge or blade feature may reduce the area of the surface to which liquid droplets can adhere, and also may reduce the surface tension between the tip and the droplets, thereby reducing the probability and frequency with which droplets may adhere to the discharge aperture of the pipette tips. Without being limited by theory, the "inverse taper" (e.g., the taper of the inner surface caused by the thinning of the distal terminus, while the outer surface taper remains constant) of the blade feature may cause drops of liquid to become less likely to adhere to the pipette tip while being dispelled from the pipette tip due to the combination of increased drop surface area and surface tension (e.g., the drop is stretched due to the internal inverse taper) and decreased pipette tip inner surface area, in some embodiments. Without being limited by theory, the combination of increased drop surface area and surface tension combined with the decreased pipette tip surface area enables the efficient release of liquid droplets from the surfaces of the pipette tip. This feature also may lessen the number of times a user needs to touch a pipette tip to a surface to remove a droplet adhered to the pipette tip, and also may increase precision and accuracy in manual or automated applications. Reducing the number of times a user needs to touch off may help increase throughput of samples (e.g., time savings), increase accuracy of sample delivery (e.g., delivery of entire sample or reagent), and decrease costs (e.g., fewer repetitive injury claims, higher sample throughput, and fewer repeated samples due to pipetting error or inaccuracy). An example of the time savings associated with the combination of blade feature, flange feature and flexible region feature is described in the Examples section herein. The term "user" as used herein refers to a person or extension under the direct or indirect control of a person (e.g., a pipettor, an automated device, an automated device controlled by a computer).

Pipette Tip Embodiments Comprising Flexible Feature(s)

Some pipette tip embodiments can comprise one or more flexible features. In certain embodiments, a pipette tip includes a section of flexible thickness (e.g., proximal region) that sometimes also can include axially oriented alternating regions of increased thickness (e.g., axially oriented ribs or sets of ribs). In some embodiments, the ribs comprise a first set and a second set of axially oriented ribs. In certain embodiments, the axially oriented ribs can be alternately spaced and circumferentially spaced around the external surface of the proximal region of the pipette tip.

A terminus of a dispenser often sealingly engages an inner portion of a pipette tip at a sealing zone, which generally is located a particular distance from the proximal terminus of the pipette tip. Thus, a sealing zone in certain embodiments is disposed a particular distance below the terminal opening of the pipette tip (e.g., the sealing zone is offset from the edge of the pipette tip). A sealing zone often is a point at which a fluid tight, frictional and/or sealing engagement occurs between a pipette tip and a dispenser. A sealing zone is axially coextensive with a region of flexible thickness and/or increased thickness (e.g., ribs) in some embodiments. In certain embodiments, the proximal region comprises a sealing zone. In some embodiments, a sealing zone provides a continuous contact zone for frictional and/or sealing engagement between a pipette tip and a dispenser.

Figure 9:
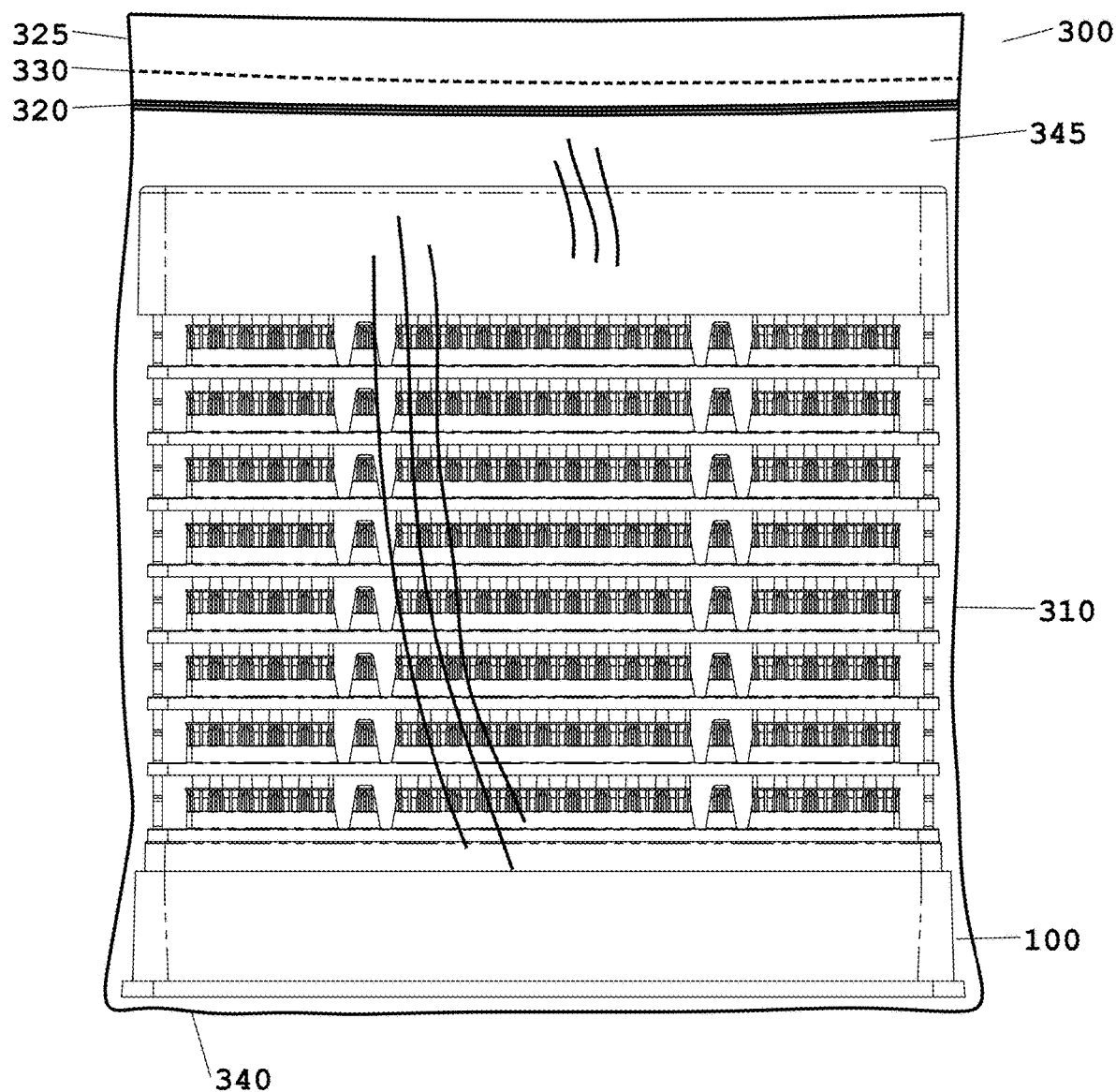
FIG. 9 is a longer side view thereof.

Incorporating a flexible region (e.g., flexible thickness) in a pipette tip proximal region (e.g., at a sealing zone) can reduce the amount of axial force required to engage and/or disengage a pipette tip from a dispenser. A pipette tip sometimes includes a flexible proximal region where the softness or flexibility allows deflection of the proximal region when a deflecting force is applied. The softness or flexibility sometimes is referred to as a "softness rating" or a "flexibility rating." Any suitable method can be used to measure pipette tip flexibility in the flexible region of a pipette tip. Non-limiting examples of tests that can be utilized to measure pipette tip flexibility include a deformation test, a pipette tip engagement test, a pipette tip ejection test, the like and combinations thereof. A pipette tip deformation test sometimes includes the use of a force gauge to press down on an outer surface (e.g., proximal outer surface, distal outer surface, proximal and distal outer surfaces) of the pipette tip, and the force necessary to cause deformation of the normal pipette tip shape by a predetermined amount, is recorded. Often the measurement is presented as pounds of force necessary to deform the pipette tip, and sometimes the measurement can be presented in grams of force necessary to deform a pipette tip, attach a pipette tip to a pipettor, and/or eject a pipette tip from a pipettor. An example of a deformation flexibility experiment is shown in FIG. 9, and the results of the deformation experiment are presented graphically in FIG. 10 and in table form in the examples herein. Pipette tip engagement and ejection experiments sometimes includes the use of digital force gauges to measure the amount of force exerted during pipette/pipette tip engagement and pipette tip ejection. Examples of experiments performed to measure pipette tip deflection (softness of tip), engagement force and ejection force are presented in the Examples.

As noted above, a pipette tip generally is affixed to a dispensing device by inserting a portion of the dispenser (e.g., dispenser barrel, tip or nozzle) into the proximal or receiving end of a pipette tip with a downward or axial force. The downward force applied to the dispenser that can securely engage the pipette tip may be less than pipette tips currently manufactured. A proximal region having flexible thickness (e.g., in the sealing zone) can reduce the amount of axial force required to engage and/or disengage a pipette tip to a dispenser. Non-limiting examples of reduced axial forces include an average, mean or nominal axial force reduction of about 20% to about 80% of the force required to engage standard inflexible pipette tips (e.g., about 25%, 30%, 35%, 40%, 45%, 50%, 55%, 60%, 65%, 70%, or 75% of the force required to engage pipette tips currently manufactured). A non-limiting example of a manufactured inflexible pipette tip that can be used as a standard against which to compare mean or nominal axial force reduction, is manufactured by Eppendorf International (e.g., Eppendorf Dual-filter 100 microliter tip, USA/CDN Catalog No. 022491237).

Without being limited by theory, circumferentially spaced regions of increased thickness (e.g., axially oriented ribs or sets of ribs) disposed on or protruding from a flexible thickness at or near a sealing zone can allow, and can limit, a certain degree of radial expansion of a circumference around the proximal region of the pipette tip, and/or segmental expansion of the proximal region of the pipette tip. Radial expansion and segmental expansion can allow for a secure, fluid tight sealing engagement of a pipette tip with different dispensers having disparate nozzle or barrel diameters. Radial and segmental expansion properties can be a result of circumferentially spaced alternating regions of thicker and thinner ribs, in some embodiments.

Certain flexible features described herein can reduce costs and injuries associated with repetitive motions, and increase efficiency, precision and accuracy of pipette tip use. For example, reducing the axial force required for engagement and/or disengagement of a pipette tip with a dispenser. Also, reducing the frequency of "touching off" can reduce the number of repetitive motions associated with using pipette tips.

The pipette tip proximal region 207 can have a wall thickness of about 0.005 inches to about 0.015 inches at or near the sealing zone (e.g., about 0.006, 0.007, 0.008, 0.009, 0.010, 0.011, 0.012, 0.013, 0.014 inches). In some embodiments, the proximal region comprises a wall thickness of about 0.008 inches to about 0.012 inches or about 0.009 inches to about 0.011 inches. The latter-referenced wall thickness is measured at a point of the proximal region where there are no ribs (e.g., a point between pipette ribs).

The pipette tip proximal region 207 can include ribs. In certain embodiments, the proximal region comprises a first set of axially extended pipette tip ribs and a second set of axially extended pipette tip ribs. Axially extended pipette tip ribs are longer in the direction of the pipette tip axis, where the axis extends from the center of the proximal region terminus cross section to the center of the distal region terminus cross section. Axially extended ribs are shorter in the radial, circumferential direction around the pipette tip. In certain embodiments, the longer length of axially extended ribs is parallel to the pipette tip axis. In some embodiments, the longer length of axially extended ribs is at an angle with respect to the pipette tip axis, which angle sometimes is between about zero to ten degrees from such axis.

One or more pipette tip ribs can be longer than other pipette tip ribs on a pipette tip. Ribs of the first set sometimes are longer than ribs of the second set, and in certain embodiments, ribs of the first set are shorter than ribs of the second set. In certain embodiments, the axial length of one or more ribs (e.g., all ribs) is substantially equal to the axial length of the proximal region.

Over-Nesting Pipette Tips

Figure 52:
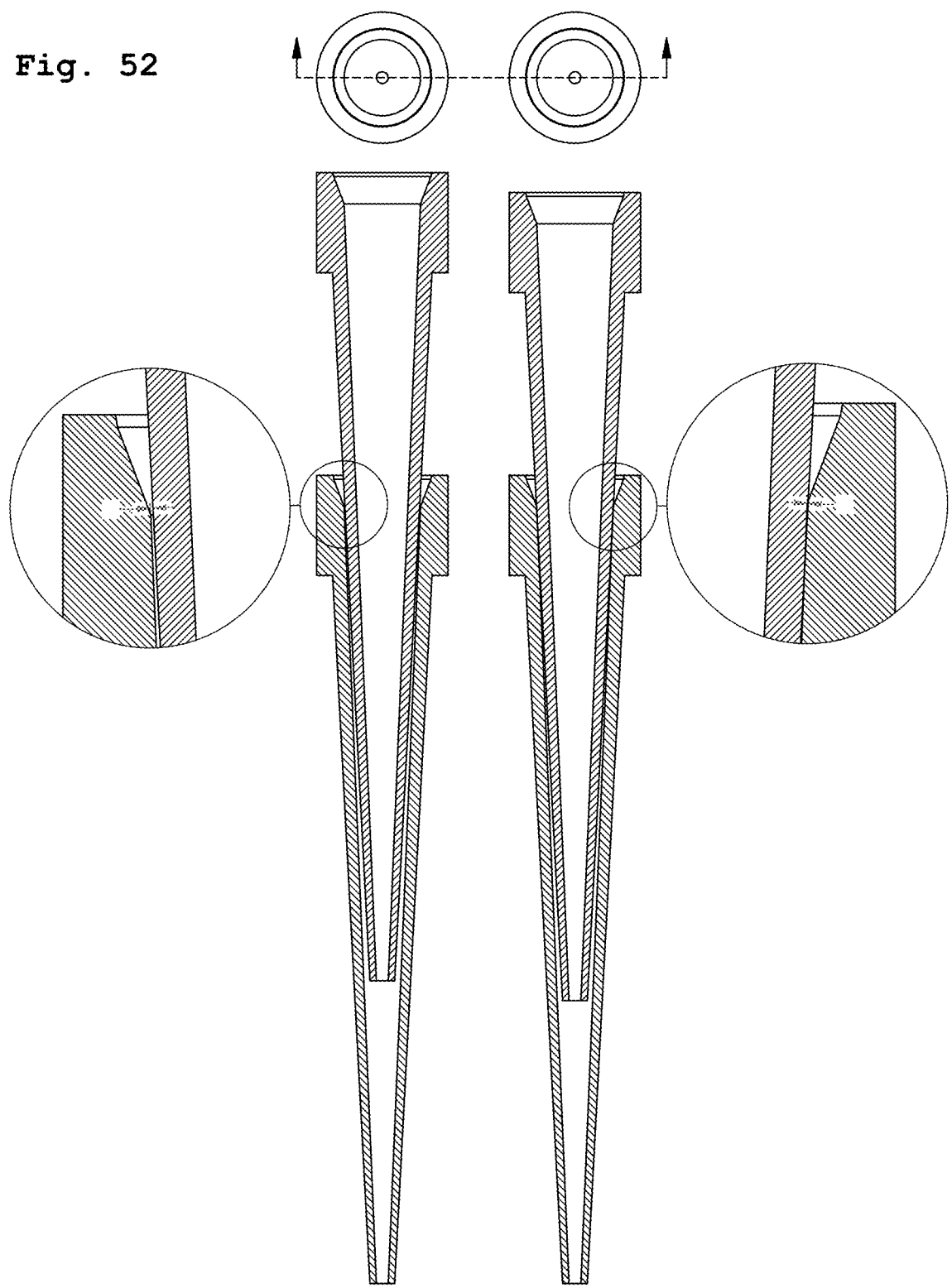
FIG. 52 shows an example of two nested pipette tips that are not over-nested (left) an example of two nested pipette tips that are over-nested (right).

Pipette tips are said to be nested when the distal region of a proximally-disposed (top) second pipette tip penetrates the plane of the proximal region of the distally disposed first pipette tip, where a portion of the distal region of the second pipette tip is inserted in the interior of the first pipette tip. The proximally-disposed pipette tip is said to be over-nested when a portion of an exterior wall of the distal region of the second pipette tip interferes with a portion of an interior surface of the of the first pipette tip. Such an interference can result in a retention force that adheres the first pipette tip to the second pipette tip, which retention force can prevent disassociation of the first pipette tip from the second pipette tip without application of a significant separation force. FIG. 52 shows an example of two nested pipette tips that are not over-nested (left) an example of two nested pipette tips that are over-nested (right). In some embodiments, the pipette tip is not over-nesting when the proximal region of the pipette tip includes a collar that extends from the pipette tip proximal terminus 203 to the pipette tip shoulder located at the junction between the distal region and the proximal region 206 and the pipette tips can be stacked directly on one another without the portion of an exterior wall of the distal region of the second pipette tip interfering with a portion of an interior surface of the of the first pipette tip Various pipette tip embodiments are described in more detail in U.S. Pat. No. 9,486,803, filed on Jan. 11, 2011, and entitled "PIPETTE TIPS", which is hereby incorporated by reference herein, in its entirety.

Rack Base

A nesting pipette tip rack assembly generally includes a rack base. The rack base is typically rectangular with four sidewalls, a proximal surface (top) and a distal surface (bottom), including longer sidewalls and shorter sidewalls. The corner made by the junction of a longer and a shorter sidewall can include a rack shorter sidewall to longer sidewall transition. The rack base proximal surface typically includes apertures to retain pipette tips extending from a pipette tip receptacle plate. The rack base proximal surface (top) can include orifices (e.g. a slot, to accept projections) and/or projections (e.g. a fastener, to accept orifices). The rack base bottom can include a rack distal flange foot to increase stability of the rack base. The rack base can include interior shorter and/or longer cross-members to increase stability of the rack base. The rack base can include more than one sidewall structure on a side, which can include ribs connecting the sidewall structures.

Pipette Tip Receptacle Plate

A pipette tip receptacle plate generally includes a proximal surface, a distal surface, and an array of bores extending from the proximal to the distal surface, where each bore in the array generally is configured to receive a pipette tip. An array can have any useful number of bores, which sometimes is a multiple of 96 bores (e.g., 96, 192, 288, 384, 576, 672, 768 or 1536). An array can be any suitable two-dimensional array, such as an X by Y array of bores, where X independently is about 2 to about 1,000 bores and Y independently is about 2 to about 1,000 bores (e.g., an 8 by 12 array; 16 by 24 array). An array of bores often includes a regularly spaced set of bores, where the longitudinal axis extending through each bore is spaced equally from other longitudinal axes (e.g., center-to-center distance of about 9 millimeters for 96 bore plates). A pipette tip receptacle plate can include a raised surface that encompasses some or all the pipette tip receptacle plate bores. Portions of a pipette tip typically reside above the plate, are co-extensive with the thickness of the plate, and reside below the plate. A pipette tip often includes a step that determines the amount of the pipette tip above the plate, and rests, in a bore within the plate.

The pipette tip receptacle plate is also referred to a "snap plate" from time to time, as in some embodiments, a plate can snap into the rack base by engaging certain types of projections, such as fasteners.

Projections and Orifices

In some embodiments, the pipette tip receptacle plate has one or more projections. A projection is an element that protrudes from the surface plane. In some embodiments, the pipette tip receptacle plate has one or more orifices. An orifice is an opening or an aperture defined by surrounding walls that may or may not receive a projection. Projections may or may not contact the walls of an orifice. In some embodiments, the projections include two or more projection members which are configured to deflect towards one another when a projection is inserted in an orifice.

Projections include, but are not limited to fasteners, collars, pins, posts and ribs. Projections can extend from either the proximal or distal surface of a pipette tip receptacle plate. In some embodiments, the projections mate a pipette tip receptacle plate with a rack base. In some embodiments, the distal termini of the projections of one pipette tip receptacle plate contact the surface of a proximal or distal pipette tip receptacle plate. In some embodiments, the projections increase the separation between pipette tip receptacle plates to preventing pipette tip over-nesting. In some embodiments, the proximal or distal pipette tip receptacle plate includes orifices that accept the projections.

In some embodiments, the projections are fasteners. Fasteners on the pipette tip receptacle plate and/or rack base can interact with an opposing orifice in any convenient arrangement, including without limitation, a slip fit, interference fit, snap fit, locked engagement, removable engagement, reversible engagement, releasable engagement and combinations thereof (e.g., locked engagement and reversible engagement). Any suitable fasteners on the pipette tip receptacle plate and/or rack base can be selected, such as projection-orifice fasteners (e.g., male-female fasteners), for example. Non-limiting examples of projection fasteners include tabs, pins, pegs, barbs, hooks, prongs and the like. A fastener can have any suitable profile, including without limitation, S-shape, J-shape, I-shape, W-shape, cross or X-shape and Y-shape profiles and the like. A fastener sometimes can include one or more terminal projections configured to effect an interference fit or snap-fit (e.g., barb, node, boss and the like), in some embodiments. A fastener can include a region of decreased thickness, and/or a region of increased thickness, and sometimes flexes in an area of decreased thickness. Non-limiting examples of orifices include apertures, slots, holes, bores, indentations, cross or X-shapes and the like, and fastener components generally are configured to mate with a counterpart orifice. For example, fasteners can mate with orifices to secure a pipette tip receptacle plate with a rack base.

A fastener can be in connection with any suitable portion of the pipette tip receptacle plate (e.g., pipette tip receptacle plate distal surface 148) and the rack base (e.g., rack recessed member proximal surface 130). A fastener can be in association with a rack base. In some embodiments, the fastener is on the proximal surface of the rack base.

A projection can be constructed from any suitable material. A projection sometimes is constructed from a moldable material and sometimes a polymer (e.g., plastic, thermoplastic). Non-limiting examples of moldable materials include polypropylene (PP), polyethylene (PE), high-density polyethylene (HDPE), low-density polyethylene (LDPE), polyethylene teraphthalate (PET), polyvinyl chloride (PVC), polytetrafluoroethylene (PTFE), polystyrene (PS), high-density polystyrene, acrylnitrile butadiene styrene copolymers, crosslinked polysiloxanes, polyurethanes, (meth)acrylate-based polymers, cellulose and cellulose derivatives, polycarbonates, ABS, tetrafluoroethylene polymers, corresponding copolymers, plastics with higher flow and lower viscosity or a combination of two or more of the foregoing, and the like. A projection can be constructed from the same material, or different material, as the nesting pipette tip rack assembly element to which the projection is connected. In some embodiments, a projection component is constructed from a material different than the material from which its orifice component counterpart is manufactured. A projection sometimes is manufactured from two or more materials in some embodiments.

Non-limiting examples of orifices include apertures, slots, holes, bores, indentations, cross or X-shapes and the like. In some embodiments, projection components are configured to mate with a counterpart orifice. In some embodiments, projection components are configured to lock with a counterpart orifice.

In some embodiments, a pipette tip receptacle plate has projections on its proximal surface or its distal surface. In some embodiments, a pipette tip receptacle plate has projections on its proximal surface or its distal surface and has orifices on the corresponding location on its distal or proximal surface. In some embodiments, a pipette tip receptacle plate has projections on its proximal surface or its distal surface and has orifices on the corresponding location on its distal or proximal surface and the projections of a pipette tip receptacle plate can engage one or more of the orifices of a proximally or distally disposed (stacked) pipette tip receptacle plate.

In some embodiments, a rack base has orifices on its proximal surface. In some embodiments, a rack base has projections on its proximal surface. In some embodiments, a pipette tip receptacle plate has projections on its distal surface and the rack base has orifices on the corresponding location on its proximal surface and the projections of a pipette tip receptacle plate can engage one or more of the orifices of the rack base. In some embodiments, a pipette tip receptacle plate has orifices on its distal surface and the rack base has projections on the corresponding location on its proximal surface and the orifices of a pipette tip receptacle plate can engage one or more of the projections of the rack base.

The relative location of the projections or orifice can be anywhere suitable on the proximal or distal surface of the pipette tip receptacle plate that does not interfere with pipette tip retention in the bores. In some embodiments, one or more projections or orifices are located near the edge of the pipette tip receptacle plate (along the perimeter). In some embodiments, the projections along the perimeter comprise fasteners.

In some embodiments, the projections or orifices are in association with pipette tip receptacle plate bores. "In association with" means that the spatial location of a feature is closer to other features, such as, the projection or orifice is closer to a specific bore than other features. In some embodiments, less than 90%, less than 80%, less than 70%, less than 60%, less than 50%, less than 40%, less than 30%, less than 20%, or less than 10% of the bores of a pipette tip receptacle plate are in association with a projections or orifices.

In some embodiments, the projections or orifices are located between pipette tip receptacle plate bores.

Figure 24:
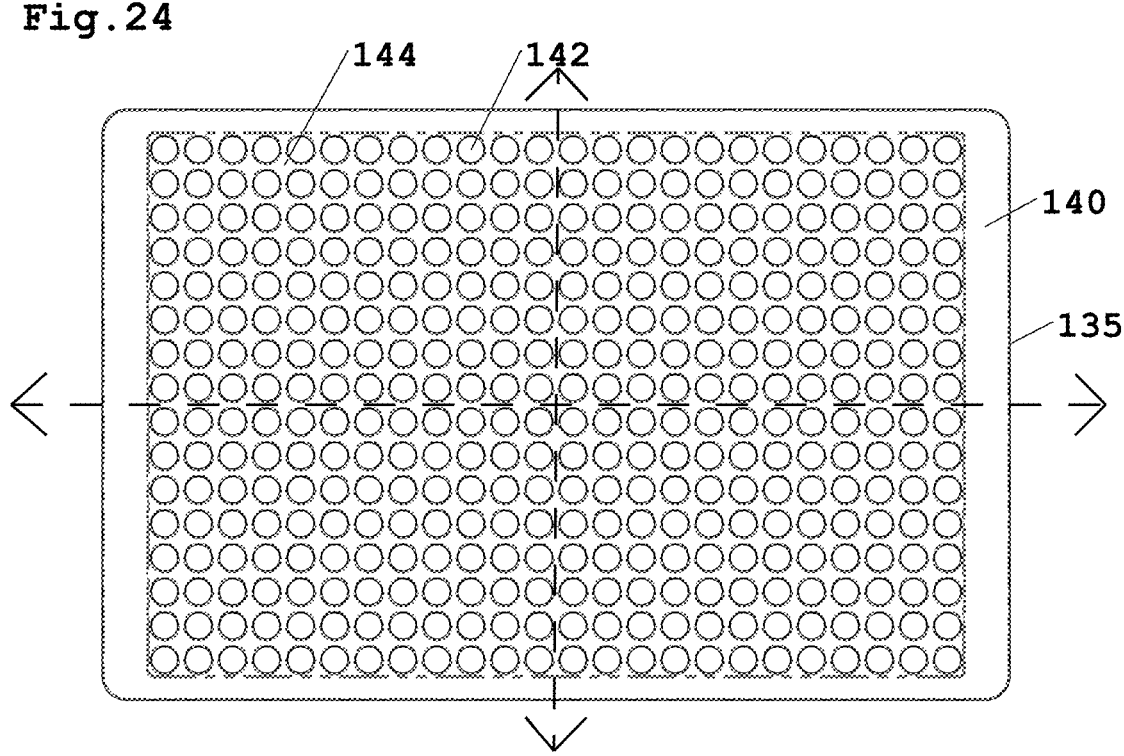
FIG. 24 is a top view thereof.

When the proximal surface of the pipette tip receptacle plate is viewed from the top, an imaginary grid of X and Y coordinates can be envisioned where the axes intersect at the center of the rectangular pipette tip receptacle plate (see X and Y axes shown in FIG. 24). In some embodiments, one or more projections or orifices are distributed on the receptacle plate parallel to the X axis or the Y axis. In some embodiments, the projections are located between pipette tip receptacle plate bores parallel to the X axis at a plurality of Y coordinates. In some embodiments, the projections are located between every pipette tip receptacle plate bore parallel to the X axis. In some embodiments, the projections are located between pipette tip receptacle plate bores parallel to the Y axis at a plurality of X coordinates. In some embodiments, the projections are located between every pipette tip receptacle plate bore parallel to the Y axis. In some embodiments, the projections are located between every pipette tip receptacle plate bore parallel to the X axis. The projections between bores can be ribs.

In some embodiments, the projections or orifices are spatially disposed in patterns. A pattern is a repeated or recurring design. For example, projections could be disposed at every eighth row, every fourth row, every second or every row of bores (see e.g. FIG. 29). The pattern can be symmetric or asymmetric.

Any suitable number of projections and, optionally, orifices may be utilized. In certain embodiments about 1 to about 100 projections or orifices can be utilized (e.g., about 2, 3, 4, 5, 6, 7, 8, 9, 10, 20, 30, 40, 50, 60, 70, 80, 90). The number of projections is equal to or fewer than the number of orifices in certain embodiments.

Sheets

In some embodiments, the pipette tip array includes a sheet configured to retain the array of pipette tips, comprising a first surface and a second surface. In some embodiments, the sheet includes an array of holes and each of the holes in the array of holes in the sheet has a diameter or an effective diameter. The diameter or the effective diameter is equal to, or substantially equal to, (i) an outer diameter of the pipette tip exterior surface, and/or (ii) the pipette tip proximal opening diameter. A sheet often is configured to retain the pipette tips with the center of the proximal opening of each pipette tip, and the center of the distal opening of each pipette tip, concentric with the center of each bore of a pipette tip receptacle plate.

Figure 45:
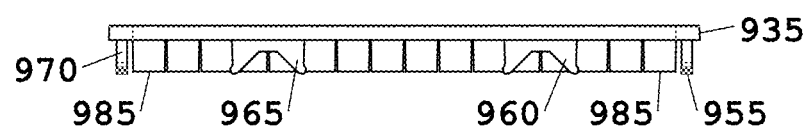
FIG. 45 is a shorter side view thereof.

The interior of each of the holes comprises an interior edge of the sheet that defines the interior edge of the hole, which is referred to herein as a "hole edge." Each hole edge sometimes is configured to contact a portion of an exterior surface of a pipette tip. In certain embodiments, each hole edge contacts an exterior surface of a pipette tip at (i) a portion of a pipette tip proximal region, (ii) a portion of a pipette tip distal region, or (iii) a junction between the proximal region and the distal region of a pipette tip (e.g., an example of embodiment (iii) is shown in FIG. 45). Circular holes in a sheet are defined by a diameter and non-circular holes in a sheet are defined by an effective diameter. An effective diameter of a non-circular hole is defined by the largest virtual circle that fits within the hole and does not extend beyond the hole perimeter.

Pipette tips sometimes are retained in a sheet by friction between the exterior wall of each of the pipette tips and the edge of each hole in contact with each pipette tip. An interior edge of a hole, or portion thereof, sometimes is configured to contact the pipette tip exterior surface by an interference fit. The edge of each of the holes comprises an adhesive in some embodiments, which can facilitate retention of pipette tips in the sheet, and in some embodiments, the edge of each of the holes does not include an adhesive.

In certain embodiments, a portion around each of the holes on the second surface of the sheet (i.e., bottom surface of the sheet) is configured to contact the proximal region terminus of each pipette tip. Pipette tips can be joined to the second surface of a sheet using any suitable method.

The portion around each of the holes on the second surface sometimes comprises an adhesive, which can facilitate retention of pipette tips in the sheet. In certain embodiments, a sheet includes an adhesive covering all or substantially all of the second surface, where the adhesive is any adhesive suitable for joining pipette tips to the second surface (e.g., contact adhesive). In some embodiments, pipette tips are joined to the second surface of the sheet not using an adhesive, and sometimes pipette tips are welded (e.g., sonically welded) to the second surface of a sheet.

For embodiments in which a proximal region terminus surface of a pipette tip is joined to a second surface of a sheet, the diameter or the effective diameter of each of the holes sometimes is less than, sometimes is equal to, or sometimes is greater than, the diameter of the pipette tip proximal opening (e.g., the outer diameter of the pipette tip proximal opening).

A sheet sometimes includes one or more voids, and sometimes a sheet includes holes for being in association with pipette tips and no voids. In some embodiments, a sheet includes one or more portions of reduced thickness on the first surface or the second surface, or the first surface and the second surface, and sometimes a sheet includes no regions of reduced thickness. A void or portion of reduced thickness, if present, sometimes is located between four "quadrilaterally" arranged holes in a sheet. Four "quadrilaterally" arranged holes are a group of four adjacent holes in which the center of each hole coincides with each point of a virtual quadrilateral superimposed over the holes. The virtual quadrilateral can be any suitable quadrilateral, which often is a square, sometimes is a rectangle, and at times is a trapezoid, rhombus or parallelogram. Four "quadrilaterally" arranged holes typically define a cross point at the intersection of two virtual lines, where each virtual line intersects the centers of two diagonal holes. The center of a void or a portion of reduced thickness sometimes coincides with such a cross point. This cross point also is located in the same manner for "quadrilaterally arranged pipette tip proximal openings" addressed herein. For embodiments in which a sheet includes voids, the sheet sometimes is netted (e.g., the sheet is or includes a netting; the sheet is or includes a net) and/or the sheet sometimes is webbed (e.g., the sheet is or includes a webbing; the sheet is or includes a web). Without being limited by theory, an interference fit between edges of a hole, or portions thereof, with a pipette tip, can cause stress in the sheet around the hole and can deform the sheet. Inclusion of voids in a sheet can relieve such stress and allow a sheet to remain flat, or substantially flat, when holes in the sheet retain pipette tips by an interference fit.

In some embodiments, a sheet provided for association with pipette tips sometimes does not include holes. Such a sheet sometimes is a continuous sheet (e.g., a sheet having a surface not interrupted by holes or voids (e.g., a foil sheet without holes or voids); a sheet not including perforations; a sheet not including slits), sometimes is not a continuous sheet, sometimes includes voids (e.g., voids not concentric with pipette tip openings (described herein)), sometimes does not include voids, sometimes is a netting (e.g., a net or web), and sometimes is not a netting. In some embodiments, a second surface of a sheet that does not include holes for association with pipette tips is joined to the proximal terminus of pipette tips in an array of pipette tips. In such embodiments, the sheet often is configured to be pierced by nozzles that engage pipette tips in the array. In certain embodiments, a sheet that does not include holes for association with pipette tips is configured to be pierced, to receive the exterior wall of pipette tips in an array of pipette tips, and to retain pipette tips in the array.

A sheet that does not include holes in association with pipette tips sometimes includes regions of reduced thickness, where such regions often are located at portions of the sheet that (i) are pierced by a pipette tip, or (ii) are pierced by a nozzle of a fluid dispensing device. Such regions of reduced thickness often are of a thickness that permits piercing by a pipette tip or fluid dispensing device using commercially available processes.

A sheet that does not include holes in association with pipette tips sometimes includes a punch-through structure configured to (i) receive a nozzle of a fluid dispensing device, or (ii) receive a pipette tip.

A sheet sometimes includes a polymer and/or is manufactured from a polymer material. Non-limiting examples of polymers include low density polyethylene (LDPE), high-density polyethylene (HDPE), polypropylene (PP), polyester (PE), high impact polystyrene (HIPS), polyvinyl chloride (PVC), amorphous polyethylene terephthalate (APET), polycarbonate (PC) and the like. A sheet sometimes comprises or is manufactured from a metal (e.g., aluminum; aluminum foil (e.g., aluminum foil comprising adhesive on one surface (e.g., contact adhesive on one surface)) and other materials.

A sheet sometimes includes an electrically conductive material, which can be any suitable material that can contain movable electric charges. A sheet sometimes includes one or more antimicrobial materials (also referred to as "antimicrobial substances").

Sheets are described in U.S. Patent Publication No. US-2016-0167041-A1, filed on May 14, 2015, and entitled "STATIC-DEFEATING APPARATUS FOR PIPETTE TIPS", which is hereby incorporated by reference herein, in its entirety.

Nested Pipette Tip Array Assembly Lid

In some embodiments a nested pipette tip array assembly includes a lid having lid sidewalls and a lid proximal surface. In some embodiments a nested pipette tip array lid comprises four lid sidewalls arranged in a substantially rectangular configuration. In some embodiments, the nested pipette tip array lid is configured to engage a rack base. In some embodiments, the nested pipette tip array assembly lid is configured to engage a pipette tip receptacle plate.

In some embodiments, the nested pipette tip array assembly lid can include anti-static features. In certain embodiments, the pipette tips or portions thereof, are in contact with an electrically conductive member, which is in communication with the exterior of the nested pipette tip array. This contact may allow the static charge from the pipette tips to be discharged. In some embodiments, an electrically conductive member, or portion thereof, is in direct, indirect, and/or in effective communication with the pipette tips, which can ultimately aid in discharging the static charge from pipette tips. An electrically conductive member, or portions thereof, may be in effective communication with an element of the nested pipette tip array and be in effective communication with the exterior of the nested pipette tip array assembly.

In some embodiments, the nested pipette tip array assembly lid can comprise an electrically conductive material (e.g., contain a certain percentage of a conductive material (e.g., carbon)), and/or an electrically conductive material (e.g., a metal foil) can be adhered to an inner surface of the nested pipette tip array assembly lid top such that the conductive material is in contact with the top surface of pipette tips.

In certain embodiments, the top of a nested pipette tip array assembly lid includes a pliant material in effective contact with an interior surface of the lid that can ensure the conductive member is in contact with all, or substantially all, pipette tips in the proximal most pipette tip receptacle plate or with a push plate. Such a pliant material can apply pressure to top of pipette tips (when inside the lid), thereby immobilizing tips. For example, about 2 to about 0.0001 Pa of pressure can be applied to pipette tips by a pliant member (e.g., 2-1.5 Pa, 1.75-1.25 Pa, 1.5-1.0 Pa, 1.25-0.75 Pa, 1.0-0.5 Pa, 0.75-0.25 Pa, 0.5-0.01 Pa, 0.25-0.005 Pa or 0.01-0.0001 Pa of pressure may be applied to the pipette tips by a pliant member). The term "pliant material" and "pliant member" as used herein refers to an article that can deform, be molded, change shape, be influenced by or modified by another material, and the like. In certain embodiments, pliant or moldable materials may have anti-static properties or may contain anti-static additives.

An electrically conductive member can comprise pliant material in some embodiments. An electrically conductive member may be an elastomeric material in certain embodiments. Non-limiting examples of electrically conductive elastomers are described, for example, in International Patent Application Publication No. WO 2006/133440, entitled "Entitled Electrically Conductive Metal Impregnated Elastomer Materials And Methods Of Forming Electrically Conductive Metal Impregnated Elastomer Materials."

Suitable metal salts for impregnating elastomeric materials often are soluble in the elastomeric precursor during formation of the elastomer and are reducible to metals when exposed to one or more suitable chemical reducing agents. The metal salts can include any metals that are suitably conductive and/or have suitable magnetic properties including, without limitation, salts of platinum, silver, palladium, gold, copper and iron.

In certain embodiments, a pliant member may be separately manufactured and placed in effective communication with an electrically conductive member, for example. A pliant member may be affixed directly or via adhesive, or have another component between (e.g., insulation layer), in some embodiments. Examples of pliant materials and members include but are not limited to polymers and foams. Any suitable material can be used to construct the pliant member, including, without limitation, materials having a hardness grade from 35 Shore A to 50 Shore D.

In certain embodiments, the nested pipette tip array assembly comprises an electrically conductive member and/or a pliant material in effective connection with the pipette tips. In some embodiments, the nested pipette tip array assembly or a component of the nested pipette tip array assembly (e.g., snap plate), comprises an electrically conductive material (e.g., is manufactured from an electrically conductive material). A pliant material may be in effective contact with an electrically conductive member. The electrically conductive member may comprise the pliant material. The nested pipette tip array assembly and the lid may comprise an electrically conductive member, and in some embodiments, the rack and lid comprise an electrically conductive material such that the rack and lid are electrically conductive. The nested pipette tip array assembly and the lid may comprise a pliant material in effective connection with the pipette tips. The pliant material may be in effective contact with the electrically conductive member. The electrically conductive member may comprise the pliant material or combinations thereof.

In some embodiments, the lid comprises an aperture that exposes a portion of an electrically conductive member. The nested pipette tip array assembly may also comprise an aperture that exposes a portion of an electrically conductive member. The rack and the lid also may comprise an aperture that exposes a portion of an electrically conductive member. A portion of an electrically conductive member may extend to the exterior of the nested pipette tip array assembly, extend through the lid, is in effective connection with an exterior surface of the lid, extend through the nested pipette tip array assembly, and/or is in connection with an exterior surface of the nested pipette tip array assembly, in some embodiments.

In certain embodiments, an electrically conductive material is in the form of a film which may form a pouch having an interior space (e.g., an air bladder, air pillow or air bag) and optionally may contain a pliant material within the interior space. A pliant material sometimes is a foam, such as a closed-cell polyurethane foam in certain embodiments. In certain embodiments a pliant material sometimes is an open-cell foam (e.g., polyurethane or other suitable open-cell foam). In some embodiments, the pouch comprises a support material within the interior space. The support material can function as shape stabilizer for the pliant material. In certain embodiments, a pliant material can deform extensively, and optional use of a shape stabilizer can retain the shape of the pliant material. A support material sometimes is formed from a rigid or semi-rigid material, such as a die-cut corrugated pad in certain embodiments. In certain embodiments, the pouch does not have openings. In some embodiments, the pouch is formed from a tube-shaped structure of the film having two openings that are optionally sealed. The openings may be sealed by any method known, for example, such as by an impulse heat sealer in some embodiments.

In some embodiments, an electrically conductive member of a nested pipette tip array assembly is in effective connection with an electrically conductive tab. A user can contact the tab (e.g., contact the tab with a grounded object (e.g., a wire, finger of the user), and discharge static electricity from the nested pipette tip array assembly and/or pipette tips stored therein via the tab. One or more tabs may be in contact with one or more electrically conductive nested pipette tip array assembly component.

Substantially immobilizing pipette tips in pipette tip receptacle plates can significantly reduce the amount of electrical charge (e.g., static charge) accumulated on or in pipette tips. Substantial immobilization may be accomplished in part or in full by directly contacting tops of pipette tips with the inner surface of a lid top, where the lid top applies downward pressure onto the proximal portion or top of the pipette tips (e.g., along the vertical axis of the tips.

Substantial immobilization also may be accomplished in part by effectively contacting the pipette tips in a pipette tip receptacle plate with a pliant material that deforms against the tips, exerts pressure on the tips and reduces tip movement in the vertical direction, horizontal direction or horizontal and vertical directions. In certain embodiments, the pipette tips in a pipette tip receptacle plate may be in contact with a "pillow" affixed to the inner surface of the lid.

Methods for manufacturing components comprising an anti-static member are described in U.S. Pat. No. 8,470,265, filed on Jan. 22, 2010, and entitled "ANTI-STATIC PIPETTE TIP TRAYS", which is hereby incorporated by reference herein, in its entirety.

Examples of Nested Pipette Tip Rack Assembly Features

Certain non-limiting features for particular nested pipette tip rack assemblies are shown in the drawings. The figures show tray embodiments that include 384 bores configured to receive pipette tips, and it is understood that the number of bores can be readily altered (e.g., trays having 96, 192, 288, 576, 672, 768 or 1536 bores). It is also understood that certain projection features described herein can engage a pipette tip receptacle plate with another pipette tip receptacle plate or a rack base in pipette tip rack assembly embodiments.

Figure 3:
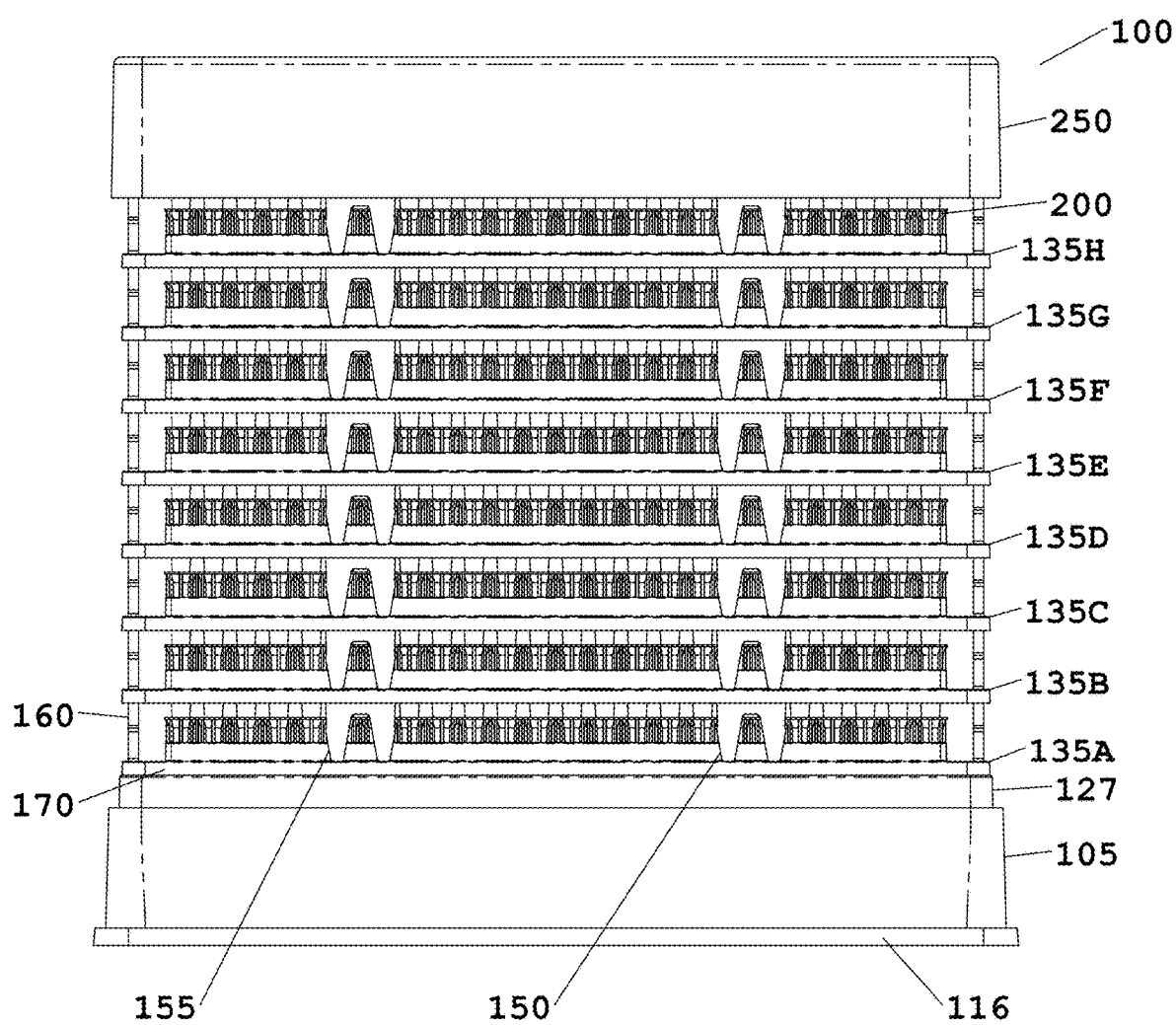
FIG. 3 is a longer side view thereof.
Figure 4:
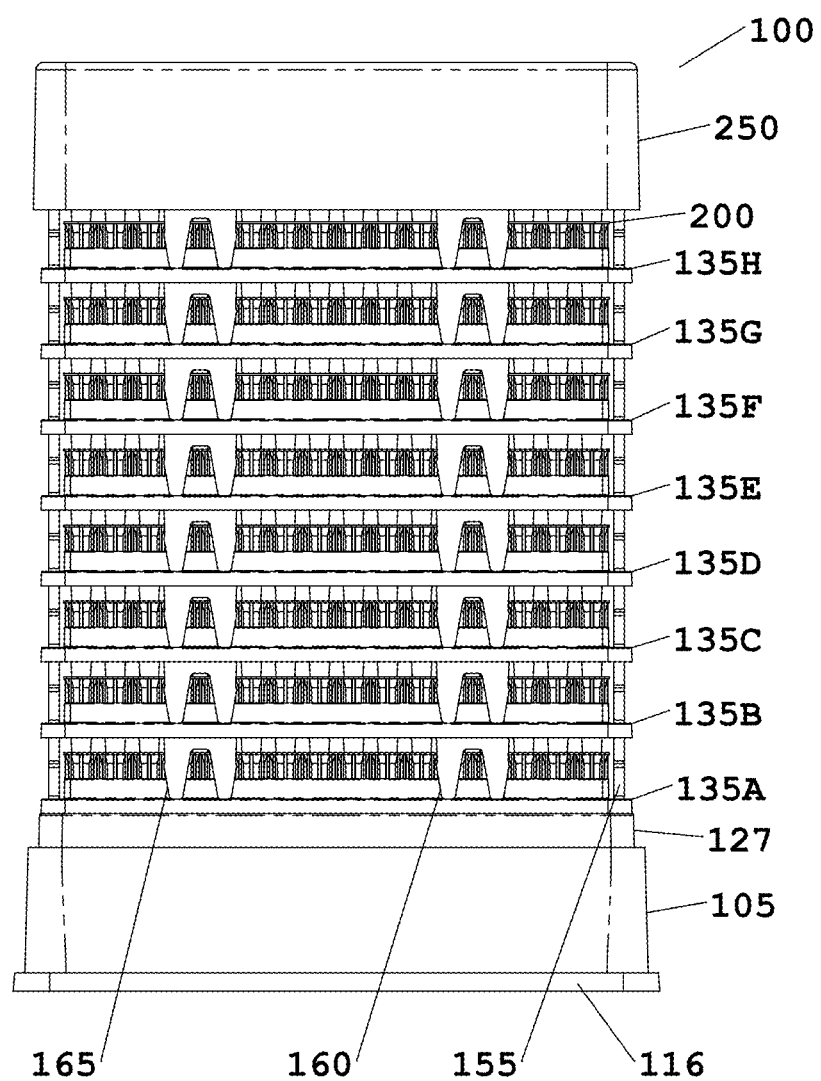
FIG. 4 is a shorter side view thereof.
Figure 5:
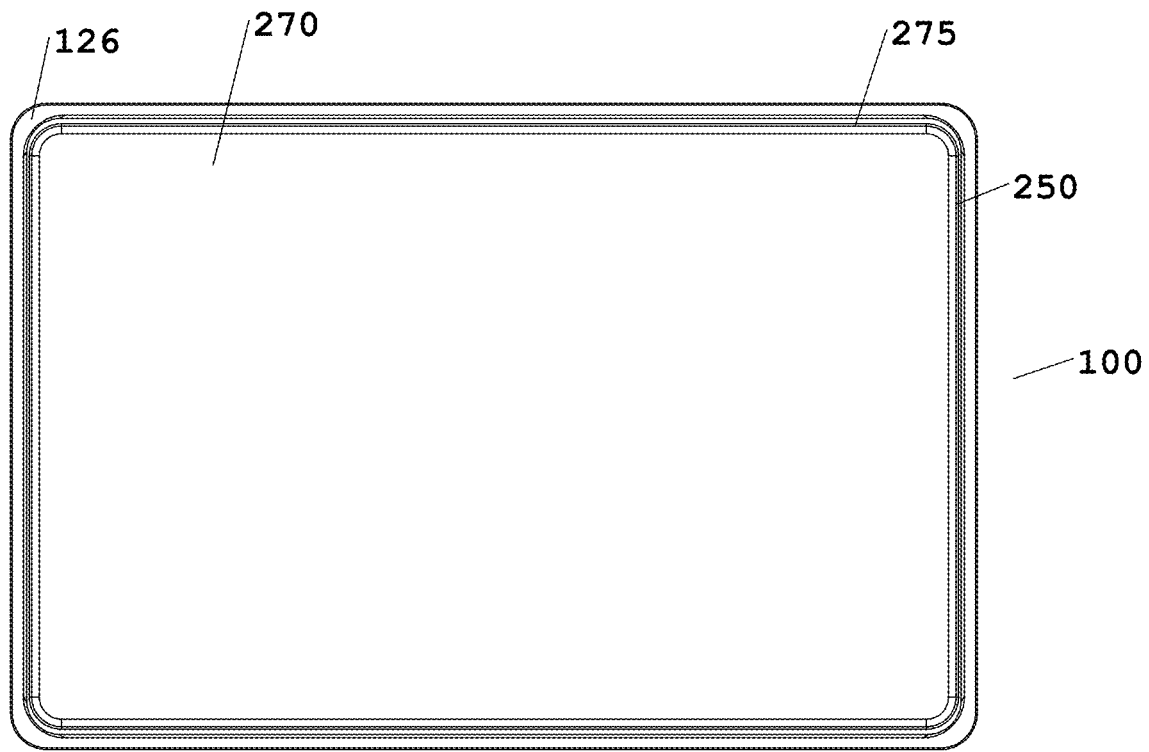
FIG. 5 is a top view thereof.

FIG. 1 shows a top perspective view of a pipette tip rack assembly embodiment 100, and FIG. 2 is an exploded view thereof. FIG. 3 shows a lateral view of the longer side of a pipette tip rack assembly embodiment 100 and FIG. 4 shows a lateral view of the shorter side of a pipette tip rack assembly embodiment 100. FIG. 5 shows a top view side of a pipette tip rack assembly embodiment 100. The pipette tip rack assembly embodiment 100 includes a rack base 105 that includes a rack longer sidewall 110 and a rack shorter sidewall 114. Each corner of the tack base 105 includes a rack shorter sidewall to longer sidewall transition 115. The rack base 105 includes a rack distal flange 116 that extends laterally from the distal (bottom) surface of the rack base 105 and includes a rack distal flange top surface 116. The rack base 105 includes a step between rack sidewall 110, 114 and recessed sidewall 126 providing a rack recessed member 127, which includes rack recessed member longer sidewalls 128 and rack recessed shorter sidewalls 129, to accommodate a lid or other feature configured to fit over the rack recessed member proximal surface 130 of the rack base 105. The rack base includes a plurality of orifices such as a slot in rack recessed member proximal surface 131A-131H. The orifices can accommodate a projection extending from the distal surface of a member proximal to the rack recessed member proximal surface 130. The rack base 105 includes a rack interior sidewall 132. The rack base 105 can include cross-members to add support and stability and can include one or more rack interior shorter cross-members 133 or one or more rack interior longer cross-members 134, or one or more of both as shown in the drawing.

The pipette tip rack assembly embodiment 100 includes a plurality of pipette tip receptacle plates 135A-135I, each pipette tip receptacle plate 135 includes a pipette tip receptacle plate edge 137, a pipette tip receptacle plate proximal surface 140, a pipette tip receptacle plate distal surface 148, and a plurality of bores (pipette tip receptacle plate aperture; bore opening. 142, 142A, 142B, 142C, 142D). The pipette tip receptacle plates 135A-135I can include a pipette tip receptacle plate raised surface 144 to provide additional support to the inserted pipette tips such as shown in the drawing. The pipette tip receptacle plates 135A-135I can include a plurality of pipette tip receptacle plate projections

150, 155, 160, 165. In some embodiments, the projections can be fasteners that include projection prongs 151, 152 extending from a projection body 153, the external outline of which comprises a projection body perimeter 154. Each projection prong 151, 152 has a projection distal surface 156, 157, that, in some embodiments, can contact the proximal surface of a distally disposed pipette tip receptacle plate 135A-135I, or orifices thereon, or orifices on the rack recessed member proximal surface 130 such as a slot in rack recessed member proximal surface 131A-131H.

The pipette tip rack assembly embodiment 100 includes a pipette tips array 210 in each pipette tip receptacle plate 135A-135I. Each pipette tip 200 in the a pipette tips array 210 includes a pipette tip distal terminus 202, a pipette tip proximal terminus 203, a pipette tip distal region 204, a pipette tip flange 205 that can form a seal when engaged with a pipettor, a pipette tip proximal region 207, and a pipette tip shoulder located at the junction between distal region and proximal region 206 that allows the pipette tip 200 to be retained in the pipette tip receptacle plate aperture; bore opening. 142, 142A, 142B, 142C, 142D without forming an interference fit. In some embodiments, the pipette tip proximal region 207 includes pipette tip ribs 208 that can improve the seal with the pipettor.

The pipette tip array 210 can be attached to a sheet 220A, 220B, which includes a sheet proximal surface 225, a sheet distal surface 235, and sheet apertures 230 that are within the region of the proximal end opening of each pipette tip and each aperture comprises a diameter less than the proximal end opening of each pipette tip.

The pipette tip rack assembly embodiment 100 includes a lid 250 having a lid longer sidewall 255, a lid shorter sidewall 260, a lid shorter sidewall to longer sidewall transition 265, a lid top 270, and a lid sidewall to top transition 275.

Figure 6:
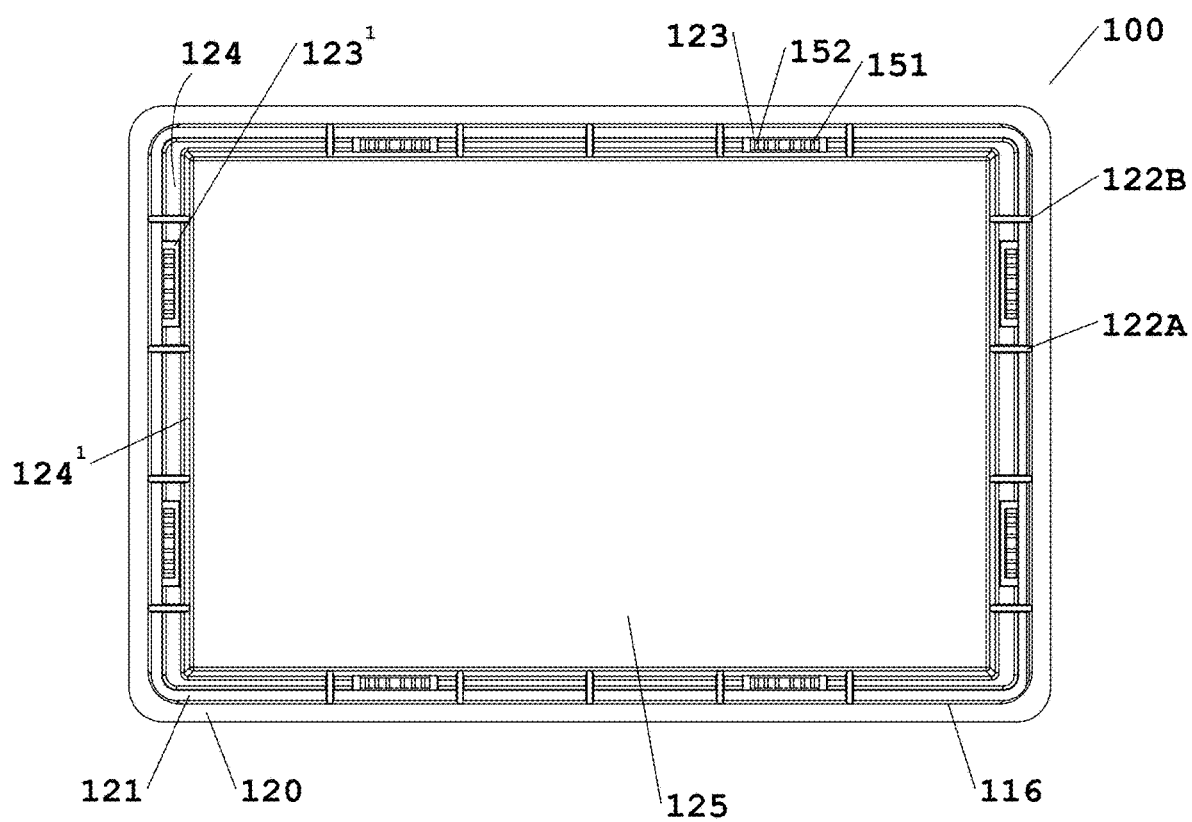
FIG. 6 is a bottom view thereof.
Figure 7:
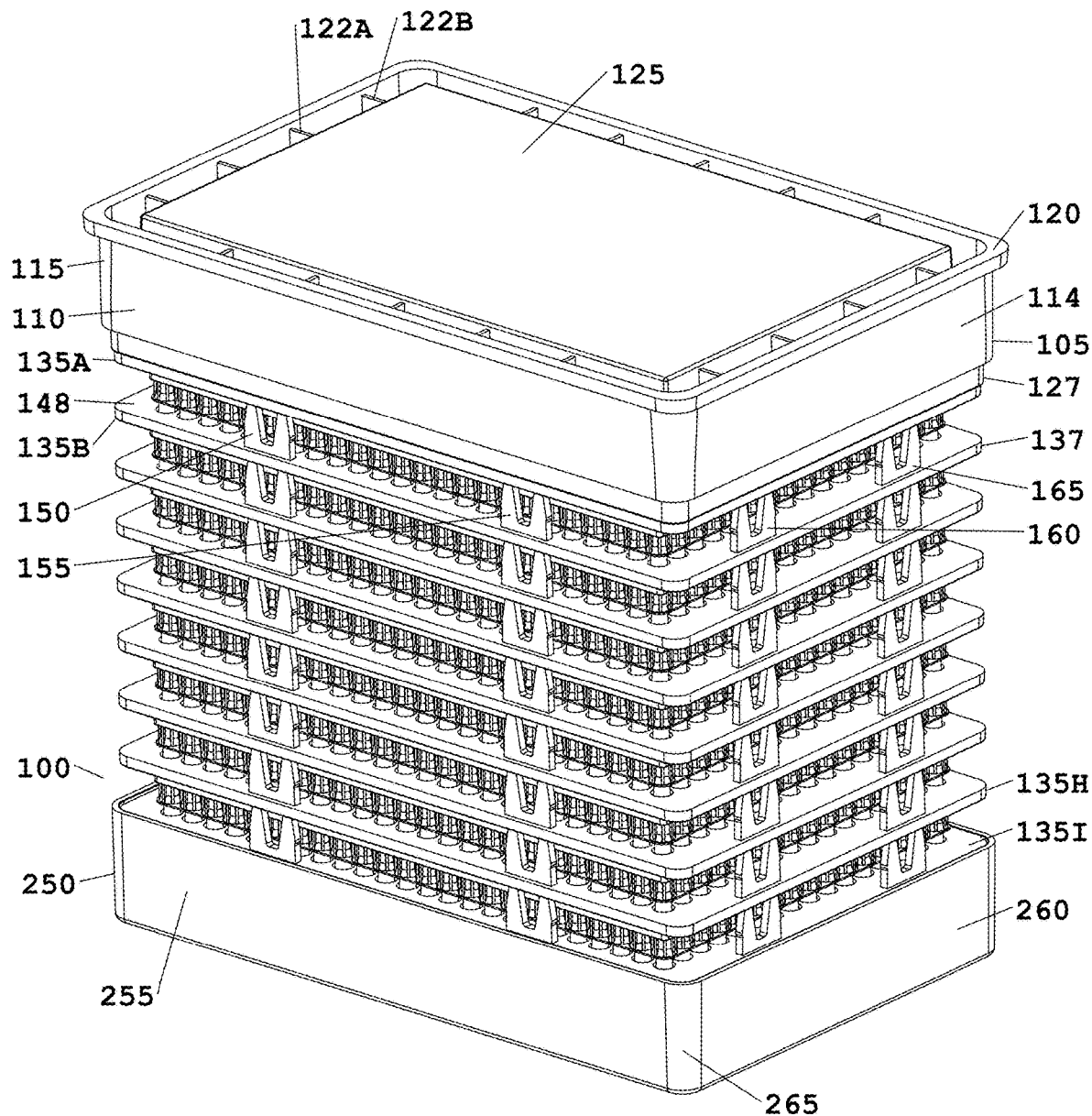
FIG. 7 is a bottom perspective view thereof.

FIG. 6 shows a bottom view of the pipette tip array assembly embodiment 100, and FIG. 7 is a bottom perspective view thereof. The rack base 105 includes a rack bottom 125, a rack distal flange foot 120, and a void between the rack distal flange foot and internal wall 121. The rack base 105 can include a plurality of rack distal ribs 122A, 122B bridging the void between rack bottom and interior wall 124-1 and connecting the rack interior wall 124 with a rack longer sidewall 110 or rack shorter sidewall 114. The rack distal aperture 123 is an orifice formed by walls by the rack distal aperture surround 123-1 that, in some embodiments, can accept a fastener, such as the projection prongs 151, 152 as shown in the drawing.

Packaging

In some embodiments, the nested pipette tip array assembly is packaged in a bag so that the user can dispense one or more pipette tip receptacle plates with arrays of tips and maintain the remainder of the arrays of pipette tips in a clean and sterile environment. Typically the bag has four side panels and a bottom. The bag can be made of any suitable material, such as paper, plastic and the like. In some embodiments, the bag is transparent or translucent. In some embodiments, the bag is resealable.

Examples of Bag Packaging

Figure 8:
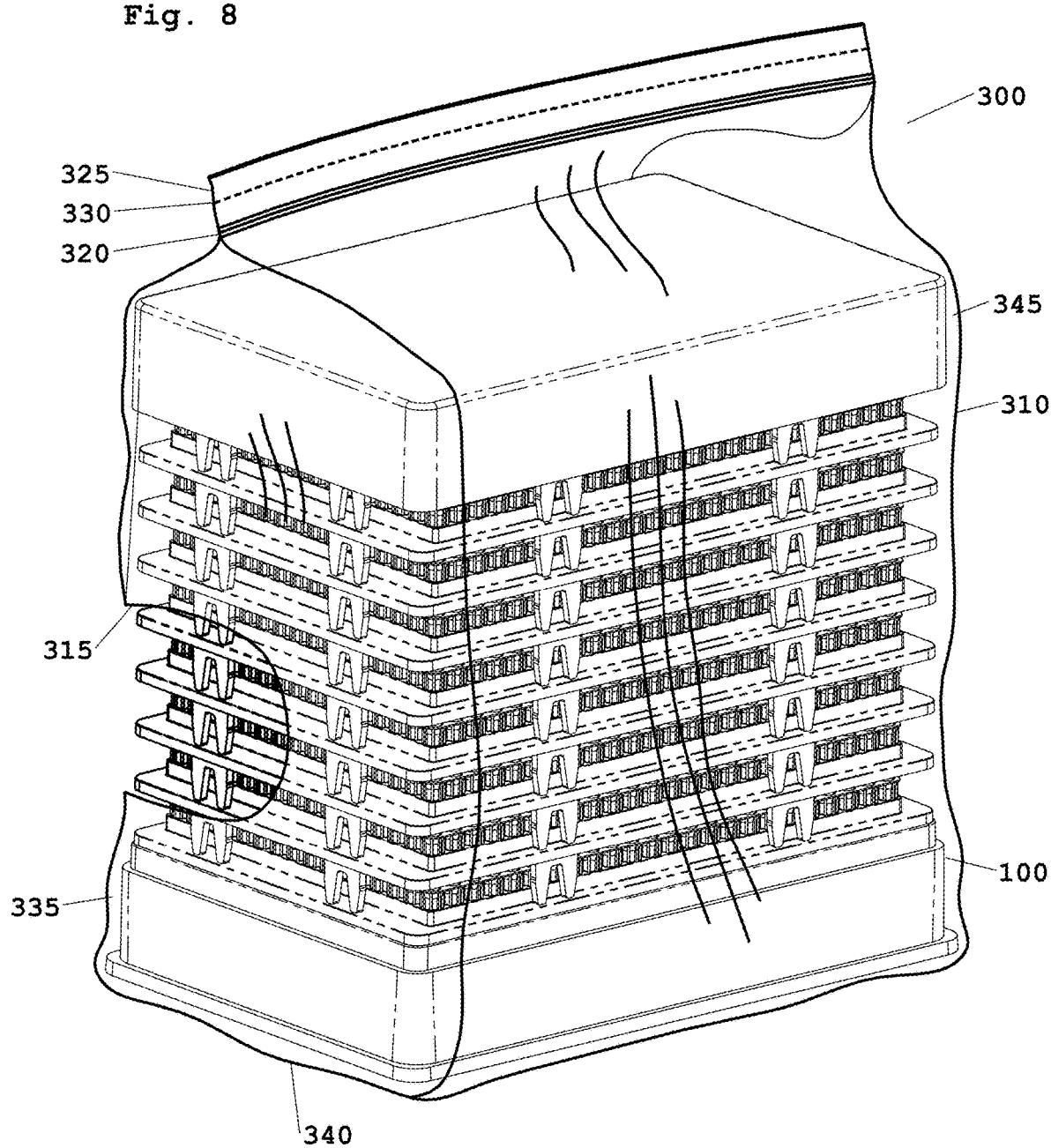
FIG. 8 is a top perspective view of a packaged nested pipette tip array assembly embodiment 300.
Figure 10:
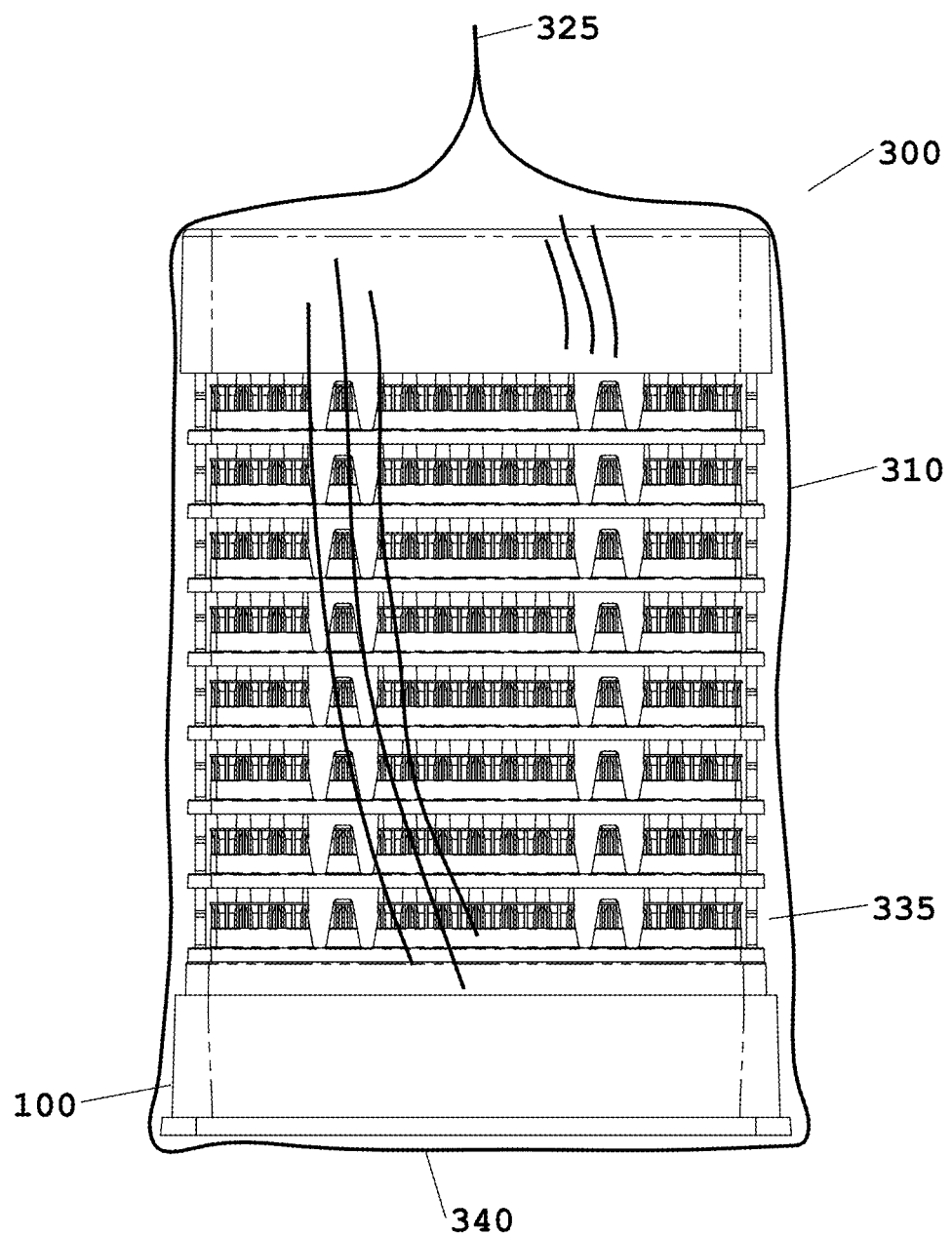
FIG. 10 is a shorter side view thereof.
Figure 11:
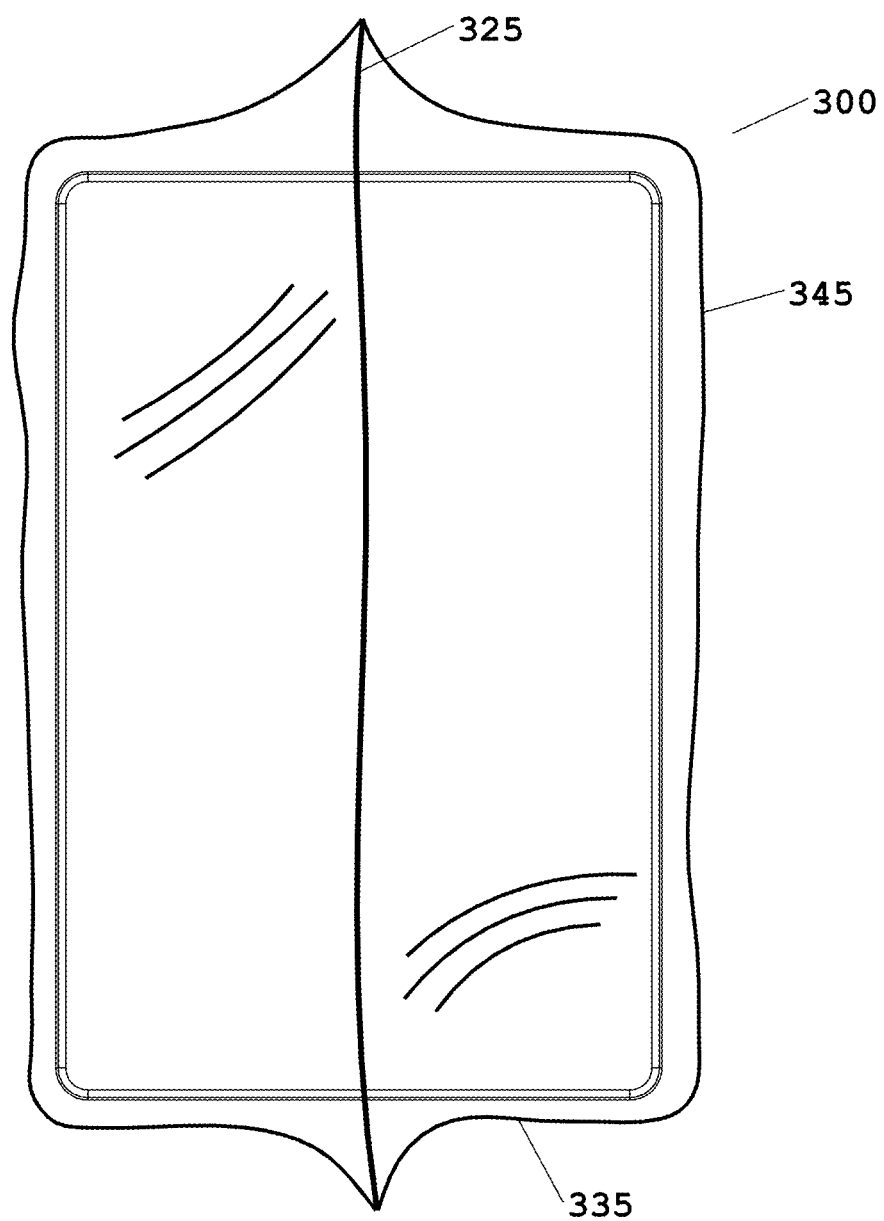
FIG. 11 is a top view thereof.
Figure 12:
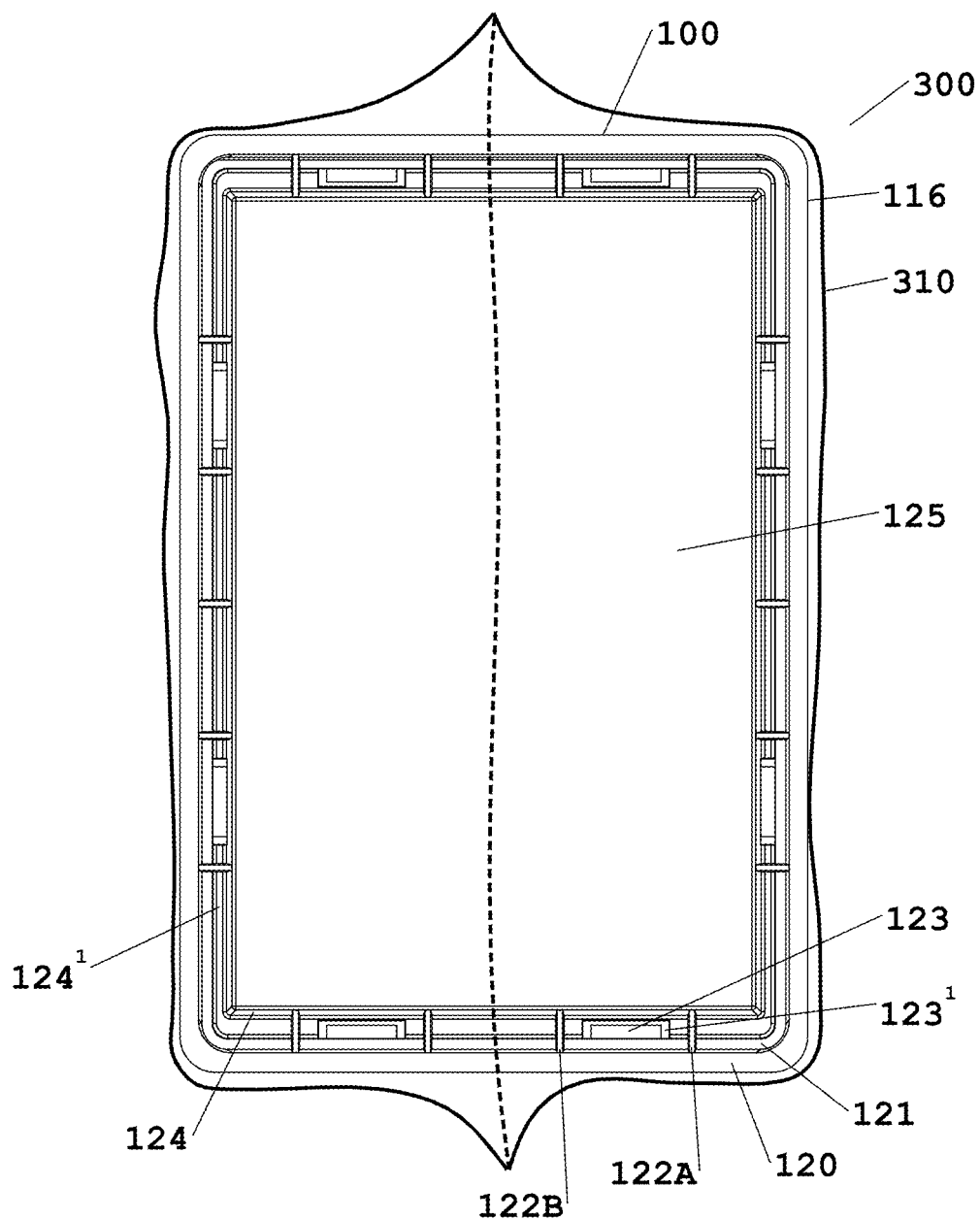
FIG. 12 is a bottom view thereof.

FIG. 8 shows a top perspective view of a packaged nested pipette tip array assembly embodiment 300, FIG. 9 is a longer side view thereof, FIG. 10 is a shorter side view thereof, FIG. 11 is a top view thereof, and FIG. 12 is a bottom view thereof. FIG. 8 shows a package virtual cutout 315, showing the nested pipette tip array assembly embodiment 100 within the bag. The flexible package 310 has a package shorter side panel 335, a package longer side panel 345, a package bottom member 340. The flexible package 310 includes a package seal 320, which maintains cleanliness and sterility during shipment and storage. The flexible package 310 includes a package tear member 330 and a package tab 325, allowing a user to open the bag by pulling on the package tab 325 to tear open the bag at the package tear member 330. After opening the bag, the user can reclose the bag by rejoining the package seal 320.

Rigid Packaging

In some embodiments, the nested pipette tip array assembly is packaged in a rigid package. Generally, the rigid package has four sidewalls and a base. In some embodiments, the sidewalls include cutouts to allow access to the stacks of the pipette tip receptacle plates and/or to the rack base. In some embodiments, the rigid package includes a plurality of nested pipette tip array assemblies. In some embodiments, the rigid package includes a lid or cover. The rigid package can be made of any suitable material, such as paper, cardboard, plastic or the like. In some embodiments, the rigid package is transparent or translucent.

Examples of Rigid Packaging

Figure 13:
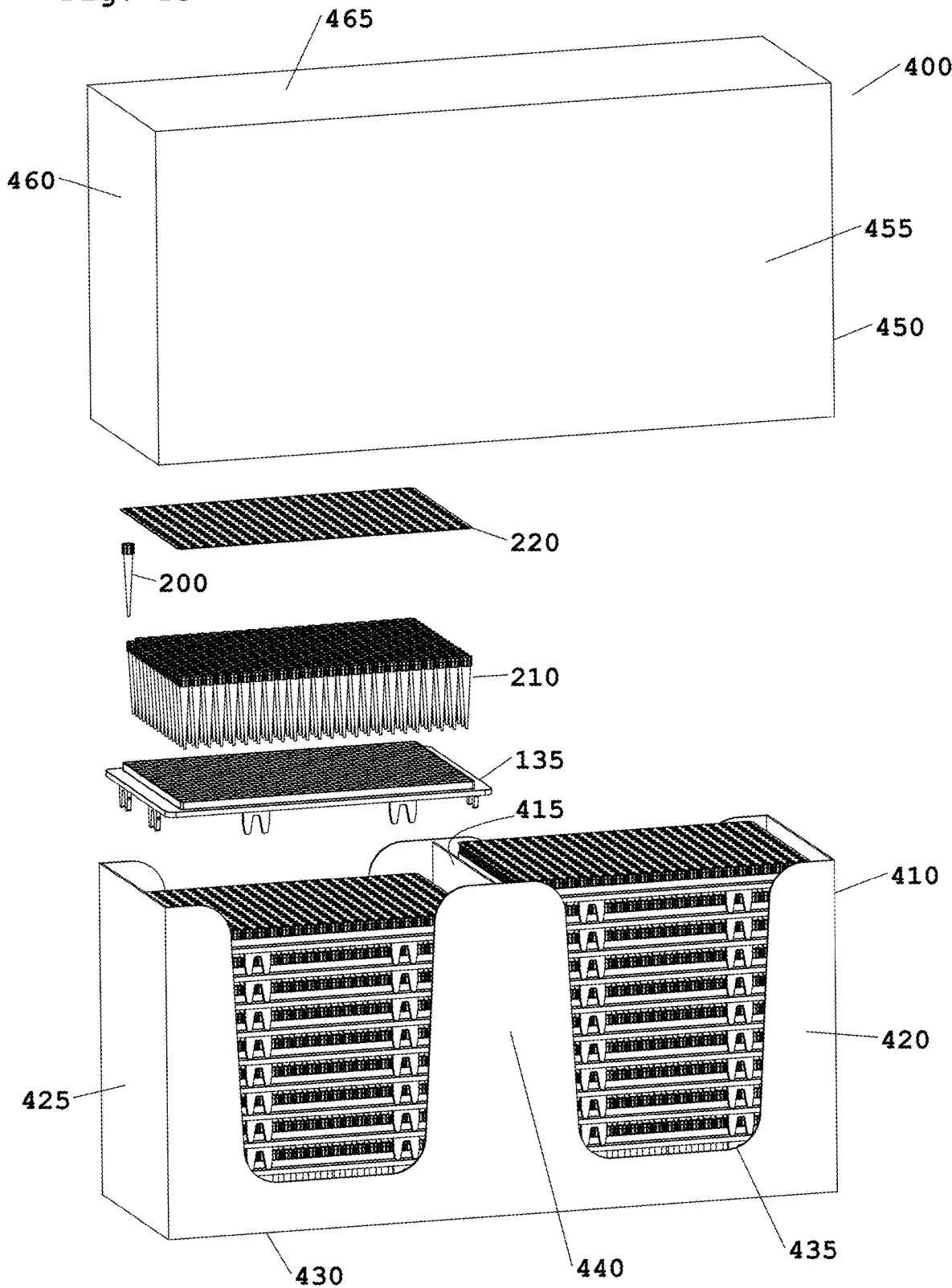
FIG. 13 is a top perspective and exploded view of a packaged nested pipette tip array assembly embodiment 400.

FIG. 13 shows a top perspective and exploded view of a packaged nested pipette tip array assembly embodiment 400 that includes two nested pipette tip array assemblies 100. The packaged nested pipette tip array assembly embodiment 400 includes a rigid package 410, package internal divider 415 that separates the nested pipette tip array assemblies 100, package longer sidewall 420, package shorter sidewall 425, and package bottom 430. The packaged nested pipette tip array assembly embodiment 400 includes a package cutout 435 to allow access to the sides of the pipette tip receptacle plates 135. The packaged nested pipette tip array assembly embodiment 400 includes a package sidewall adjacent to internal divider to provide support to the package internal divider 415. The packaged nested pipette tip array assembly embodiment 400 includes package lid 450 that includes a package lid longer sidewall 455, a package lid shorter sidewall 460, and a package lid top 485.

Projections to Prevent Over-Nesting

In some embodiments, projections extending from the pipette tip receptacle plate reduce or prevent pipette tip over-nesting by maintaining a distance between nested pipette tips that is greater than the distance between nested pipette tips when the pipette tips are directly stacked upon another. In some embodiments, the projections (i) when distally disposed on a pipette tip receptacle plate contact the proximal surface of the distal pipette tip receptacle plate, or (ii) when proximally disposed on a pipette tip receptacle plate contact the distal surface of the proximal pipette tip receptacle plate. In some embodiments, the contacted surface of the pipette tip receptacle plate includes an orifice with walls defining the orifice that engages the corresponding projection.

Examples of Projections to Prevent Over-Nesting

Figure 14:
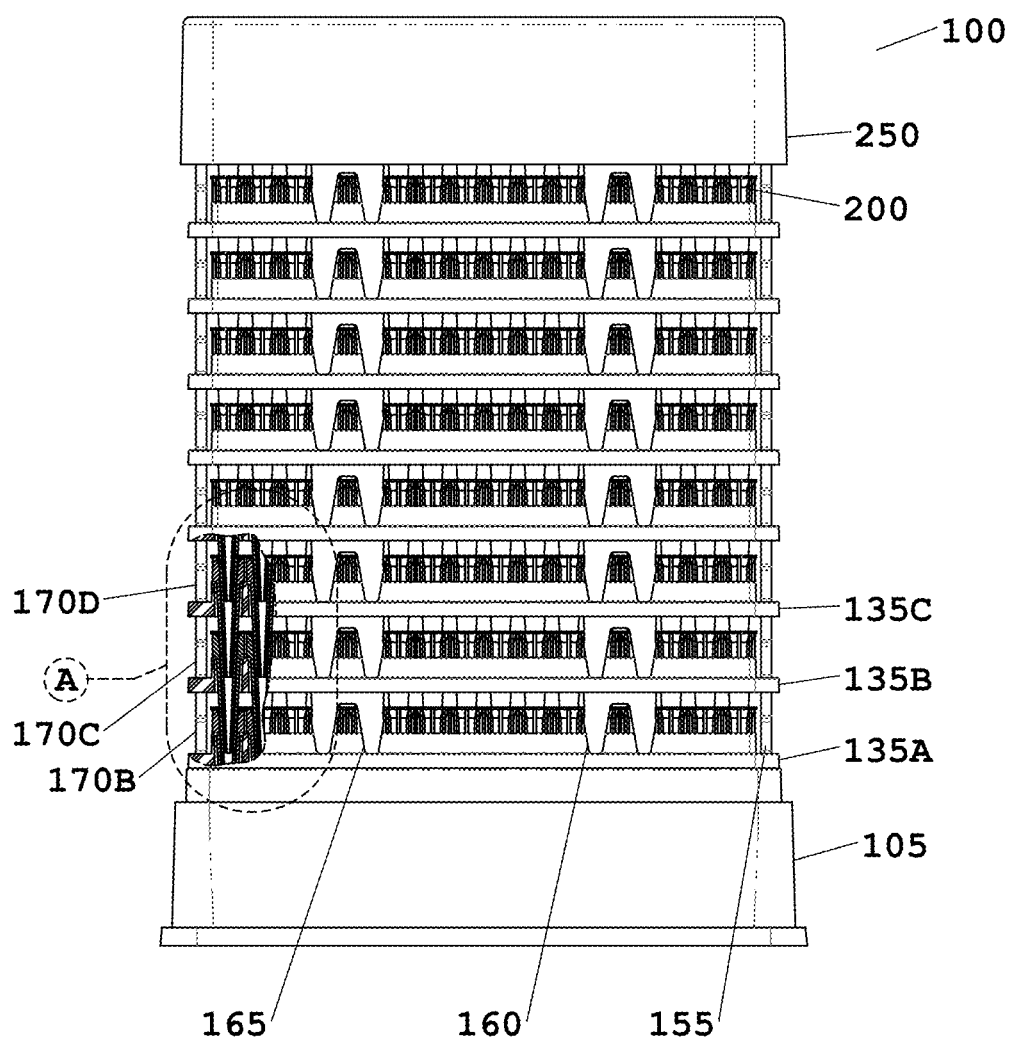
FIG. 14 is a shorter side view of nested pipette tip array assembly embodiment 100 showing a partial section view in encircled area A.
Figure 15:
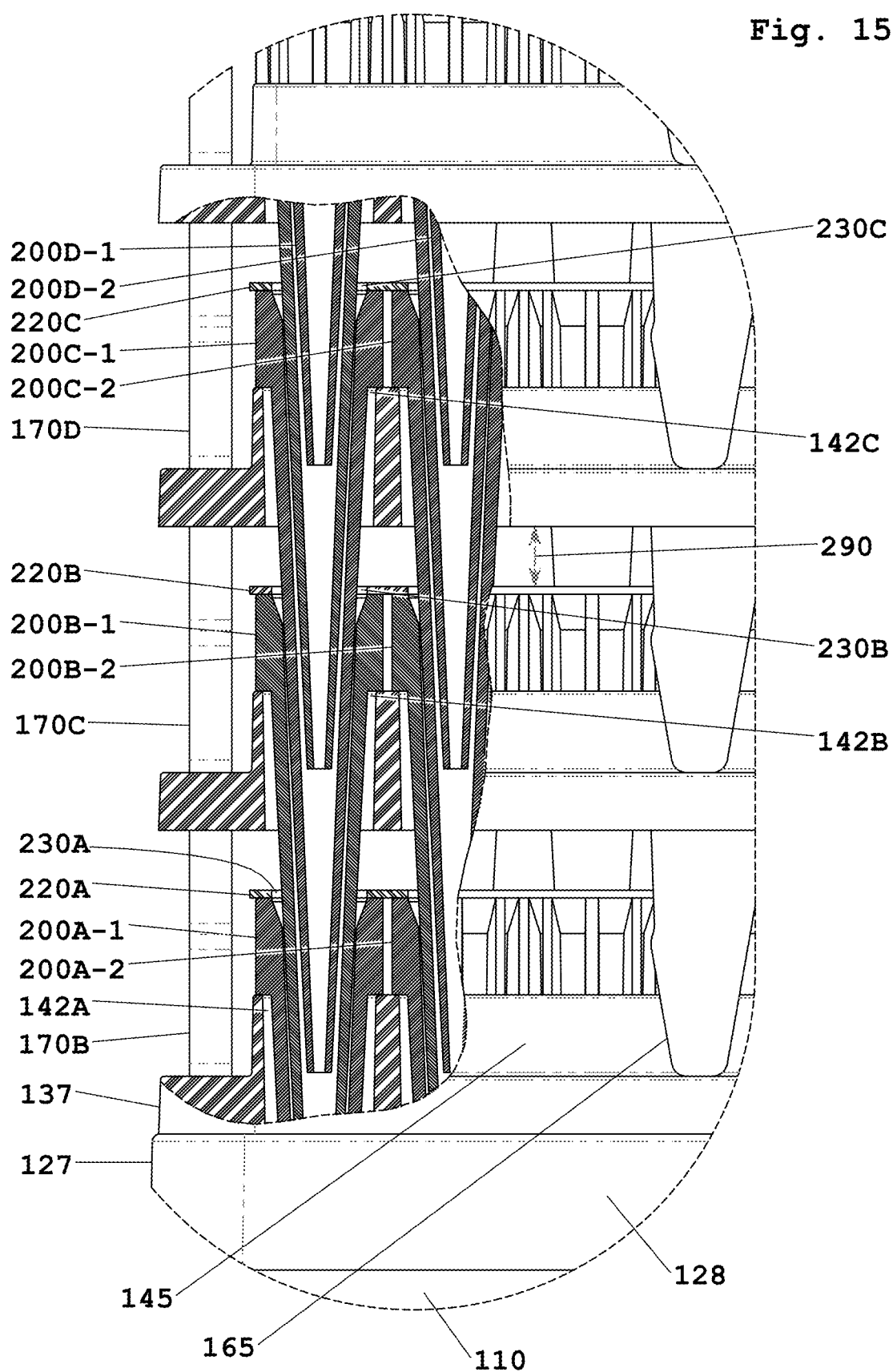
FIG. 15 is an enlarged view of encircled area A. Rack fastener projections in assembly embodiment 100 vertically space adjacent arrays of tips at a distance from one another that overcomes over-nesting of pipette tips that could occur if the projections were not present or were shorter. The partial section view in FIG. 14 is behind a vertically oriented cutting plane line through a portion of pipette tips 200A-1 and 200A-2, through a portion of pipette tips 200B-1 and 200B-2, through a portion of pipette tips 200C-1 and 200C-2 and through a portion of pipette tips 200D-1 and 200D-2 shown in FIG. 15.

FIG. 14 shows a shorter side view of nested pipette tip array assembly embodiment 100 showing a partial section view in encircled area A, and FIG. 15 is an enlarged view of encircled area A. The pipette tip receptacle plate projection 170B-D in assembly embodiment 100 vertically space adjacent arrays of tips at a distance from one another that overcomes over-nesting of pipette tips that could occur if the pipette tip receptacle plate projection 170B-D were not present or were shorter. The partial section view in FIG. 14 is behind a vertically oriented cutting plane line through a portion of pipette tips 200A-1 and 200A-2, through a portion of pipette tips 200B-1 and 200B-2, through a portion of pipette tips 200C-1 and 200C-2 and through a portion of pipette tips 200D-1 and 200D-2 shown in FIG. 15. The pipette tip receptacle plate projection 170B-D in assembly embodiment 100 result in a space between pipette tip receptacle plate distal surface and the proximal surface of a distally disposed sheet 290.

Figure 16:
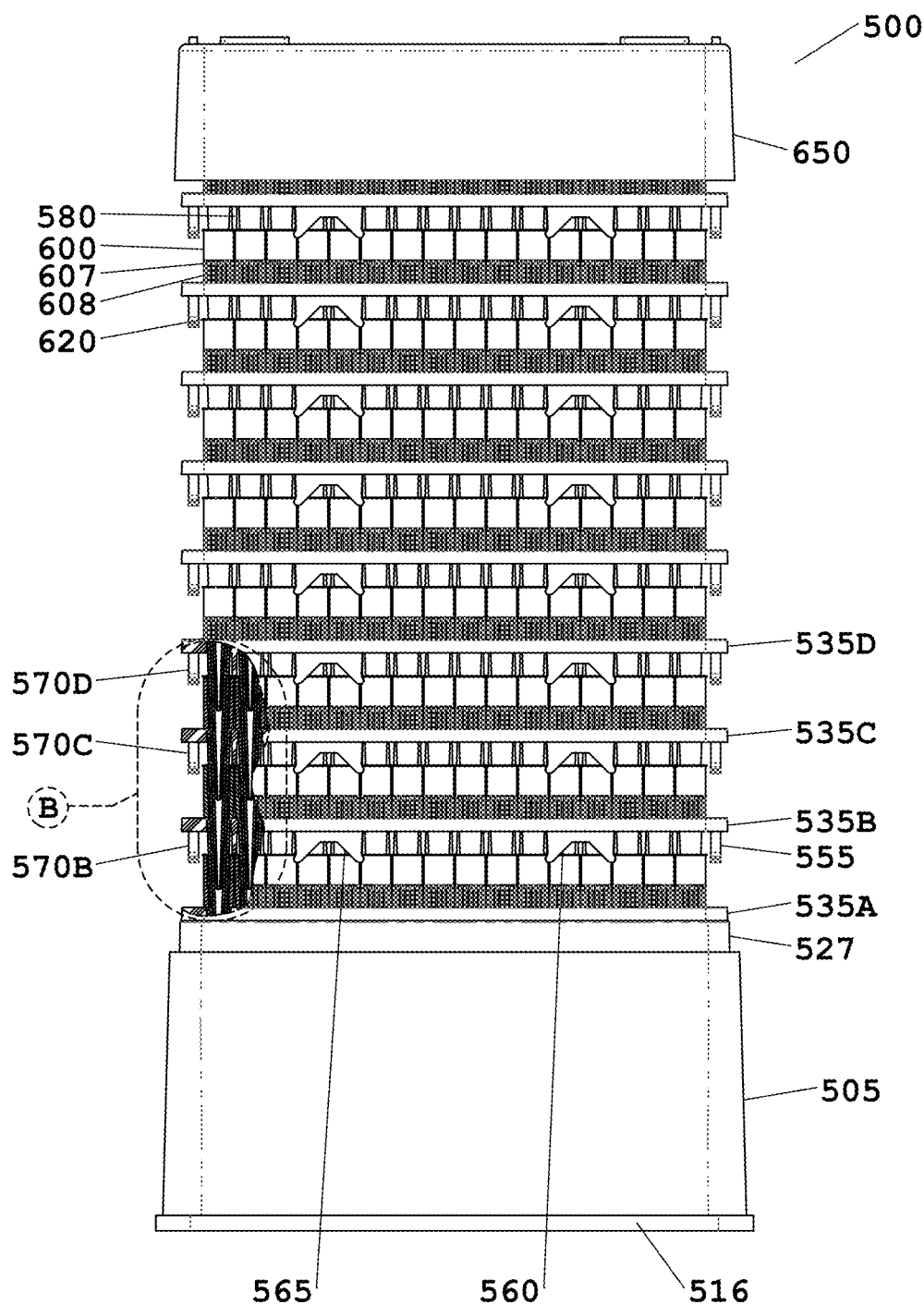
FIG. 16 is a shorter side view of nested pipette tip array assembly embodiment 500 showing a partial section view in encircled area B.
Figure 17:
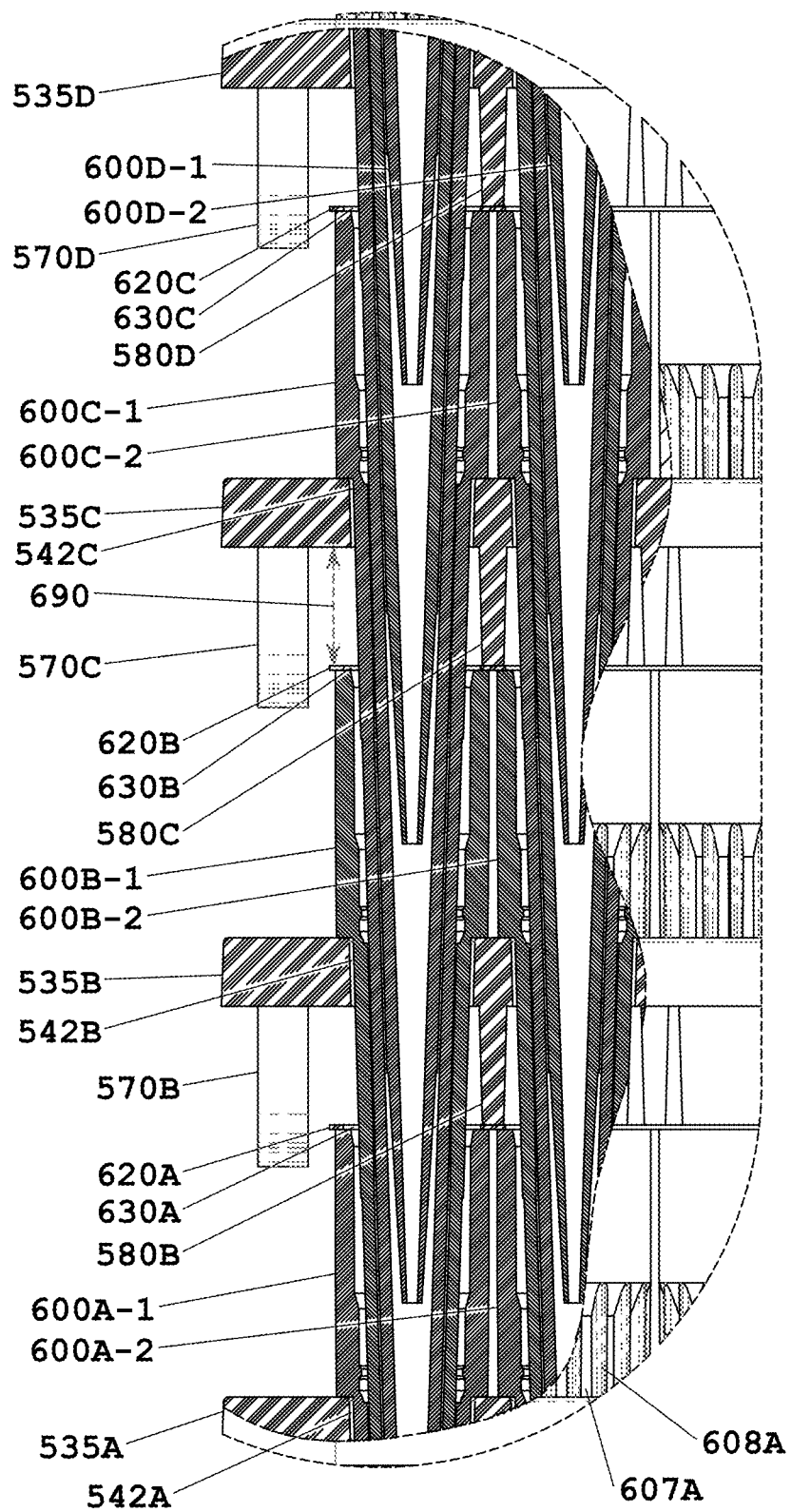
FIG. 17 is an enlarged view of encircled area B. Rib projections in assembly embodiment 500 vertically space adjacent arrays of tips at a distance from one another that overcomes over-nesting of pipette tips that could occur if the projections were not present or were shorter. The partial section view in FIG. 16 is behind a vertically oriented cutting plane line through a portion of pipette tips 600A-1 and 600A-2, through a portion of pipette tips 600B-1 and 600B-2, through a portion of pipette tips 600C-1 and 600C-2 and through a portion of pipette tips 600D-1 and 600D-2 shown in FIG. 17.

FIG. 16 is a shorter side view of nested pipette tip array assembly embodiment 500 showing a partial section view in encircled area B, and FIG. 17 is an enlarged view of encircled area B. The nested pipette tip array assembly embodiment 500 includes a rack base 505, which includes a rack distal flange 518 and rack recessed member 527. The pipette tip receptacle plate 535, 535A, 535B, 535C, 535D includes a pipette tip receptacle plate proximal surface 540, a pipette tip receptacle plate distal surface 548, a pipette tip receptacle plate edge 537, and a plurality of pipette tip receptacle plate aperture; bore openings 542, 542A, 542B, 542C, 542D. Pipette tip receptacle plate projections 550, 555, 560, 565, 570, 570B, 570C, 570D extend from the pipette tip receptacle plate distal surface 548 but are too short to contact the proximal surface of the distal pipette tip receptacle plate 540. Rib projections 580, 580B, 580C, 580D in assembly embodiment 500 vertically space adjacent arrays of tips at a distance from one another that overcomes over-nesting of pipette tips that could occur if the projections were not present or were shorter. The partial section view in FIG. 16 is behind a vertically oriented cutting plane line through a portion of pipette tips 600A-1 and 600A-2, through a portion of pipette tips 600B-1 and 600B-2, through a portion of pipette tips 600C-1 and 600C-2 and through a portion of pipette tips 600D-1 and 600D-2 shown in FIG. 17. The embodiment shows pipette tips including a pipette tip proximal region 607, 607A that includes pipette tip ribs 608, 608A. The pipette tips are engaged with a sheet 620, 620A, 620B, 620C, 620D, which sheet has sheet holes 630, 630A, 630B, 630C within the region of the interior diameter of the pipette tip proximal terminus 203. The nested pipette tip array assembly embodiment 500 includes a lid 650. The pipette tip receptacle plate rib projections 580, 580B, 580C, 580D in assembly embodiment 500 result in a space between pipette tip receptacle plate distal surface and the proximal surface of a distally disposed sheet 690.

Figure 18:
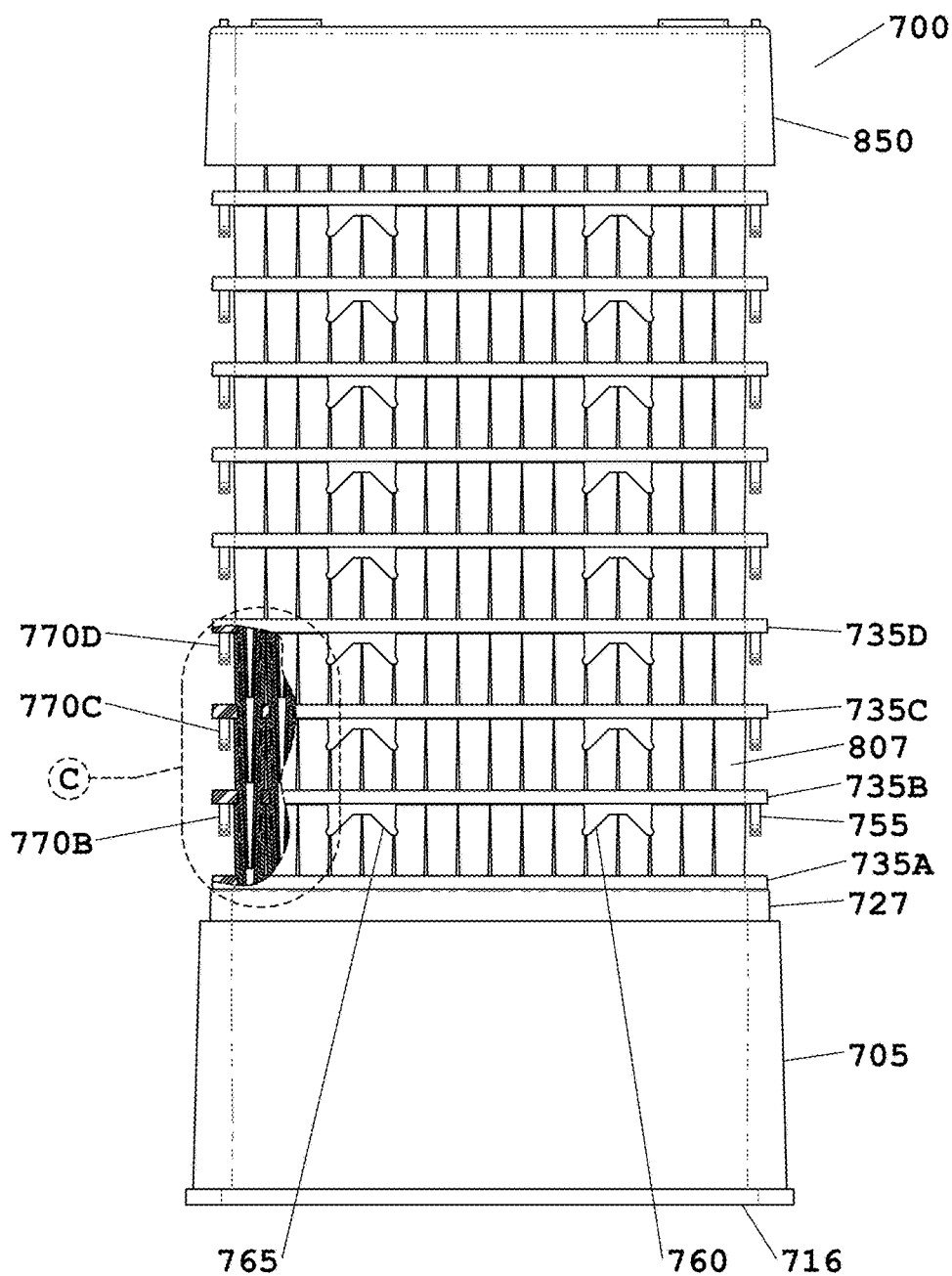
FIG. 18 is a shorter side view of nested pipette tip array assembly embodiment 700 showing a partial section view in encircled area C.
Figure 19:
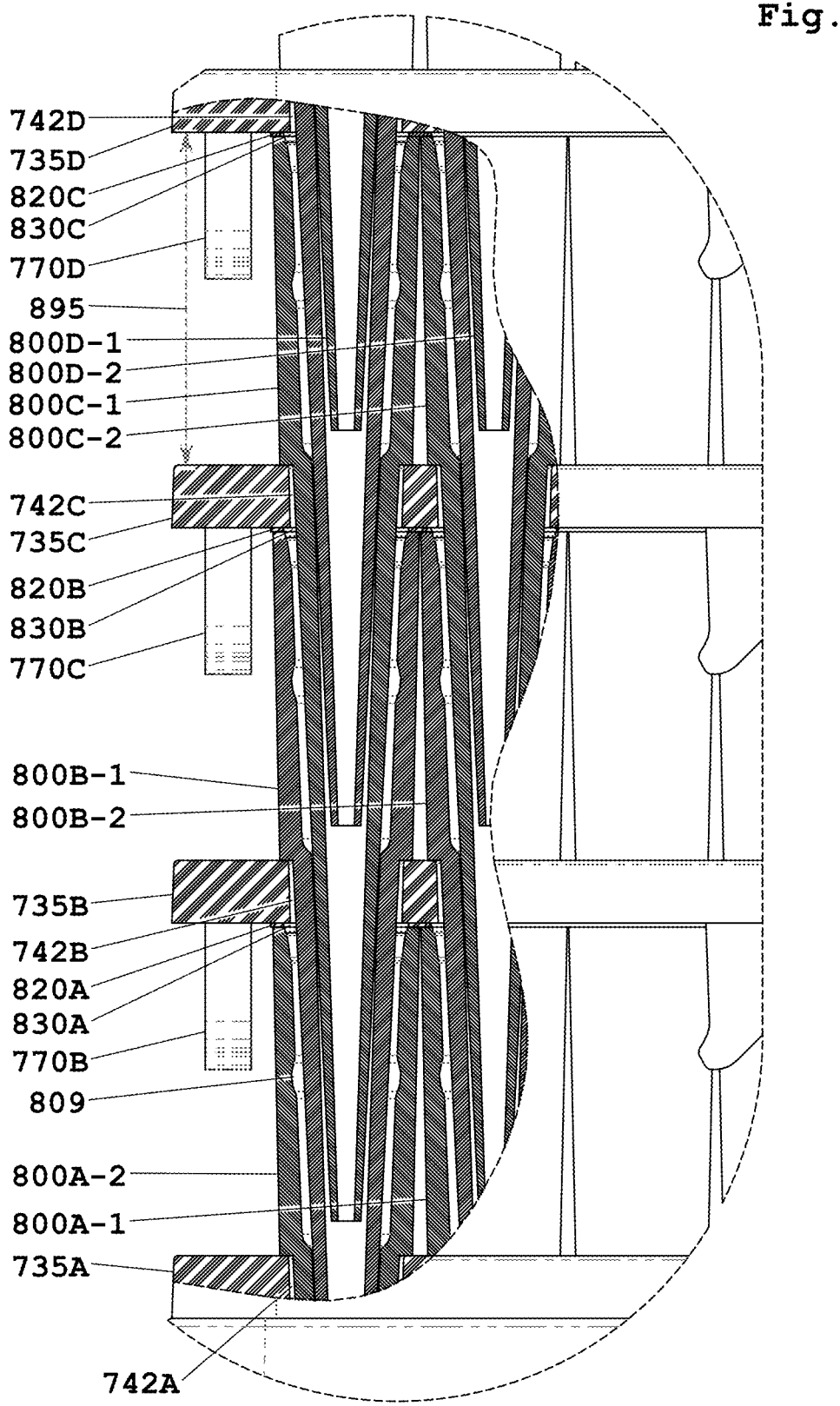
FIG. 19 is an enlarged view of encircled area C. Pipette tip collars (i.e., pipette tip proximal regions) in assembly embodiment 700 have a height configured to vertically space adjacent arrays of tips at a distance from one another that overcomes over-nesting of pipette tips that could occur if the collar were shorter. The partial section view in FIG. 18 is behind a vertically oriented cutting plane line through a portion of pipette tips 800A-1 and 800A-2, through a portion of pipette tips 800B-1 and 800B-2, through a portion of pipette tips 800C-1 and 800C-2 and through a portion of pipette tips 800D-1 and 800D-2 shown in FIG. 19.

FIG. 18 is a shorter side view of nested pipette tip array assembly embodiment 700 showing a partial section view in encircled area C, and FIG. 19 is an enlarged view of encircled area C. The nested pipette tip array assembly embodiment 700 includes a rack base 705, which includes a rack distal flange 716 and rack recessed member 727. The pipette tip receptacle plate 735, 735A, 735B, 735C, 735D includes a plurality of pipette tip receptacle plate aperture; bore openings 742A, 742B, 742C, 742D. Pipette tip receptacle plate projections 755, 760, 765, 770, 770B, 770C, 770D are too short to contact the proximal surface of the distal pipette tip receptacle plate. The embodiment shows pipette tips including a pipette tip proximal region 807 that includes a pipette tip proximal region interior annular groove 809. The pipette tips are engaged with a sheet 820A, 820B, 820C, 820D, which sheet has sheet holes 830A, 830B, 830C within the region of the interior diameter of the pipette tip proximal terminus 203. The nested pipette tip array assembly embodiment 500 includes a lid 650. The pipette tip receptacle plate rib projections 580, 580B, 580C, 580D in assembly embodiment 500 result in a space between pipette tip receptacle plate distal surface and the proximal surface of a distally disposed sheet 690. Pipette tip collars (i.e., pipette tip proximal regions) in assembly embodiment 700 have a height configured to vertically space adjacent arrays of tips at a distance from one another that overcomes over-nesting of pipette tips that could occur if the collar were shorter in the absence of pipette tip receptacle plate projections. Stated alternatively, the thickness of the bores of the pipette tip receptacle plate provide sufficient separation of nested tips to prevent over-nesting. The partial section view in FIG. 18 is behind a vertically oriented cutting plane line through a portion of pipette tips 800A-1 and 800A-2, through a portion of pipette tips 800B-1 and 800B-2, through a portion of pipette tips 800C-1 and 800C-2 and through a portion of pipette tips 800D-1 and 800D-2 shown in FIG. 19. The nested pipette tip array assembly embodiment 700 includes a lid 850. The pipette tip collars (i.e., pipette tip proximal regions 807) in assembly embodiment 700 have a height configured to vertically space adjacent arrays of tips at a distance from one another that overcomes over-nesting of pipette tips when inserted in the pipette tip receptacle plate that could occur if the collar were shorter. The pipette tip receptacle plate rib projections 580, 580B, 580C, 580D in assembly embodiment 500 result in a space between pipette tip receptacle plate distal surface and the proximal surface of a distally disposed sheet 690 result in a space between pipette tip receptacle plate distal surface and the proximal surface of a distally disposed pipette tip receptacle plate 895.

Figure 20:
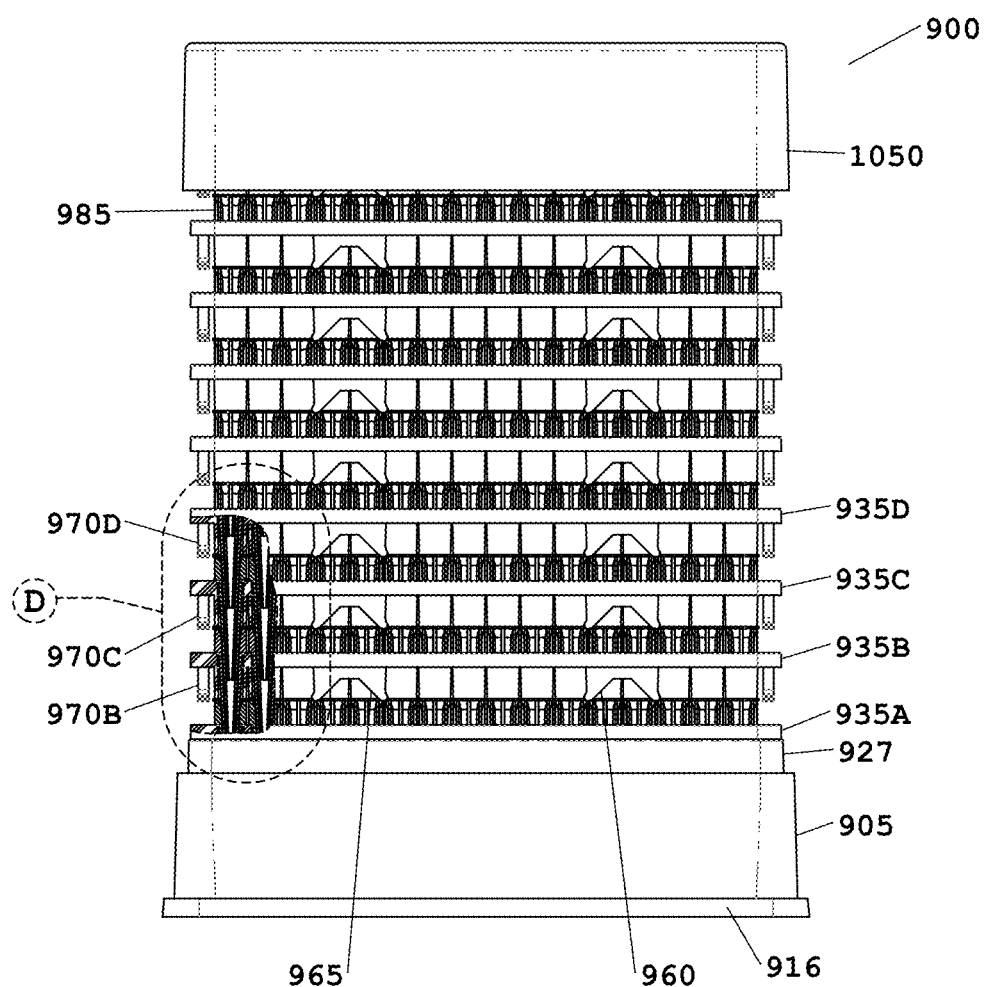
FIG. 20 is a shorter side view of nested pipette tip array assembly embodiment 900 showing a partial section view in encircled area D.
Figure 21:
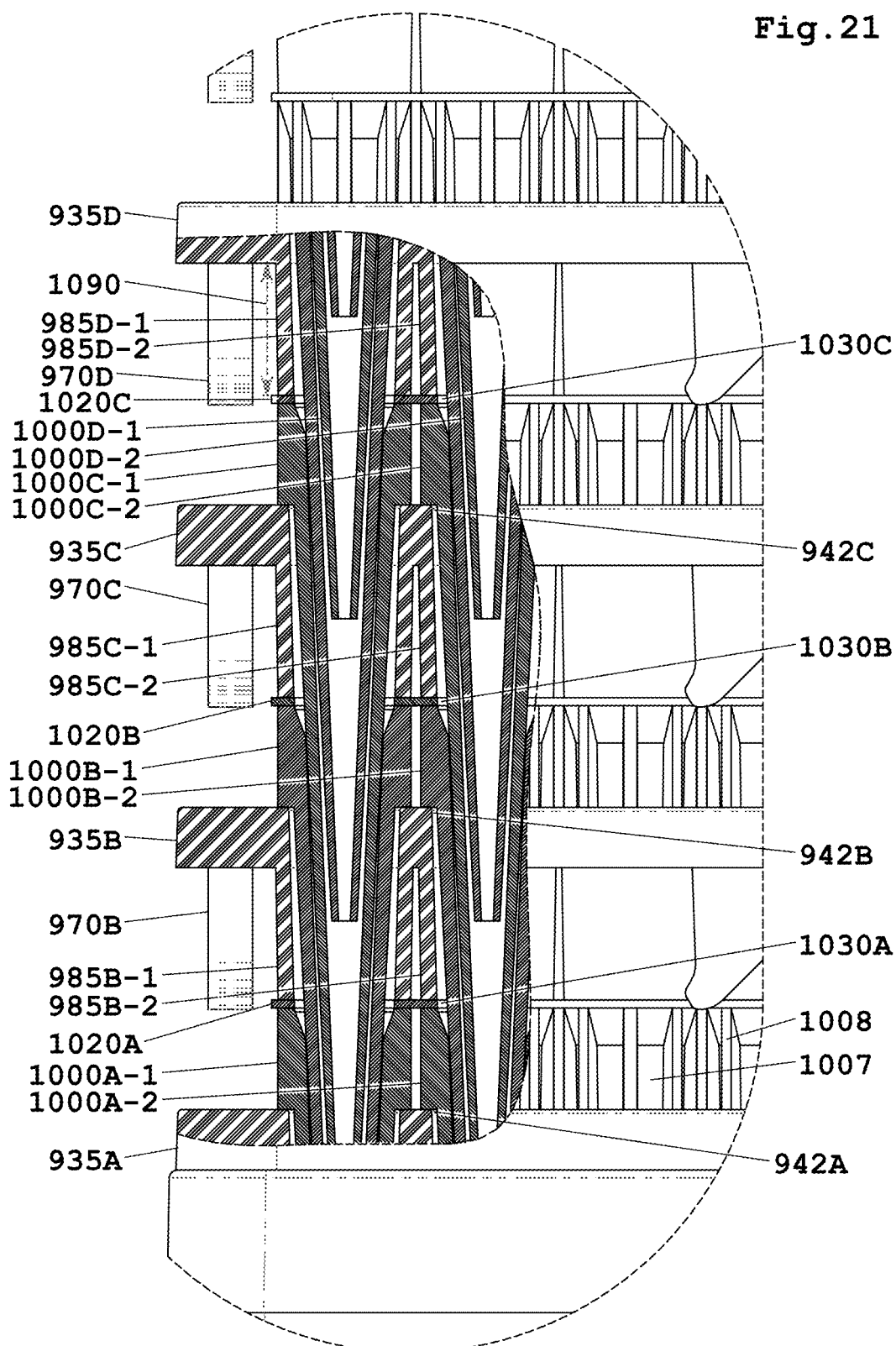
FIG. 21 is an enlarged view of encircled area D. Tubular projections in assembly embodiment 900 vertically space adjacent arrays of tips at a distance from one another that overcomes over-nesting of pipette tips that could occur if the projections were not present or were shorter. The partial section view in FIG. 20 is behind a vertically oriented cutting plane line through a portion of pipette tips 1000A-1 and 1000A-2, through a portion of pipette tips 1000B-1 and 1000B-2, through a portion of pipette tips 1000C-1 and 1000C-2 and through a portion of pipette tips 1000D-1 and 1000D-2 shown in FIG. 21.

FIG. 20 is a shorter side view of nested pipette tip array assembly embodiment 900 showing a partial section view in encircled area D, and FIG. 21 is an enlarged view of encircled area D. The nested pipette tip array assembly embodiment 900 includes a rack base 905, which includes a rack distal flange 926 and rack recessed member 927. The pipette tip receptacle plate 935, 935A, 935B, 935C, 935D includes a pipette tip receptacle plate proximal surface 940, a pipette tip receptacle plate distal surface 948, a pipette tip receptacle plate edge 937, and a plurality of pipette tip receptacle plate aperture; bore openings 942, 942A, 942B, 942C, 942D. Pipette tip receptacle plate projections 950, 955, 960, 965, 970, 970B, 970C, 970D extend from the pipette tip receptacle plate distal surface 948 but are too short to contact the proximal surface of the distal pipette tip receptacle plate 940. Tubular projections 985, 985B, 985C, 985D in assembly embodiment 900 vertically space adjacent arrays of tips at a distance from one another that overcomes over-nesting of pipette tips that could occur if the projections were not present or were shorter. The partial section view in FIG. 20 is behind a vertically oriented cutting plane line through a portion of pipette tips 1000A-1 and 1000A-2, through a portion of pipette tips 1000B-1 and 1000B-2, through a portion of pipette tips 1000C-1 and 1000C-2 and through a portion of pipette tips 1000D-1 and 1000D-2 shown in FIG. 21. The embodiment shows pipette tips including a pipette tip proximal region 1007 that includes pipette tip ribs 1008. The pipette tips are engaged with a sheet 1020A, 1020B, 1020C, 1020D, which sheet has sheet holes 1030A, 1030B, 1030C within the region of the interior diameter of the pipette tip proximal terminus 203. The nested pipette tip array assembly embodiment 900 includes a lid 1050. The pipette tip receptacle plate tubular projections 985, 985B, 985C, 985D in assembly embodiment 900 result in a space between pipette tip receptacle plate distal surface and the proximal surface of a distally disposed sheet 1090.

Examples of Pipette Tip Receptacle Plates

Figure 22:
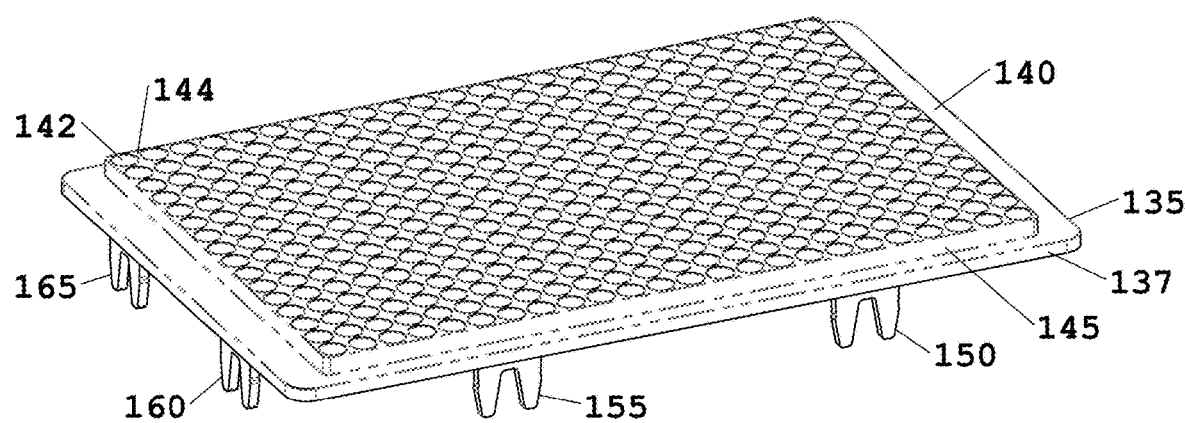
FIG. 22 is a top perspective view of pipette tip receptacle plate 135.
Figure 23:
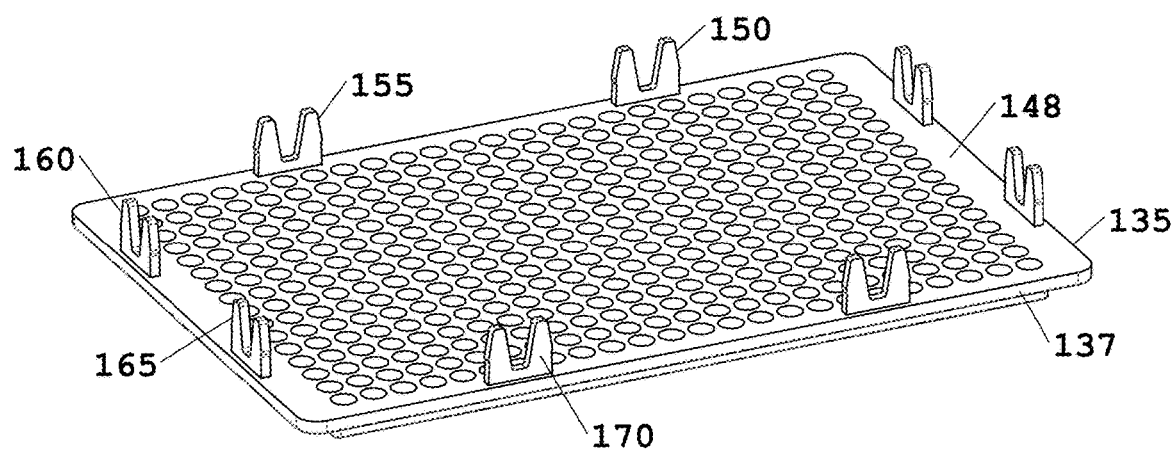
FIG. 23 is a bottom perspective view thereof.
Figure 25:
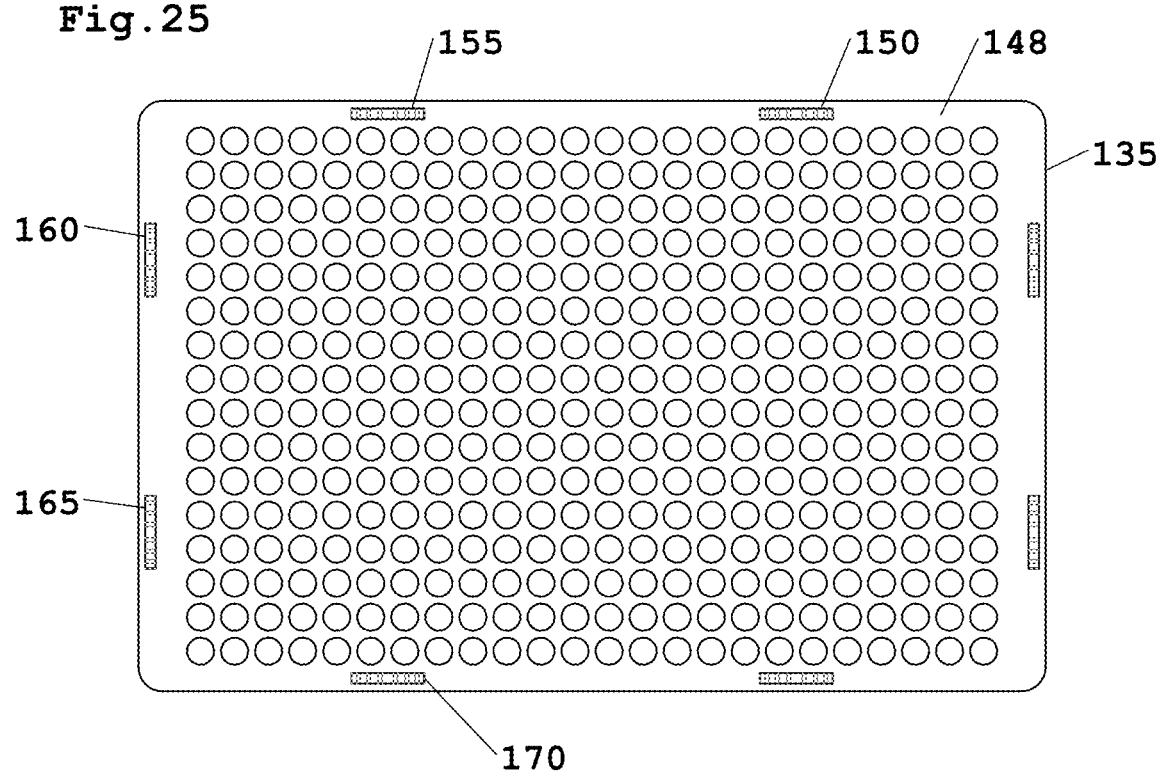
FIG. 25 is a bottom view thereof.
Figure 26:
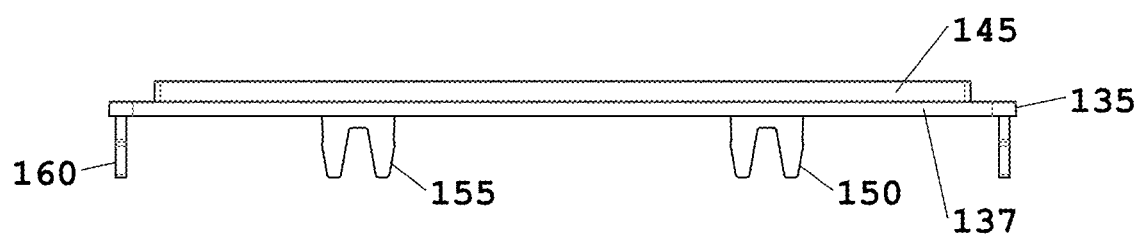
FIG. 26 is a longer side view thereof.
Figure 27:
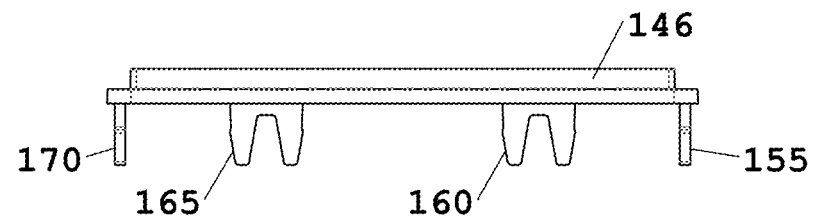
FIG. 27 is a shorter side view thereof.

FIG. 22 is a top perspective view of pipette tip receptacle plate embodiment 135, FIG. 23 is a bottom perspective view thereof, FIG. 24 is a top view thereof, FIG. 25 is a bottom view thereof, FIG. 26 is a longer side view thereof, and FIG. 27 is a shorter side view thereof. The pipette tip receptacle plate embodiment 135 includes a pipette tip receptacle plate proximal surface 140, pipette tip receptacle plate distal surface 148, a pipette tip receptacle plate edge 137, a plurality of pipette tip receptacle plate apertures; bore opening 142 within a pipette tip receptacle plate raised surface 144. Pipette tip receptacle plate projections 150, 155, 160, 165 extend from the pipette tip receptacle plate distal surface 148. The pipette tip receptacle plate distal surface 148 provides a longer sidewall step between pipette tip receptacle plate proximal surface and raised surface 145 and a shorter sidewall step between pipette tip receptacle plate proximal surface and raised surface 146.

Figure 28:
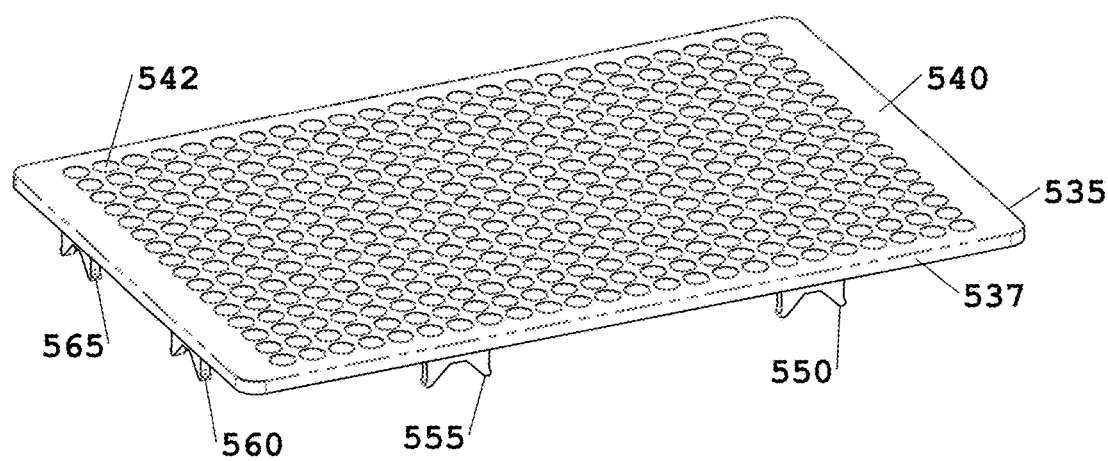
FIG. 28 is a top perspective view of pipette tip receptacle plate 535.
Figure 29:
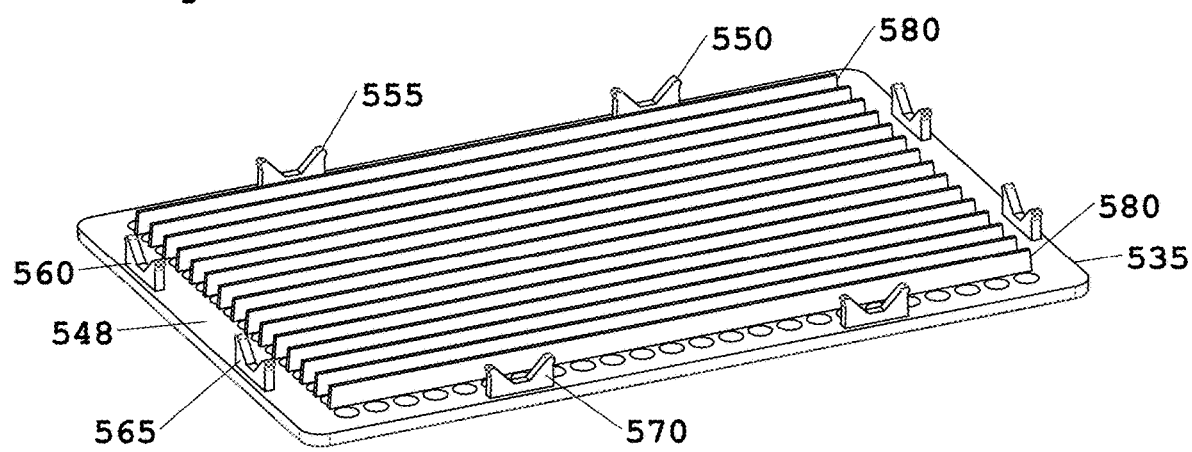
FIG. 29 is a bottom perspective view thereof.
Figure 30:
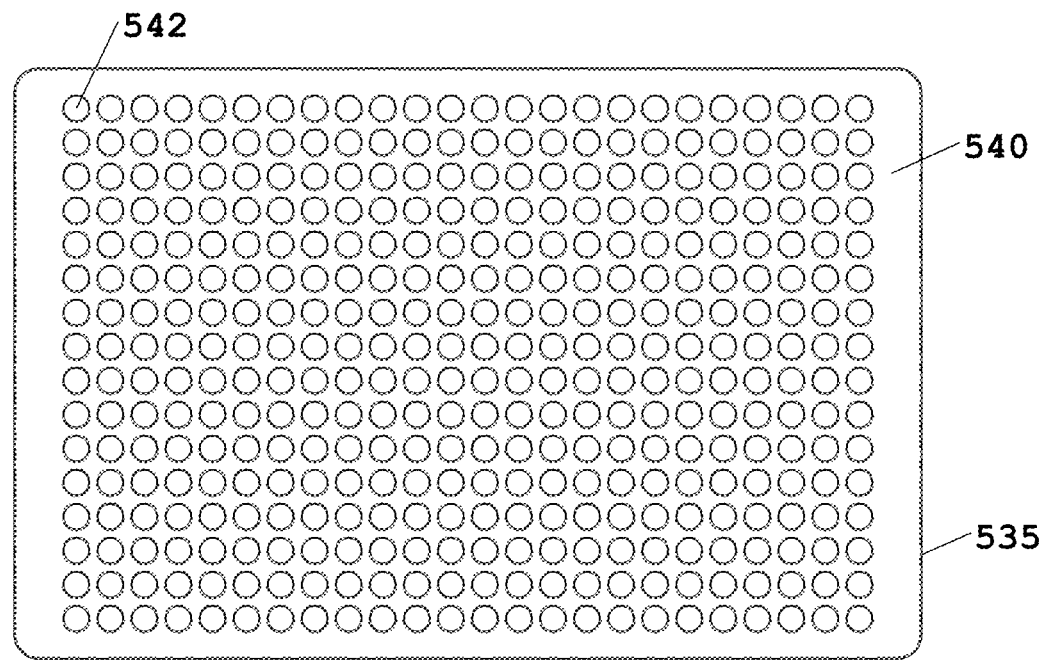
FIG. 30 is a top view thereof.
Figure 31:
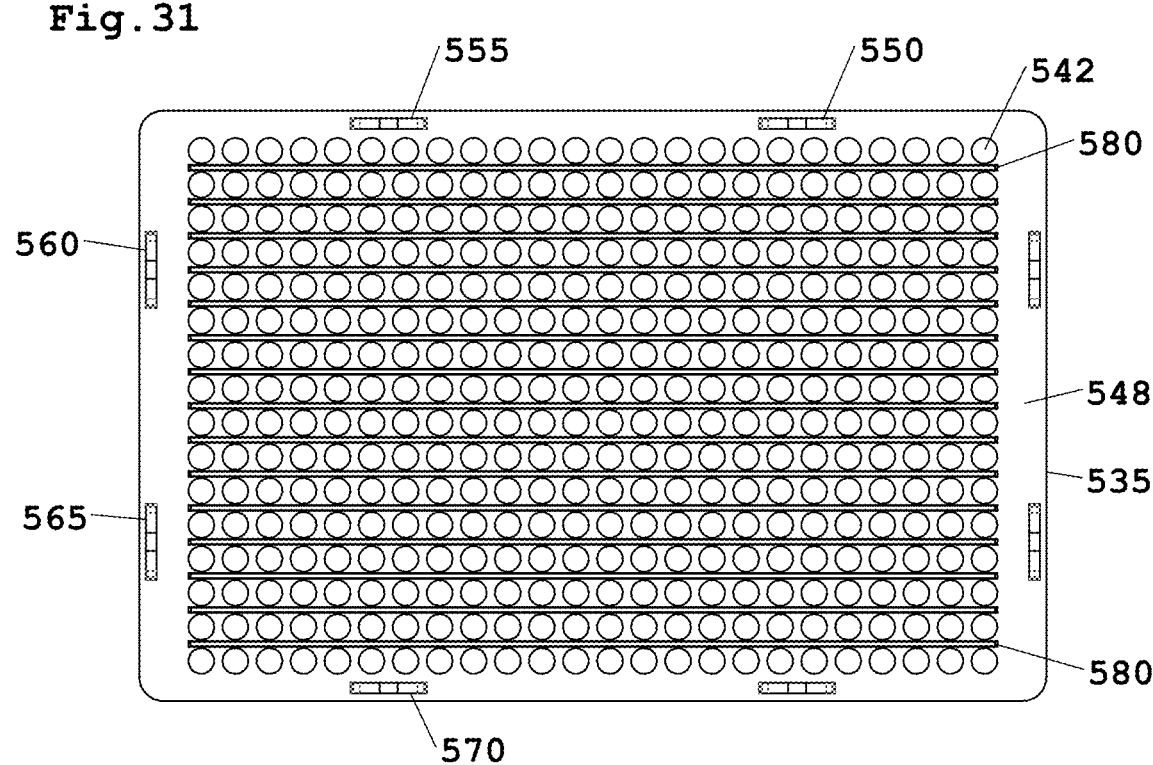
FIG. 31 is a bottom view thereof.
Figure 32:
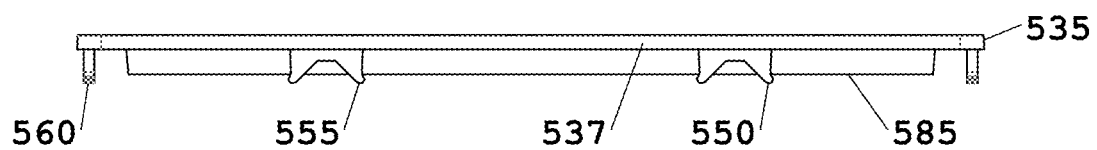
FIG. 32 is a longer side view thereof.
Figure 33:
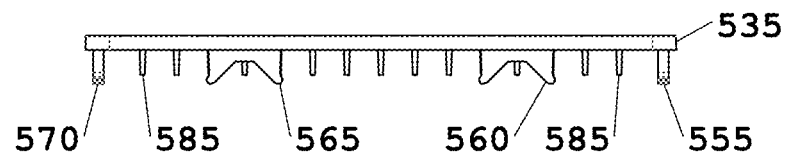
FIG. 33 is a shorter side view thereof.

FIG. 28 is a top perspective view of pipette tip receptacle plate embodiment 535, FIG. 29 is a bottom perspective view thereof, FIG. 30 is a top view thereof, FIG. 31 is a bottom view thereof, FIG. 32 is a longer side view thereof, and FIG. 33 is a shorter side view thereof. The pipette tip receptacle plate embodiment 535 includes a pipette tip receptacle plate proximal surface 540, pipette tip receptacle plate distal surface 548, a pipette tip receptacle plate edge 537, a plurality of pipette tip receptacle plate apertures; bore opening 542. Pipette tip receptacle plate projections 550, 555, 560, 565 extend from the pipette tip receptacle plate distal surface 548. Ribs 580 extend from the pipette tip receptacle plate distal surface 548 parallel to the longer side of the plate and between the plurality of pipette tip receptacle plate apertures; bore opening 542.

Figure 34:
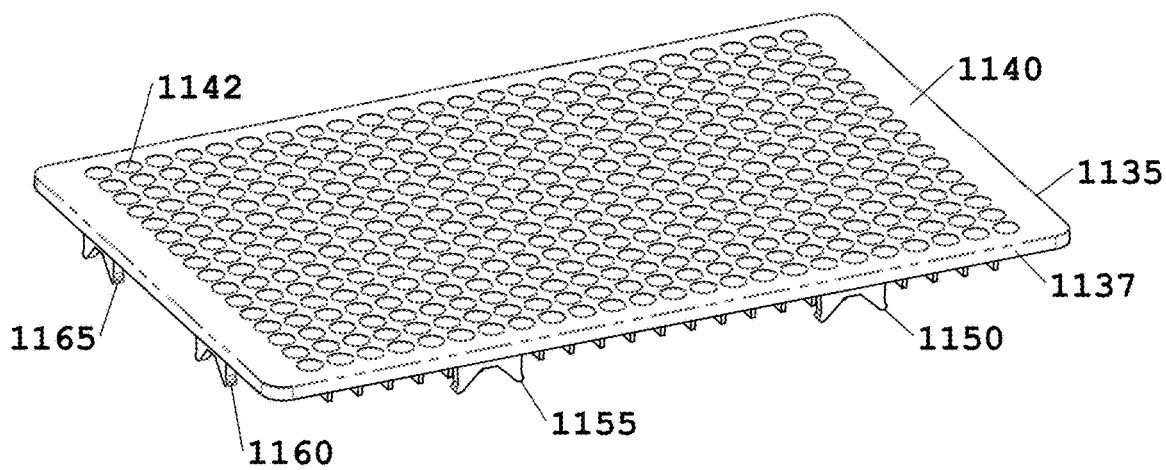
FIG. 34 is a top perspective view of pipette tip receptacle plate 1135.
Figure 35:
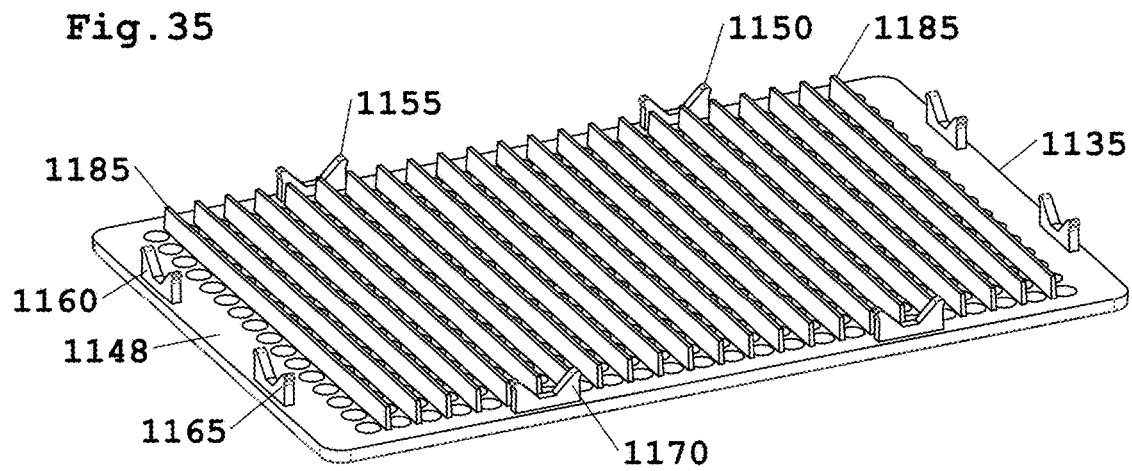
FIG. 35 is a bottom perspective view thereof.
Figure 36:
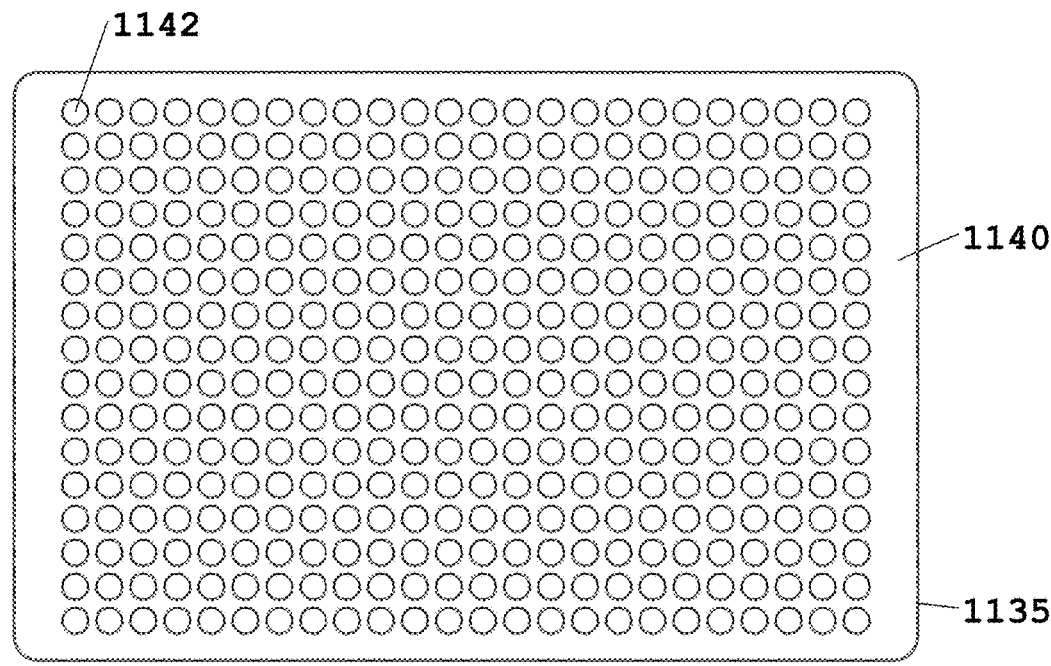
FIG. 36 is a top view thereof.
Figure 37:
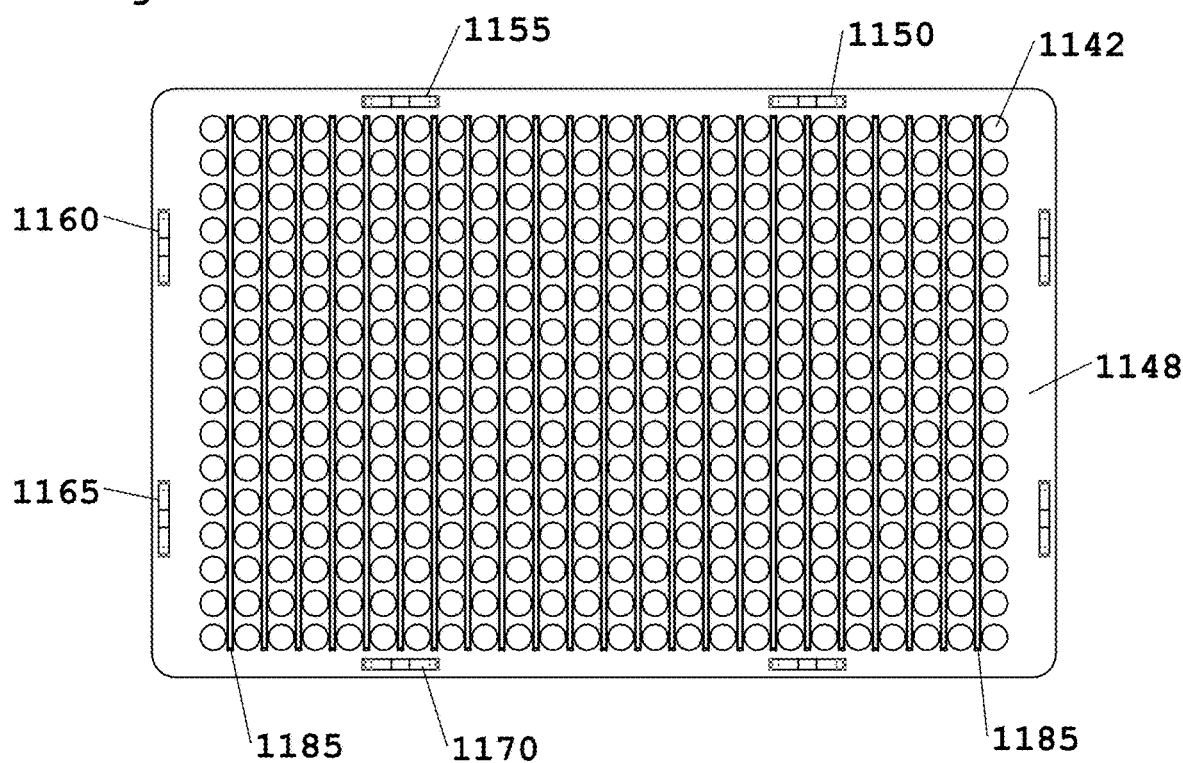
FIG. 37 is a bottom view thereof.
Figure 38:
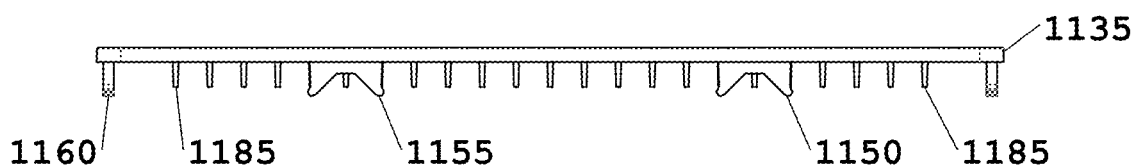
FIG. 38 is a longer side view thereof.
Figure 39:
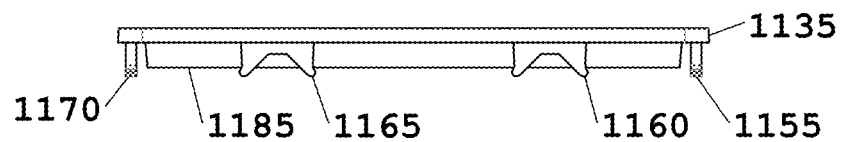
FIG. 39 is a shorter side view thereof.

FIG. 34 is a top perspective view of pipette tip receptacle plate embodiment 1135, FIG. 35 is a bottom perspective view thereof, FIG. 36 is a top view thereof, FIG. 37 is a bottom view thereof, FIG. 38 is a longer side view thereof, and FIG. 39 is a shorter side view thereof. The pipette tip receptacle plate embodiment 1135 includes a pipette tip receptacle plate proximal surface 1140, pipette tip receptacle plate distal surface 1148, a pipette tip receptacle plate edge 1137, a plurality of pipette tip receptacle plate apertures; bore opening 1142. Pipette tip receptacle plate projections 1150, 1155, 1160, 1165, 1170 extend from the pipette tip receptacle plate distal surface 1148. Ribs 1185 extend from the pipette tip receptacle plate distal surface 1148 parallel to the shorter side of the plate and between the plurality of pipette tip receptacle plate apertures; bore opening 1142.

Figure 40:
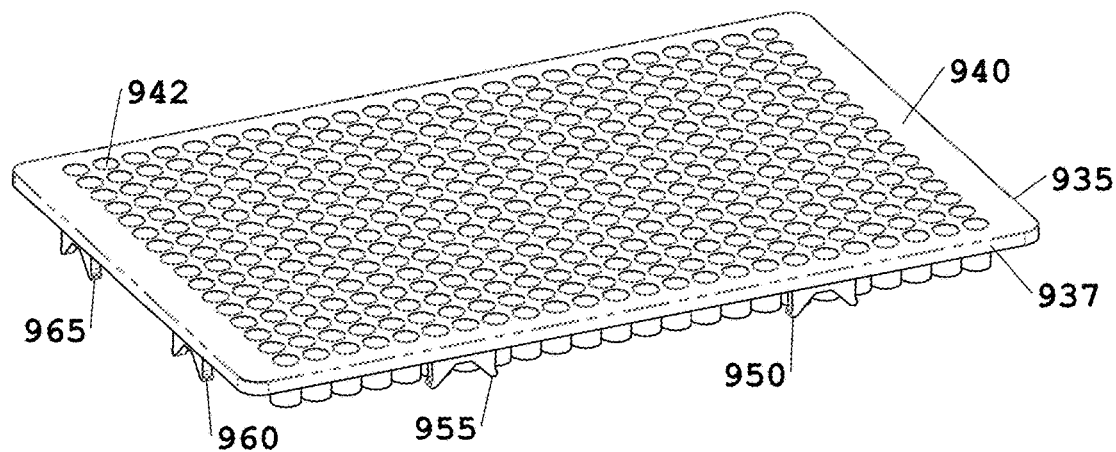
FIG. 40 is a top perspective view of pipette tip receptacle plate 935.
Figure 41:
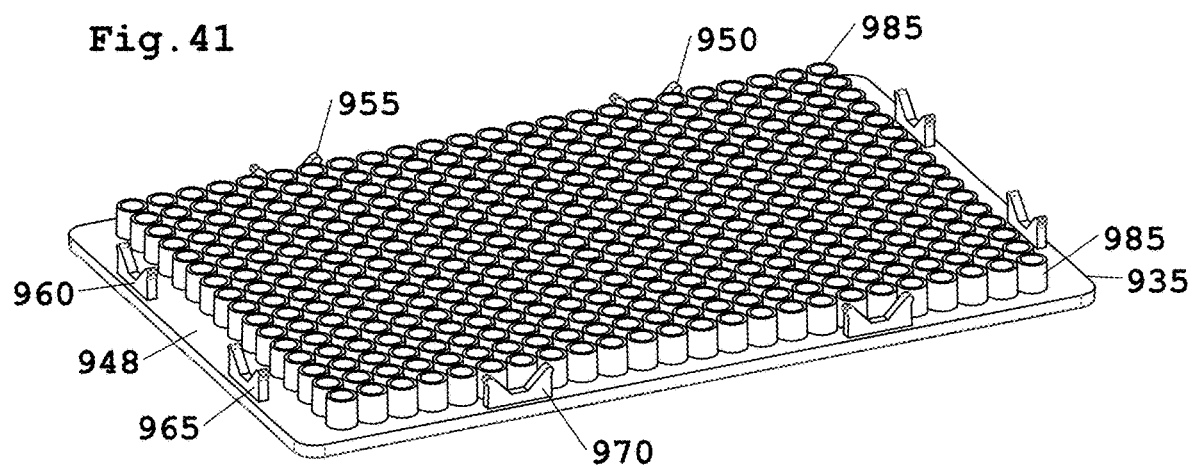
FIG. 41 is a bottom perspective view thereof.
Figure 42:
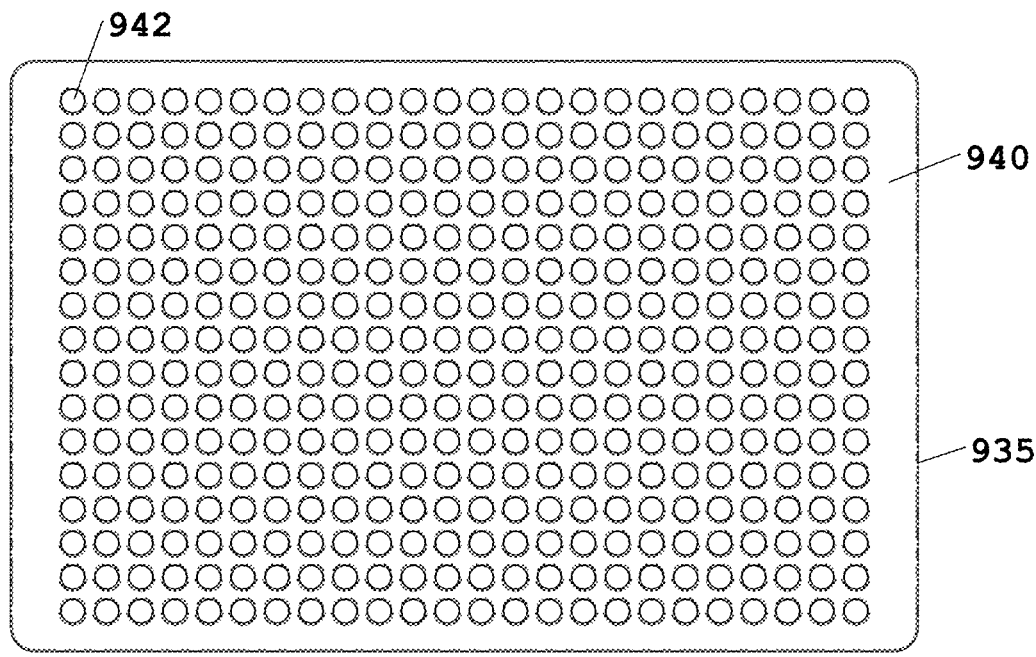
FIG. 42 is a top view thereof.
Figure 43:
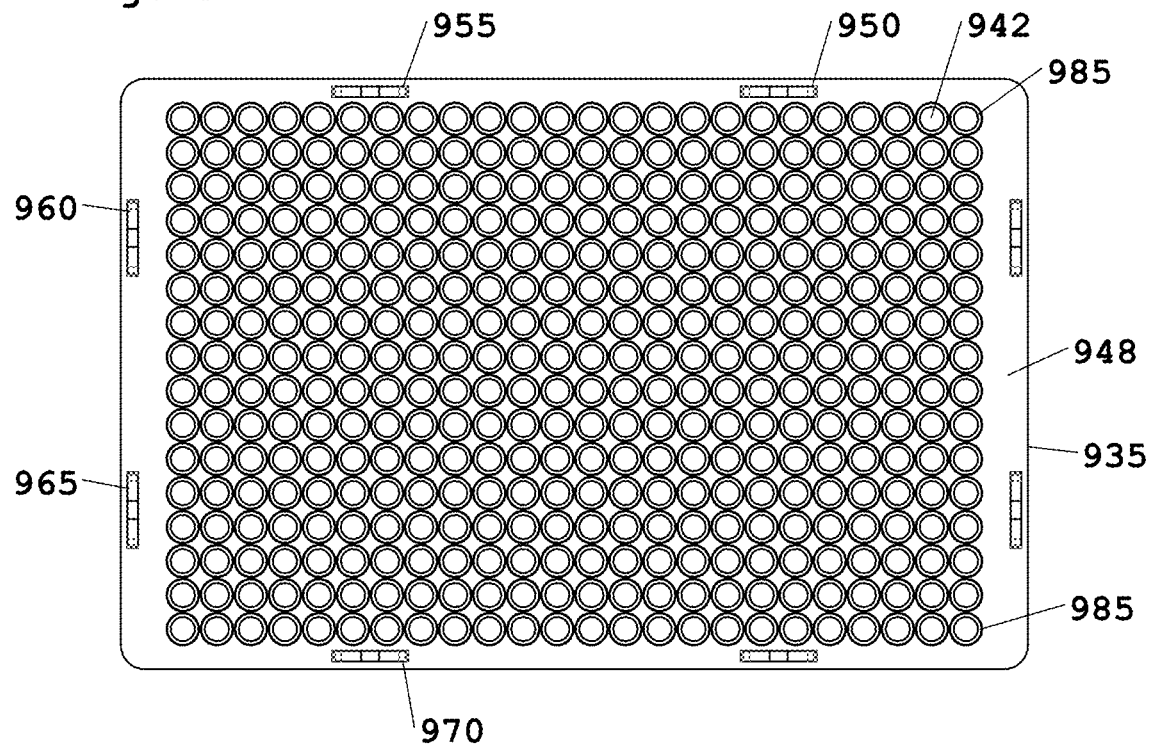
FIG. 43 is a bottom view thereof.
Figure 44:
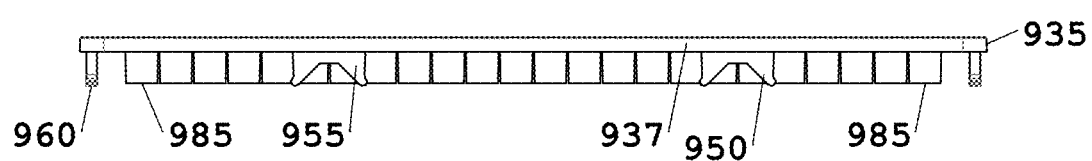
FIG. 44 is a longer side view thereof.

FIG. 40 is a top perspective view of pipette tip receptacle plate embodiment 935, FIG. 41 is a bottom perspective view thereof, FIG. 42 is a top view thereof, FIG. 43 is a bottom view thereof, FIG. 44 is a longer side view thereof, and FIG. 45 is a shorter side view thereof. The pipette tip receptacle plate embodiment 935 includes a pipette tip receptacle plate proximal surface 940, pipette tip receptacle plate distal surface 948, a pipette tip receptacle plate edge 937, a plurality of pipette tip receptacle plate apertures; bore opening 942. Pipette tip receptacle plate projections 950, 955, 960, 965, 970 extend from the pipette tip receptacle plate distal surface 948. Tubular projections 985 extend from the pipette tip receptacle plate distal surface 948 around each of the plurality of pipette tip receptacle plate apertures; bore opening 1142.

Push Plate

In some embodiments, the nested pipette tip array assembly includes a push plate disposed proximally to the most proximal pipette tip receptacle plate (top). The push plate allows the user to apply distributed force to the top of the nested pipette tip array assembly in order to dispense the bottom most pipette tip receptacle plate to, for example, the rack base. The push plate can be made of any material sturdy enough to transmit the pressure appropriately across the array of pipette tips. For some embodiments, the push plate may be made from suitable metals, such as aluminum, or polymers such as polypropylene, polycarbonate, polyethylene, polystyrene, polyurethane and the like as well as any other suitable polymers that may be molded, thermoformed or the like.

In some embodiments, the push plate can include antistatic features similar to those described above for the nested pipette tip array lid. The features described for the lid apply to the push plate as well.

Ejection Sleeve

In some embodiments, the nested pipette tip array assembly includes an ejection sleeve. The ejection sleeve generally has four walls that stabilize the plurality of pipette tip receptacle plates over the rack base. In some embodiments, the ejection sleeve is transparent or translucent. In some embodiments, the ejection sleeve is bossed, which, for example, can improve the structural stability of the ejection sleeve wall. In some embodiments the boss projects from the exterior surface, which, for example, can improve the user's grasp of the ejection sleeve wall. In some embodiments the boss projects from the interior surface, which, for example, can assist in restricting movement of the pipette tip receptacle plates within the ejection sleeve, such as during shipment. The ejection sleeve may have a thickness that allows for some flexibility or elastic deformation of the sides or proximal surface upon manual manipulation but provides sufficient structural strength to maintain its general shape upon manual manipulation and application of pressure to the push plate. The ejection sleeve is also sufficiently rigid to be self-supporting and maintains integrity sufficient to apply pressure to the push plate and the pipette tip receptacle plate to, for example, the rack base.

Examples of Ejection Sleeves with Push Plates

Figure 46:
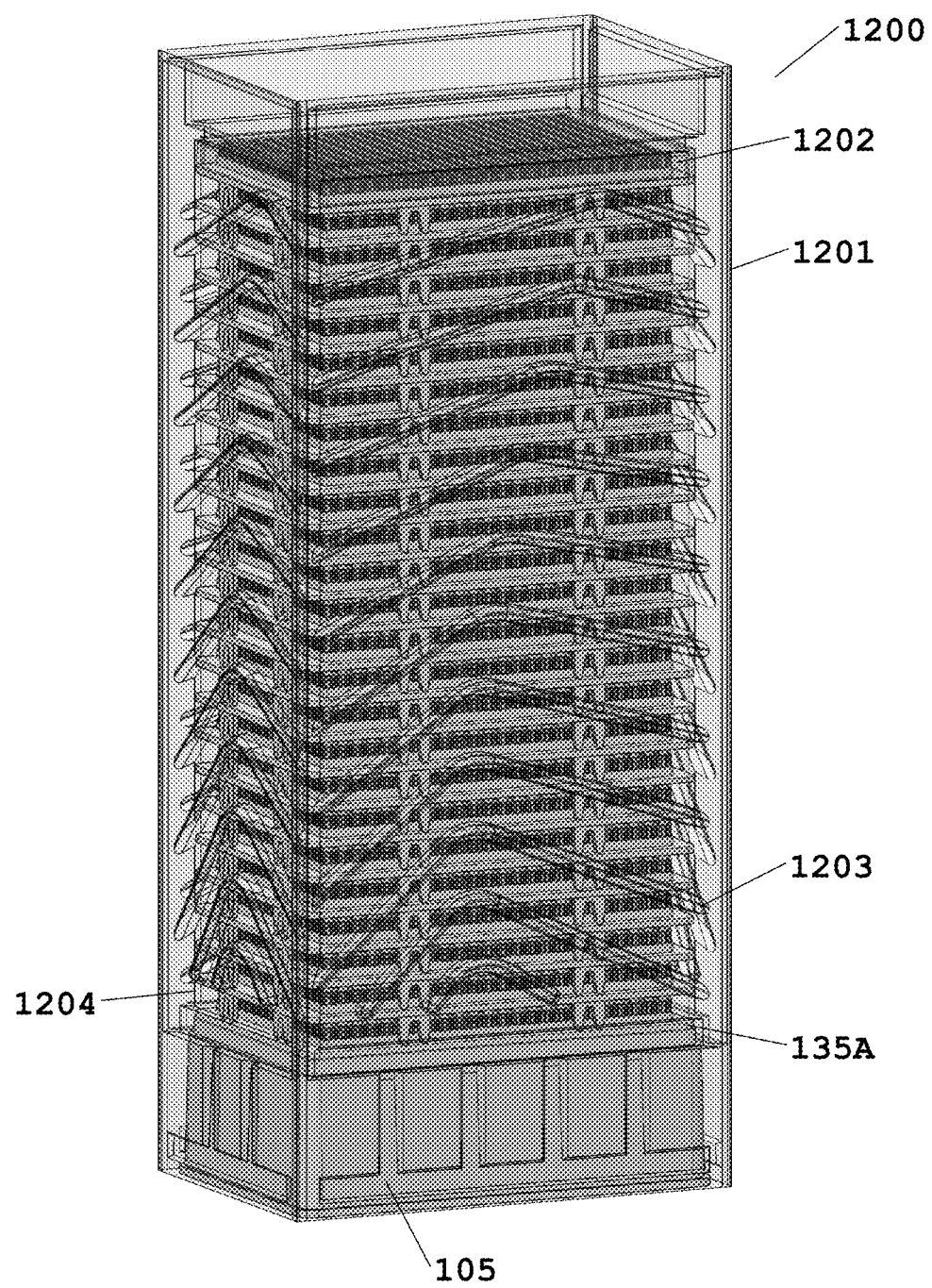
FIG. 46 is a top perspective view of nested pipette tip array assembly embodiment 1200 in an ejection sleeve.
Figure 47:
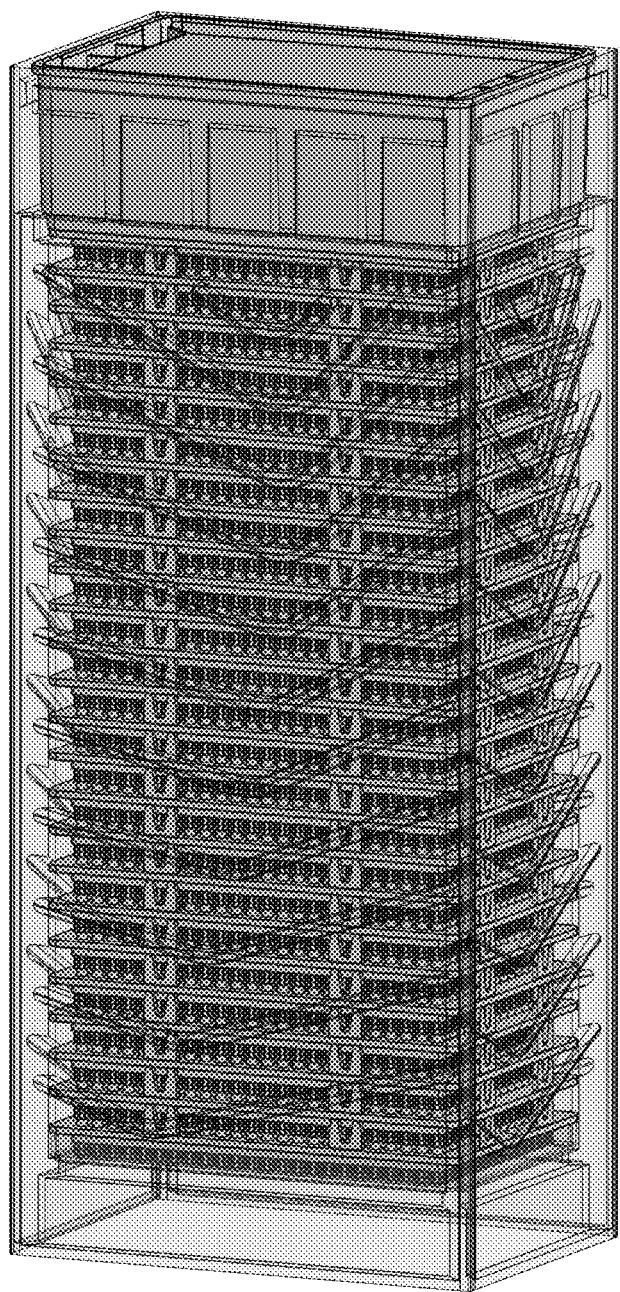
FIG. 47 is a bottom perspective view thereof.
Figure 48:
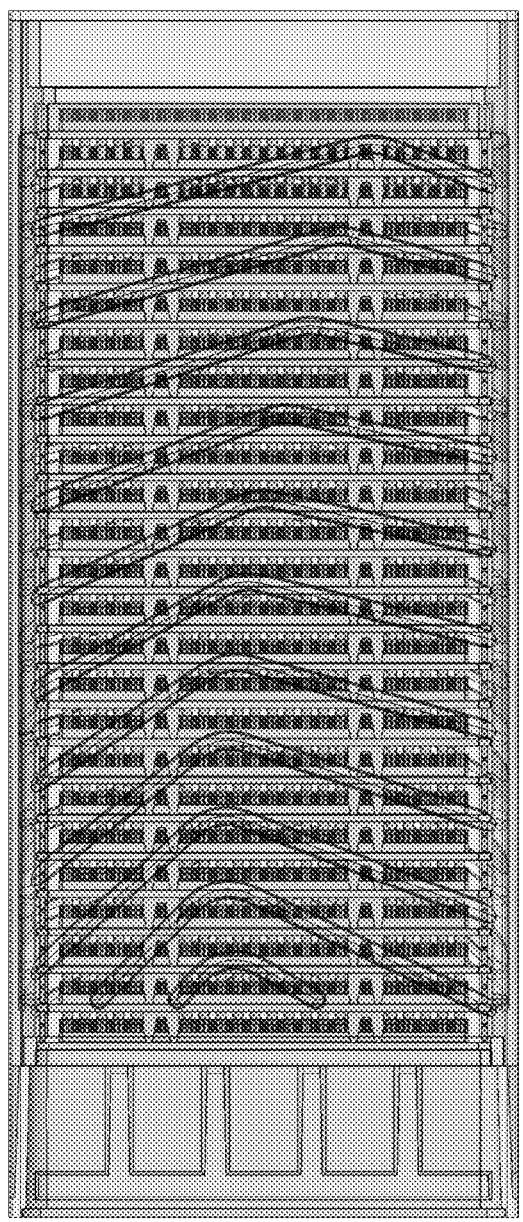
FIG. 48 is a longer side view thereof.
Figure 49:
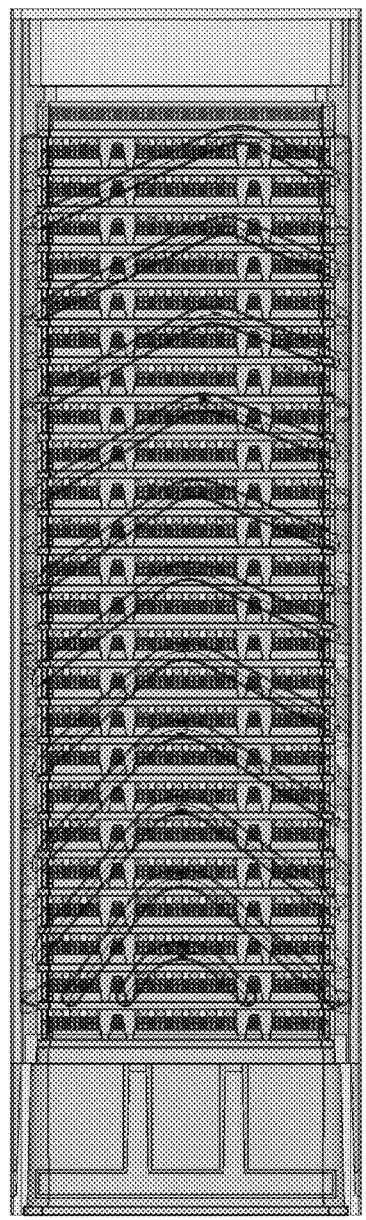
FIG. 49 is a shorter side view thereof.
Figure 50:
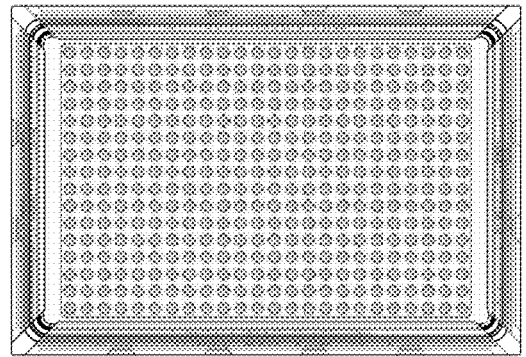
FIG. 50 is a top view thereof.
Figure 51:
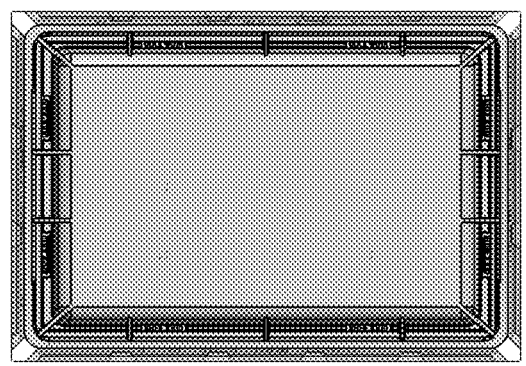
FIG. 51 is a bottom view thereof.

FIG. 46 is a top perspective view of nested pipette tip array assembly embodiment 1200 in an ejection sleeve 1201, FIG. 47 is a bottom perspective view thereof, FIG. 48 is a longer side view thereof, FIG. 49 is a shorter side view thereof, FIG. 50 is a top view thereof, and FIG. 51 is a bottom view thereof. The nested pipette tip array assembly embodiment 1200 includes an ejection sleeve 1201 and a push plate 1202. The nested pipette tip array assembly embodiment 1200 is also bossed, including transverse bosses 1203 and axially disposed bosses 1204.

Moldable Materials

Each nested pipette tip array assembly component, including, but not limited to, the pipette tip receptacle plate, rack base, pipette tips, sheets, push plate, ejection sleeve and lid, can be manufactured from a commercially suitable material. Nested pipette tip array assembly components often are manufactured from one or more moldable materials, independently selected from those that include, without limitation, polypropylene (PP), polyethylene (PE), high-density polyethylene (HDPE), low-density polyethylene (LDPE), polyethylene teraphthalate (PET), polyvinyl chloride (PVC), polytetrafluoroethylene (PTFE), polystyrene (PS), high-density polystyrene, acrylnitrile butadiene styrene copolymers, crosslinked polysiloxanes, polyurethanes, (meth)acrylate-based polymers, cellulose and cellulose derivatives, polycarbonates, ABS, tetrafluoroethylene polymers, corresponding copolymers, plastics with higher flow and lower viscosity or a combination of two or more of the foregoing, and the like.

Anti-Microbial Materials

A nested pipette tip array assembly component may include one or more antimicrobial materials. An antimicrobial material may be coated on a surface (e.g., inner and/or outer surface) or impregnated in a moldable material, in some embodiments. One or more portions or sections, or all portions and sections, of a nested pipette tip array assembly component may include one or more antimicrobial materials. In some embodiments anti-microbial agents or substances may be added to the moldable plastic during the manufacture process. In some embodiments, the anti-microbial agent or substance can be an anti-microbial metal. The addition of anti-microbial agents may be useful in (i) decreasing the amount of microbes present in or on a device, (ii) decreasing the probability that microbes reside in or on a device, and/or (iii) decreasing the probability that microbes form a biofilm in or on a device, for example. Antimicrobial materials include, without limitation, metals, halogenated hydrocarbons, quaternary salts and sulfur compounds.

Methods for manufacturing anti-microbial containing plastic devices are described in International Patent Application No. PCT/US2009/047541, filed on Jun. 16, 2009, published as published patent application no. WO 2010/008737 on Jan. 21, 2010, and entitled ANTIMICROBIAL FLUID HANDLING DEVICES AND METHODS OF MANUFACTURE, the entirety of which is hereby incorporated herein by reference.

Methods of Dispensing Pipette Tip Arrays

A pipette tip receptacle plate retaining an array of pipette tips can be dispensed into a rack base. In some embodiments, the dispensing action causes fasteners on the pipette tip receptacle plate to engage orifices in the rack base. In some embodiments, the dispensing action causes fasteners on the rack base to engage orifices in the pipette tip receptacle plate. In use, an array of multiple pipette tips may be dispensed into a rack base, with the pipette tip dispensing device embodiments discussed herein. For some embodiments, the nested pipette tip array assembly is provided loaded with a plurality of pipette tip receptacle plates. In some embodiments, the nested pipette tip array assembly includes a push plate.

Axial force is applied to the proximal (top most) pipette tip receptacle plate in the nested pipette tip array assembly, which pushes one or more projections of the distal (bottom) most pipette tip receptacle plate into corresponding orifices in the rack base. In some embodiments, projections are on the rack base and orifices are on the distal surface of the pipette tip receptacle plate.

In some embodiments, the axial force of the actuation is generated manually (typically by a user's hand). In some embodiments, the axial force of the actuation is generated mechanically. In some embodiments, the axial force is applied to a push plate that distributes the force across a larger portion of the pipette tip receptacle plate.

Once the distal most pipette tip receptacle plate are dispensed into the rack base, the rack based can be removed from the nested pipette tip array assembly. A rack base without a pipette tip receptacle plate can be inserted into the bottom of the nested pipette tip array assembly and the next most distal pipette tip receptacle plate is then nested over the replacement rack base for the dispensing method to be repeated.

Once the pipette tip receptacle plate pipette tip array is loaded into the rack base, the pipette tips may then be engaged with a pipettor device. Once the pipette tips have been used, the pipette tips may be ejected from the pipettor and replaced with a new pipette tip array from the next rack base and the process repeated.

Methods for Manufacturing Nested Pipette Tip Array Assembly Components

Nested pipette tip array assembly components may be manufactured by any suitable process. Examples of manufacturing processes include thermoforming, vacuum forming, pressure forming, plug-assist forming, reverse-draw thermoforming, matched die forming, extrusion, casting and injection molding.

Extrusion is a process used to create objects of a fixed cross-sectional profile. A material often is pushed or drawn through a die of the desired cross-section. The two main advantages of an extrusion process over other manufacturing processes is the ability to create complex cross-sections and work materials that are brittle, because the material only encounters compressive and shear stresses. Such processes can be utilized to form finished parts with an excellent surface finish. Extrusion may be continuous (e.g., theoretically producing indefinitely long material) or semi-continuous (e.g., producing many pieces). The extrusion process can be performed with the material hot or cold.

Molding is a process of manufacture by shaping pliable raw material using a rigid frame or model called a mold. A mold often is a hollowed-out block filled with a liquid, including, without limitation, plastic, glass, metal, or ceramic raw materials. The liquid hardens or sets inside the mold, adopting its shape. A release agent sometimes is used to facilitate removal of the hardened or set substance from the mold.

Thermoforming is a manufacturing process for thermoplastic sheet or film. The sheet or film is heated between infrared, natural gas, or other heaters to its forming temperature. Then it is stretched over or into a temperature-controlled, single-surface mold. The sheet is held against the mold surface unit until cooled. The formed part is then trimmed from the sheet. The trimmed material is usually reground, mixed with virgin plastic, and reprocessed into usable sheet. There are several categories of thermoforming, including vacuum forming, pressure forming, twin-sheet forming, drape forming, free blowing, and simple sheet bending.

Injection molding is a manufacturing process for producing objects (e.g., tray components, for example) from thermoplastic (e.g., nylon, polypropylene, polyethylene, polystyrene and the like, for example) and thermosetting plastic (e.g., epoxy and phenolics, for example) materials. The plastic material of choice often is fed into a heated barrel, mixed, and forced into a mold cavity where it cools and hardens to the configuration of the mold cavity. The melted material sometimes is forced or injected into the mold cavity, through openings (e.g., a sprue), under pressure. A pressure injection method ensures the complete filling of the mold with the melted plastic. After the mold cools, the mold portions are separated, and the molded object is ejected. In some embodiments, additional additives can be included in the plastic or mold to give the final product additional properties (e.g., anti-microbial, or anti-static properties, for example). In some embodiments, nested pipette tip array assembly components described herein are injection molded as a unitary construct.

A mold often is configured to hold the molten plastic in the correct geometry to yield the desired product upon cooling of the plastic. Injection molds sometimes are made of two or more parts. Molds typically are designed so that the molded part reliably remains on the ejector side of the mold after the mold opens, after cooling. The part can then fall freely away from the mold when ejected from ejector side of the mold. In some embodiments, an ejector sleeve pushes the nested pipette tip array assembly component from the ejector side of the mold.

Casting is a manufacturing process by which a liquid material generally is flowed into a mold, which contains a hollow cavity of the desired shape, and then the liquid material is allowed to solidify. The solid casting is then ejected or broken out to complete the process. Casting may be used to form hot liquid metals or various materials that cold set after mixing of components (such as epoxies, concrete, plaster and clay). Casting is most often used for making complex shapes that would be otherwise difficult or uneconomical to make by other methods. The casting process is subdivided into two distinct subgroups: expendable and non-expendable mold casting.

Expendable mold casting is a generic classification that includes sand, plastic, shell, plaster, and investment (lost-wax technique) moldings. This method of mold casting involves the use of temporary, non-reusable molds. Non-expendable mold casting differs from expendable processes in that the mold need not be reformed after each production cycle. This technique includes at least four different methods: permanent, die, centrifugal, and continuous casting.

Affixing components that adhere or attach parts onto the nested pipette tip array assembly component from may include any adhesive known to those of skill in the art, for example such as glue, gum, anaerobics, cyanoacrylates, toughened acrylics, epoxies, polyurethanes, silicones, phenolics, polyimides, hot melts, pastisols, polyvinyl acetate and pressure-sensitive adhesives and the like. Methods that affix components together may include any methods known to those of skill in the art, for example such as embossing, fastening, stitching, laminating, welding, solder, melting, sealing, bonding and the like.

Examples of Embodiments

Provided below are non-limiting examples of embodiments.

A1. A nested pipette tip rack assembly comprising a rack base, a first pipette tip receptacle plate in association with the rack base, a second pipette tip receptacle plate proximally oriented to the first pipette tip receptacle plate;
  which first pipette tip receptacle plate and which second pipette tip receptacle plate each comprises a proximal surface, a distal surface, an array of bores extending from the proximal surface to the distal surface, and multiple projections extending from the distal surface;
  a first array of pipette tips are retained in the bores in the first pipette tip receptacle plate, and a second array of pipette tips are retained in the bores in the second pipette tip receptacle plate;
  each of which pipette tips in the second array of pipette tips is nested in a pipette tip in the first array of pipette tips; and
  a plurality of which projections of the second pipette tip receptacle plate is in contact with the proximal surface of the first pipette tip receptacle plate.

A2. The nested pipette tip rack assembly of embodiment A1, wherein the projections of the second pipette tip receptacle plate space the second pipette tip receptacle plate from the first pipette tip receptacle plate at a distance sufficient to prevent or reduce over-nesting of the pipette tips in the second array in the pipette tips of the first array.

A3. The nested pipette tip rack assembly of embodiment A1 or A2, wherein the pipette tips in the second array would be over-nested in the pipette tips of the first array if the projections of the second pipette tip receptacle plate were not present or were shorter in length.

A4. The nested pipette tip rack assembly of any one of embodiments A1-A3, which rack base comprises a rack proximal surface and multiple orifices in the rack base proximal surface, and each of which projections of the first pipette tip receptacle plate are inserted in a rack base orifice.

A5. The nested pipette tip rack assembly of embodiment A4, wherein the projections of the first pipette tip receptacle plate are reversibly inserted in the rack base orifices.

A6. The nested pipette tip rack assembly of embodiment A4 or A5, wherein the projections of the first pipette tip receptacle plate are retained in the rack base orifices by an interference fit.

A7. The nested pipette tip rack assembly of embodiment A6, wherein the rack base orifices comprise sidewalls and the projections of the first pipette tip receptacle plate interfere with the sidewalls.

A8. The nested pipette tip rack assembly of embodiment A7, wherein:
  each of the projections of each pipette tip receptacle comprises a first projection member and a second projection member, and
  the first projection member and the second projection member are configured to deflect towards one another when a projection is inserted in an orifice and each projection member contacts a sidewall.

A9. The nested pipette tip rack assembly of any one of embodiments A1-A8, wherein each of the projections of the second pipette tip receptacle plate comprises a distal terminus, and the distal terminus of a plurality of the projections of the second pipette tip receptacle plate contact the proximal surface of the first pipette tip receptacle plate.

A10. The nested pipette tip rack assembly of any one of embodiments A1-A9, wherein the first pipette tip receptacle plate comprises multiple orifices in the proximal surface and in opposition to the projections of the second pipette tip receptacle plate.

A11. The nested pipette tip rack assembly of embodiment A10, wherein the orifices in the proximal surface of the first pipette tip receptacle plate engage with the projections of the second pipette tip receptacle plate.

A12. The nested pipette tip rack assembly of embodiment A11, wherein the orifices in the proximal surface of the first pipette tip receptacle plate reversibly engage with, and optionally do not lock with, the projections of the second pipette tip receptacle plate.

A13. The nested pipette tip rack assembly of any one of embodiments A1-A12, wherein the proximal surface of the first and second pipette tip receptacle plate each comprise a raised surface comprising a plurality of the bores.

A14. The nested pipette tip rack assembly of embodiment A13, wherein the raised surface of each first and second pipette tip receptacle plate comprises all of the bores.

A15. The nested pipette tip rack assembly of any one of embodiments A1-A14, wherein the projections are selected from the group consisting of: fasteners, posts, pins, tubular supports, and ribs.

A16. The nested pipette tip rack assembly of any one of embodiments A1-A15, wherein each bore of the first and second pipette tip receptacle plate is in association with a projection.

A17. The nested pipette tip rack assembly of any one of embodiments A1-A16, wherein each bore of the first and second pipette tip receptacle plate is not in association with a projection.

A18. The nested pipette tip rack assembly of embodiment A17, wherein the projections are symmetrically disposed on the first and the second pipette tip receptacle plate.

A19. The nested pipette tip rack assembly of embodiment A18, wherein the projections are asymmetrically disposed on the first and the second pipette tip receptacle plate.

A20. The nested pipette tip rack assembly of any one of embodiments A17-A19, wherein the projections are disposed around the perimeter of the first and the second pipette tip receptacle plate.

A21. The nested pipette tip rack assembly of any one of embodiments A17-A19, wherein 80% or fewer bores of the first and second pipette tip receptacle plate are in association with a projection.

A22. The nested pipette tip rack assembly of any one of embodiments A1-A21, wherein the first and second pipette tip receptacle plate comprise each an X axis and a Y axis and the axes intersect at the center of the surface of each of the first and second pipette tip receptacle plate and the projections are distributed on the first and second receptacle plate parallel to the X axis or the Y axis.

A23. The nested pipette tip rack assembly of embodiment A22, wherein the projections are located near the pipette tip receptacle plate edge.

A24. The nested pipette tip rack assembly of embodiment A22, wherein the projections are located between pipette tip receptacle plate bores.

A25. The nested pipette tip rack assembly of embodiment A24, wherein the projections are located between pipette tip receptacle plate bores parallel to the X axis at a plurality of Y coordinates.

A26. The nested pipette tip rack assembly of embodiment A25, wherein the projections are located between every pipette tip receptacle plate bore parallel to the X axis.

A27. The nested pipette tip rack assembly of embodiment A24, wherein the projections are located between pipette tip receptacle plate bores parallel to the Y axis at a plurality of X coordinates.

A28. The nested pipette tip rack assembly of embodiment A27, wherein the projections are located between every pipette tip receptacle plate bore parallel to the Y axis.

A29. The nested pipette tip rack assembly of embodiment A28, wherein the projections are located between every pipette tip receptacle plate bore parallel to the X axis.

A30. The nested pipette tip rack assembly of any one of the embodiments A22-A29, wherein the projections comprise ribs.

A31. The nested pipette tip rack assembly of embodiment A23, wherein the projections comprise fasteners.

A32. The nested pipette tip rack assembly of any one of the embodiments A1-A31, wherein each pipette tip receptacle plate comprises 96, 192, 288, 384, 576, 672, 768 or 1536 bores.

B1. A nested pipette tip rack assembly comprising a rack base, a first pipette tip receptacle plate in association with the rack base, a second pipette tip receptacle plate proximally oriented to the first pipette tip receptacle plate;
which first pipette tip receptacle plate and which second pipette tip receptacle plate each comprises a proximal surface, a distal surface, an array of bores extending from the proximal surface to the distal surface, and multiple projections extending from the proximal surface;
a first array of pipette tips are retained in the bores in the first pipette tip receptacle plate, and a second array of pipette tips are retained in the bores in the second pipette tip receptacle plate;
each of which pipette tips in the second array of pipette tips is nested in a pipette tip in the first array of pipette tips; and
a plurality of which projections of the first pipette tip receptacle plate is in contact with the distal surface of the second pipette tip receptacle plate.

B2. The nested pipette tip rack assembly of embodiment B1, wherein the projections of the first pipette tip receptacle plate space the first pipette tip receptacle plate from the second pipette tip receptacle plate at a distance sufficient to prevent or reduce over-nesting of the pipette tips in the second array in the pipette tips of the first array.

B3. The nested pipette tip rack assembly of embodiment B1 or B2, wherein the pipette tips in the second array would be over-nested in the pipette tips of the first array if the projections of the first pipette tip receptacle plate were not present or were shorter in length.

B4. The nested pipette tip rack assembly of embodiment B1-B3;
which first pipette tip receptacle plate and which second pipette tip receptacle plate each comprise multiple orifices in the distal surface; and,
which rack base comprises a rack proximal surface and multiple projections in the rack base proximal surface, and each of which projections of the rack base are inserted in one of the orifices in the distal surface of the first pipette tip receptacle plate.

B5. The nested pipette tip rack assembly of embodiment B4, wherein the multiple projections in the rack base proximal surface are reversibly inserted in the orifices of the first pipette tip receptacle plate.

B6. The nested pipette tip rack assembly of embodiment B4 or B5, wherein the rack base projections are retained in the orifices of the first pipette tip receptacle plate by an interference fit.

B7. The nested pipette tip rack assembly of embodiment B6, wherein the first pipette tip receptacle plate orifices comprise sidewalls and the projections of the rack base interfere with the sidewalls.

B8. The nested pipette tip rack assembly of embodiment B7, wherein:
each of the projections of the rack base comprises a first projection member and a second projection member; and,
the first projection member and the second projection member of the rack base are configured to deflect towards one another when a projection is inserted in an orifice and each projection member contacts a sidewall.

B9. The nested pipette tip rack assembly of any one of embodiments B1-B8, wherein each of the projections of the first pipette tip receptacle plate comprises a distal terminus, and the distal terminus of a plurality of the projections of the first pipette tip receptacle plate contact the distal surface of the second pipette tip receptacle plate.

B10. The nested pipette tip rack assembly of any one of embodiments B1-B9, wherein the second pipette tip receptacle plate comprises multiple orifices in the distal surface and in opposition to the projections of the first pipette tip receptacle plate.

B11. The nested pipette tip rack assembly of embodiment B10, wherein the second pipette tip receptacle plate orifices reversibly engage with the projections of the first pipette tip receptacle plate.

B12. The nested pipette tip rack assembly of embodiment B11, wherein the second pipette tip receptacle plate orifices do not lock with the projections of the first pipette tip receptacle plate.

B13. The nested pipette tip rack assembly of any one of embodiments B1-B12, wherein the proximal surface of the first and second pipette tip receptacle plate each comprise a raised surface comprising a plurality of the bores.

B14. The nested pipette tip rack assembly of embodiment B13, wherein the raised surface of each first and second pipette tip receptacle plate comprises all of the bores.

B15. The nested pipette tip rack assembly of any one of embodiments B1-B14, wherein the receptacle plate projections are selected from the group consisting of: fasteners, posts, pins, tubular supports, and ribs.

B16. The nested pipette tip rack assembly of any one of embodiments B1-B15, wherein each bore of the first and second pipette tip receptacle plate is in association with a projection.

B17. The nested pipette tip rack assembly of any one of embodiments B1-B16, wherein each bore of the first and second pipette tip receptacle plate is not in association with a projection.

B18. The nested pipette tip rack assembly of embodiment B17, wherein the projections are symmetrically disposed on the first and the second pipette tip receptacle plate.

B19. The nested pipette tip rack assembly of embodiment B18, wherein the projections are asymmetrically disposed on the first and the second pipette tip receptacle plate.

B20. The nested pipette tip rack assembly of any one of embodiments B17-B19, wherein the projections are disposed around the perimeter of the first and the second pipette tip receptacle plate.

B21. The nested pipette tip rack assembly of any one of embodiments B17-B19, wherein 80% or fewer bores of the first and second pipette tip receptacle plate are in association with a projection.

B22. The nested pipette tip rack assembly of any of the embodiment B1-B21, wherein the first and second pipette tip receptacle plates comprise each an X axis and a Y axis and the axes intersect at the center of the surface of each of the first and second pipette tip receptacle plates and the receptacle plate projections are parallel to the X axis or the Y axis.

B23. The nested pipette tip rack assembly of embodiment B22, wherein the receptacle plate projections are located near the pipette tip receptacle plate edge.

B24. The nested pipette tip rack assembly of embodiment B22, wherein the receptacle plate projections are located between pipette tip receptacle plate bores.

B25. The nested pipette tip rack assembly of embodiment B24, wherein the receptacle plate projections are located between pipette tip receptacle plate bores parallel to the X axis at a plurality of Y coordinates.

B26. The nested pipette tip rack assembly of embodiment B25, wherein the receptacle plate projections are located between every pipette tip receptacle plate bore parallel to the X axis.

B27. The nested pipette tip rack assembly of embodiment B24, wherein the receptacle plate projections are located between pipette tip receptacle plate bores parallel to the Y axis at a plurality of X coordinates.

B28. The nested pipette tip rack assembly of embodiment B27, wherein the receptacle plate projections are located between every pipette tip receptacle plate bore parallel to the Y axis.

B29. The nested pipette tip rack assembly of embodiment B27, wherein the receptacle plate projections are located between every pipette tip receptacle plate bore parallel to the X axis.

B30. The nested pipette tip rack assembly of any of the embodiments B22-B29, wherein the receptacle plate projections comprise ribs.

B31. The nested pipette tip rack assembly of embodiment B23, wherein the receptacle plate projections comprise fasteners.

B32. The nested pipette tip rack assembly of any one of the embodiments B1-B31, wherein each pipette tip receptacle plate comprises 96, 192, 288, 384, 576, 672, 768 or 1536 bores.

C1. The nested pipette tip rack assembly of any of the embodiments A1-A32 or B1-B32 comprising a lid.

C2. The nested pipette tip rack assembly of embodiment C1, wherein the lid comprises an electrically conductive member in effective communication with the pipette tips.

C3. The nested pipette tip rack assembly of embodiment C1 or C2, wherein the lid comprises an electrically conductive material.

C4. The nested pipette tip rack assembly of any one of embodiments C1-C3, wherein the lid comprises a pliant material in effective connection with the pipette tips.

C5. The nested pipette tip rack assembly of any one of embodiments C1-C3, comprising an electrically conductive tab on the lid.

D1. The nested pipette tip rack assembly of any of the embodiments A1-A32, B1-B32, or C1-C5 comprising a push plate.

D2. The nested pipette tip rack assembly of embodiment D1, wherein the push plate comprises an electrically conductive member in effective communication with the pipette tips.

D3. The nested pipette tip rack assembly of embodiment D1 or D2, wherein the push plate comprises an electrically conductive material.

D4. The nested pipette tip rack assembly of any one of embodiments D1-D3, wherein the push plate comprises a pliant material in effective connection with the pipette tips.

D5. The nested pipette tip rack assembly of any one of embodiments D1-D4, comprising an electrically conductive tab on the push plate.

E1. The nested pipette tip rack assembly of any of the embodiments A1-A32, B1-B32, C1-C5, or D1-D5 comprising a sheet comprising a first surface, a second surface and an array of holes,
each of which holes in the array of holes in the sheet comprises an edge;
which second surface of the sheet is in contact with the top surface of the pipette tip receptacle plate; and,
which holes in the sheet are concentric with the bores in the pipette tip receptacle plate; and,
which pipette tips in the array of pipette tips comprise an exterior wall;
which pipette tips in the array of pipette tips are retained in the holes of the sheet by friction between the exterior wall of each of the pipette tips and the edge of each hole in the sheet in contact with each of the pipette tips;

F1. The nested pipette tip rack assembly of any of the embodiments A1-A32, B1-B32, C1-C5, or D1-D5 comprising a sheet comprising a first surface and a second surface;
each of which pipette tips in the array of pipette tips comprise a proximal region terminus; and, the proximal region terminus of each pipette tip is joined to the second surface of the sheet.

F2. The nested pipette tip rack assembly of embodiment F1, wherein the pipette tips comprise a proximal end diameter and the sheet comprises holes wherein each hole is located within the region of the proximal end opening of each pipette tip and the hole comprises a diameter less than the proximal end diameter.

F3. The nested pipette tip rack assembly of embodiment F1, wherein the holes are concentric with the proximal region terminus of the pipette tips.

F3. The nested pipette tip rack assembly of embodiment F1, wherein the pipette tips comprise a proximal end diameter and the sheet comprises perforation circles wherein each perforation circle is located within the proximal end opening of each pipette tip and the perforation circle comprise a diameter less than the proximal end diameter.

F4. The nested pipette tip rack assembly of any of the embodiments of F1-F3, comprising an adhesive where the proximal region terminus contacts the second surface of the sheet.

G1. The nested pipette tip rack assembly of any of the embodiments A1-A32, B1-B32, C1-C5, D1-D5, E1, or F1-F4 comprising an ejection sleeve,
which ejection sleeve comprises four walls and configured to stabilize a plurality of pipette tip receptacle plates over the rack base.

G2. The nested pipette tip rack assembly of embodiment G1, wherein the ejection sleeve is transparent or translucent G3. The nested pipette tip rack assembly of embodiment G1 or G2, wherein the ejection sleeve is bossed.

H1. The nested pipette tip rack assembly of any of the embodiments A1-A32, B1-B32, C1-C5, D1-D5, E1, F1-F4, or G1-G3, comprising rigid packaging,
which rigid packaging comprised four sidewalls and a bottom.

H2. The nested pipette tip rack assembly of embodiment H1, wherein at least one sidewall includes a cutout.

H3. The nested pipette tip rack assembly of embodiment H1 or H2, wherein the rigid packaging comprises cardboard.

H4. The nested pipette tip rack assembly of embodiment H1 or H2, wherein the rigid packaging is transparent or translucent.

I1. The nested pipette tip rack assembly of any of the embodiments A1-A32, B1-B32, C1-C5, D1-D5, E1, F1-F4, G1-G3, or H1-H4 comprising a bag,
which bag comprises four side panels and a bottom.

I2. The nested pipette tip rack assembly of embodiment 11, wherein the bag is transparent or translucent.

I3. The nested pipette tip rack assembly of embodiment 11 or 12, wherein the bag is resealable.

J1. A method of dispensing a pipette tip receptacle plate comprising;
providing a nested pipette tip rack assembly according to any of the embodiments of A1-A32, B1-B32, C1-C5, D1-D5, E1, F1-F4; or G1-G3; and,
applying an axial force to the proximal pipette tip receptacle plate sufficient to transfer a pipette tip receptacle plate onto a rack base.

K1. A method of dispensing a pipette tip receptacle plate, comprising;
providing a nested pipette tip rack assembly according to any of the embodiments of D1-D5; and,
applying an axial force to the push plate sufficient to transfer a pipette tip receptacle plate onto a rack base.

L1. A method for manufacturing a nested pipette tip rack assembly, comprising;
(a) providing a mold comprising structures configured to mold a component of the nested pipette tip rack assembly according to any of the embodiments of A1-A32, B1-B32, C1-C5, D1-D5, E1, F1-F4; or G1-G3;
(b) introducing a moldable polymer to the mold;
(c) curing the polymer in the mold, thereby producing the component of the nested pipette tip rack assembly; and
(d) removing the component of the nested pipette tip rack assembly from the mold.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A nested pipette tip rack assembly comprising:
a rack base;
a first pipette tip receptacle plate in association with the rack base;

a second pipette tip receptacle plate proximally oriented to the first pipette tip receptacle plate;

a first array of pipette tips; and a second array of pipette tips;

wherein the first pipette tip receptacle plate and the second pipette tip receptacle plate each comprise a proximal surface, a distal surface, an array of bores extending from the proximal surface to the distal surface and multiple ribs extending from the distal surface, wherein each plate comprises an X axis and a Y axis on the distal surface that intersect at a center of the distal surface and the ribs are distributed between each pipette tip receptacle plate bore parallel to the X axis or the Y axis, but not both the X axis and the Y axis;

wherein the first array of pipette tips are retained in the bores in the first pipette tip receptacle plate, and the second array of pipette tips are retained in the bores in the second pipette tip receptacle plate;

wherein each of the pipette tips in the second array of pipette tips is nested in a corresponding pipette tip in the first array of pipette tips, wherein the ribs of the second pipette tip receptacle plate space the second pipette tip receptacle plate from the first pipette tip receptacle plate at a distance sufficient to prevent or reduce over-nesting of the pipette tips in the second array in the corresponding pipette tips of the first array in, in which over-nesting is characterized by interference and resulting retention forces between pipette tips in the second array of pipette tips and the corresponding pipette tips in the first array of pipette tips that interfere with dissociation of the nested pipette tips when the second pipette tip receptacle plate and the second array of pipette tips is separated from the first pipette tip receptacle plate and the first array of pipette tips.

2. The nested pipette tip rack assembly of claim 1, wherein the ribs are located between pipette tip receptacle plate bores parallel to the X axis.

3. The nested pipette tip rack assembly of claim 1, wherein the ribs are located between pipette tip receptacle plate bores parallel to the Y axis.

4. The nested pipette tip rack assembly of claim 1, wherein each pipette tip receptacle plate comprises 96, 192, 288, 384, 576, 672, 768 or 1536 bores.

5. The nested pipette tip rack assembly of claim 4, wherein each pipette tip receptacle plate comprises 384 bores.

6. The nested pipette tip rack assembly of claim 1; further comprising a first sheet and a second sheet;

wherein each sheet comprising a first surface, a second surface and an array of holes, the second surface of the first sheet is in contact with a top surface of the first pipette tip receptacle plate and the second surface of the second sheet is in contact with a top surface of the second pipette tip receptacle plate;

wherein the holes in the first sheet are concentric with the bores in the first pipette tip receptacle plate and the holes in the second sheet are concentric with the bores in the second pipette tip receptacle plate; and wherein the pipette tips of the first array of pipette tips are associated with the first sheet and the pipette tips of the second array of pipette tips are associated with the second sheet.

7. The nested pipette tip rack assembly of claim 6, wherein:

the pipette tips of the first array of pipette tips and the second array of pipette tips each comprise an exterior wall;

the holes in the array of holes of the first sheet and the second sheets each comprises an edge; and each pipette tip in the first array of pipette tips is retained in a corresponding hole of the first sheet by friction between the exterior wall of the pipette tip and the edge of the corresponding hole in the first sheet in contact with the pipette tip and each pipette tip in the second array of pipette tips is retained in a corresponding hole of the second sheet by friction between the exterior wall of the pipette tip and the edge of the corresponding hole in the second sheet in contact with the pipette tip.

8. The nested pipette tip rack assembly of claim 1, further comprising a push plate.

9. The nested pipette tip rack assembly of claim 8, further comprising an ejection sleeve that comprises four walls.

10. The nested pipette tip rack assembly of claim 9, wherein the ejection sleeve is transparent or translucent.

11. The nested pipette tip rack assembly of claim 9, wherein the ejection sleeve is bossed.

12. The nested pipette tip rack assembly of claim 1, further comprising a bag, wherein the bag comprises four side panels and a bottom.

13. The nested pipette tip rack assembly of claim 12, wherein the bag is transparent or translucent.

14. The nested pipette tip rack assembly of claim 12, wherein the bag is resealable.

* * * * *